US012567935B2

(12) United States Patent
Zhu et al.

(10) Patent No.: US 12,567,935 B2
(45) Date of Patent: Mar. 3, 2026

(54) METHOD AND APPARATUS FOR DETERMINING A TCI STATE

(71) Applicant: Samsung Electronics Co., Ltd., Suwon-si (KR)

(72) Inventors: Dalin Zhu, Allen, TX (US); Emad N. Farag, Flanders, NJ (US); Eko Onggosanusi, Coppell, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 482 days.

(21) Appl. No.: 18/312,390

(22) Filed: May 4, 2023

(65) Prior Publication Data

US 2023/0379125 A1     Nov. 23, 2023

Related U.S. Application Data

(60) Provisional application No. 63/456,684, filed on Apr. 3, 2023, provisional application No. 63/445,558, filed on Feb. 14, 2023, provisional application No. 63/343,445, filed on May 18, 2022.

(51) Int. Cl.
H04L 5/00          (2006.01)
H04W 72/232     (2023.01)
(52) U.S. Cl.
CPC .......... H04L 5/0053 (2013.01); H04L 5/0091 (2013.01); H04W 72/232 (2023.01)
(58) Field of Classification Search
CPC ... H04L 5/0053; H04L 5/0091; H04W 72/232
See application file for complete search history.

(56) References Cited

U.S. PATENT DOCUMENTS

2021/0219336 A1*     7/2021     Fan ...................... H04L 5/0044
2021/0378004 A1     12/2021     Cirik et al.
(Continued)

FOREIGN PATENT DOCUMENTS

WO          2022015595 A1     1/2022

OTHER PUBLICATIONS

"3rd Generation Partnership Project; Technical Specification Group Radio Access Network; NR; Physical channels and modulation (Release 16)", 3GPP TS 38.211 V16.1.0, Mar. 2020, 130 pages.
(Continued)

*Primary Examiner* — Elton Williams

(57)          ABSTRACT

Methods and apparatuses for determination of a transmission configuration indication (TCI) state in a wireless communication system. A method for operating a user equipment (UE) includes receiving, in a first control resource set (CORESET), a downlink control information (DCI) indicating a first TCI state and receiving, in a radio resource control (RRC) signaling, (i) a first indicator configuring a value of coresetPoolIndex associated with the first CORESET and (ii) a second indicator. The method further includes identifying, based on the first indicator, an association between the value of coresetPoolIndex and the first TCI state; identifying, based on the second indicator, whether a simultaneous reception before an indicated TCI state is applicable is enabled; and determining, based on the identifications, one or more spatial filters for receiving a physical downlink shared channel (PDSCH) before the indicated TCI state is applicable, wherein the PDSCH is associated with the value of coresetPoolIndex.

20 Claims, 29 Drawing Sheets

(56) References Cited

U.S. PATENT DOCUMENTS

| 2022/0039140 A1 | 2/2022 | Yi et al. |
| 2022/0124782 A1 | 4/2022 | Park et al. |

OTHER PUBLICATIONS

"3rd Generation Partnership Project; Technical Specification Group Radio Access Network; NR; Multiplexing and channel coding (Release 16)", 3GPP TS 38.212 V16.1.0, Mar. 2020, 146 pages.

"3rd Generation Partnership Project; Technical Specification Group Radio Access Network; NR; Physical layer procedures for control (Release 16)" 3GPP TS 38.213 V16.1.0, Mar. 2020, 156 pages.

"3rd Generation Partnership Project; Technical Specification Group Radio Access Network; NR; Physical layer procedures for data (Release 16)", 3GPP TS 38.214 V16.1.0, Mar. 2020, 151 pages.

"5G; NR; Medium Access Control (MAC) protocol specification (3GPP TS 38.321 version 16.1.0 Release 16)", ETSI TS 138 321 V16.1.0, Jul. 2020, 153 pages.

"5G; NR; Radio Resource Control (RRC); Protocol specification (3GPP TS 38.331 version 16.1.0 Release 16)", ETSI TS 138 331 V16.1.0, Jul. 2020, 886 pages.

International Search Report and Written Opinion issued Aug. 29, 2023 regarding International Application No. PCT/KR2023/006650, 6 pages.

Nokia, "Corrections on NR Multicast and Broadcast Services", 3GPP TSG-RAN WG1 Meeting #108-e, R1-2202962, Mar. 2022, 21 pages.

* cited by examiner

1800

UE                                                                    1802        gNB

Option-1 for TRP-1 (associated with
'CORESETPOOLIndex = 0')

Option-2 for TRP-2 (associated with
'CORESETPOOLIndex = 1')

1806

1804

Follow Option-1 to determine the default
beam(s) for receiving and/or decoding
the PDSCH(s) from TRP-1; follow
Option-2 to determine the default
beam(s) for receiving and/or decoding
the PDSCH(s) from TRP-2

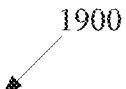

1900

| Priority 0 |
| Option-3 with CORESETPOOLIndex & common TCI state/beam indication configured |

| Priority 1 |
| Option-1 with CORESETPOOLIndex & common TCI state/beam indication configured |

| Priority 2 |
| Option-4 with common TCI state/beam indication configured |

| Priority 3 |
| Option-2 with common TCI state/beam indication configured |

| Priority 4 |
| Option-5 with CORESETPOOLIndex configured |

| Priority 5 |
| Option-6 |

Figure 22:
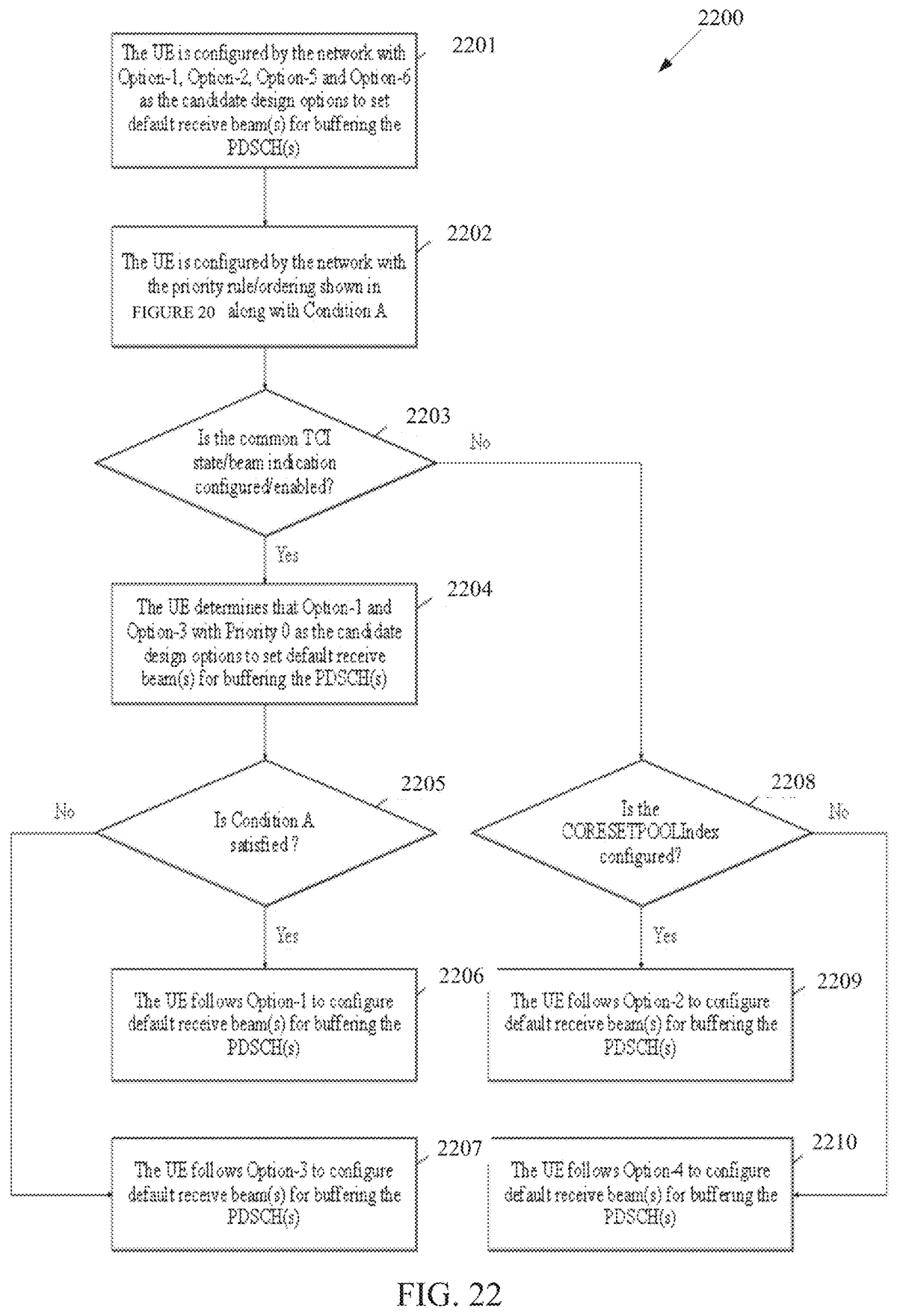

2201 — The UE is configured by the network with Option-1, Option-2, Option-5 and Option-6 as the candidate design options to set default receive beam(s) for buffering the PDSCH(s)

2202 — The UE is configured by the network with the priority rule/ordering shown in FIGURE 20 along with Condition A

2203 — Is the common TCI state/beam indication configured/enabled?

No → (to right branch)

Yes ↓

2204 — The UE determines that Option-1 and Option-3 with Priority 0 as the candidate design options to set default receive beam(s) for buffering the PDSCH(s)

2205 — Is Condition A satisfied?

No → (to 2207)

Yes ↓

2206 — The UE follows Option-1 to configure default receive beam(s) for buffering the PDSCH(s)

2207 — The UE follows Option-3 to configure default receive beam(s) for buffering the PDSCH(s)

2208 — Is the CORESETPOOLIndex configured?

No → (to 2210)

Yes ↓

2209 — The UE follows Option-2 to configure default receive beam(s) for buffering the PDSCH(s)

2210 — The UE follows Option-4 to configure default receive beam(s) for buffering the PDSCH(s)

| TCI codepoint | TCI state(s) for PDSCH |
|---|---|
| 000 | TCI #1 |
| 001 | TCI #3 |
| 010 | (TCI #1, TCI #4) |
| 011 | (TCI #5, TCI #6) |
| 100 | TCI #4 |
| 101 | TCI #30 |
| 110 | TCI #11 |
| 111 | (TCI #4, TCI #17) |

Default TCI states with the lowest TCI codepoint containing two TCI states activated for PDSCH

2800

| Default TCI set | Common TCI state(s) |
|---|---|
| 0 | TCI #5 |
| 1 | TCI #10 |
| 2 | (TCI #2, TCI #4) |
| 3 | (TCI #5, TCI #7) |
| 4 | TCI #5 |
| 5 | TCI #18 |
| 6 | TCI #11 |
| 7 | (TCI #2, TCI #17) |

| Default TCI set | Common TCI states |
|---|---|
| 0 | (TCI #1, TCI #5) |
| 1 | (TCI #11, TCI #3) |
| 2 | (TCI #1, TCI #4) |
| 3 | (TCI #5, TCI #6) |
| 4 | (TCI #2, TCI #7) |
| 5 | (TCI #30, TCI #44) |
| 6 | (TCI #1, TCI #11) |
| 7 | (TCI #4, TCI #17) |

The default TCI set activated by MAC-CE contains default (common) TCI states/beams

METHOD AND APPARATUS FOR DETERMINING A TCI STATE

CROSS-REFERENCE TO RELATED APPLICATIONS AND CLAIM OF PRIORITY

The present application claims priority to:

U.S. Provisional Patent Application No. 63/343,445, filed on May 18, 2022;

U.S. Provisional Patent Application No. 63/445,558, filed on Feb. 14, 2023; and

U.S. Provisional Patent Application No. 63/456,684, filed on Apr. 3, 2023. The contents of the above-identified patent documents are incorporated herein by reference.

TECHNICAL FIELD

The present disclosure relates generally to wireless communication systems and, more specifically, the present disclosure relates to a determination of a transmission configuration indication (TCI) state in a wireless communication system.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates to a determination of a TCI state in a wireless communication system.

In one embodiment, a UE is provided. The UE includes a transceiver configured to receive, in a first control resource set (CORESET), a downlink control information (DCI) indicating a first TCI state and receive, in a radio resource control (RRC) signaling, (i) a first indicator configuring a value of coresetPoolIndex associated with the first CORE-SET and (ii) a second indicator. The UE further includes a processor operably coupled to the transceiver. The processor is configured to identify, based on the first indicator, an association between the value of coresetPoolIndex and the first TCI state; identify, based on the second indicator, whether a simultaneous reception before an indicated TCI state is applicable is enabled; and determine, based on the identifications, one or more spatial filters for receiving a physical downlink shared channel (PDSCH) before the indicated TCI state is applicable, wherein the PDSCH is associated with the value of coresetPoolIndex.

In another embodiment, a base station (BS) is provided. The BS includes a transceiver configured to transmit, in a first CORESET, a DCI indicating a first TCI state and transmit, in a RRC signaling, (i) a first indicator configuring a value of coresetPoolIndex associated with the first CORE-SET and (ii) a second indicator. The first indicator indicates a first indication of an association between the value of coresetPoolIndex and the first TCI state. The second indicator indicates a second indication of whether a simultaneous reception before an indicated TCI state is applicable is enabled. One or more spatial filters associated with a PDSCH before the indicated TCI state is applicable are indicated based on the first and second indications. The PDSCH is associated with the value of coresetPoolIndex.

In yet another embodiment, a method for operating a UE is provided. The method includes receiving, in a first CORE-SET, a DCI indicating a first TCI state and receiving, in a RRC signaling, (i) a first indicator configuring a value of coresetPoolIndex associated with the first CORESET and (ii) a second indicator. The method further includes identifying, based on the first indicator, an association between the value of coresetPoolIndex and the first TCI state; identifying, based on the second indicator, whether a simultaneous reception before an indicated TCI state is applicable is enabled; and determining, based on the identifications, one or more spatial filters for receiving a PDSCH before the indicated TCI state is applicable, wherein the PDSCH is associated with the value of coresetPoolIndex.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 19 and 20 illustrate examples of priority rules of determining default TCI state(s) for PDSCH reception in a multi-TRP system according to embodiments of the present disclosure;

FIGS. 21 to 23 illustrate examples of following the priority rules to determine default TCI state(s) for PDSCH reception in a multi-TRP system according to embodiments of the present disclosure;

FIGS. 27 and 28 illustrate examples of TCI codepoint mapping of default TCI state(s) according to embodiments of the present disclosure;

DETAILED DESCRIPTION

FIG. 1 through FIG. 30, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.211 v16.1.0, "NR; Physical channels and modulation"; 3GPP TS 38.212 v16.1.0, "NR; Multiplexing and Channel coding"; 3GPP TS 38.213 v16.1.0, "NR; Physical Layer Procedures for Control"; 3GPP TS 38.214 v16.1.0, "NR; Physical Layer Procedures for Data"; 3GPP TS 38.321 v16.1.0, "NR; Medium Access Control (MAC) protocol specification"; and 3GPP TS 38.331 v16.1.0, "NR; Radio Resource Control (RRC) Protocol Specification."

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 1:
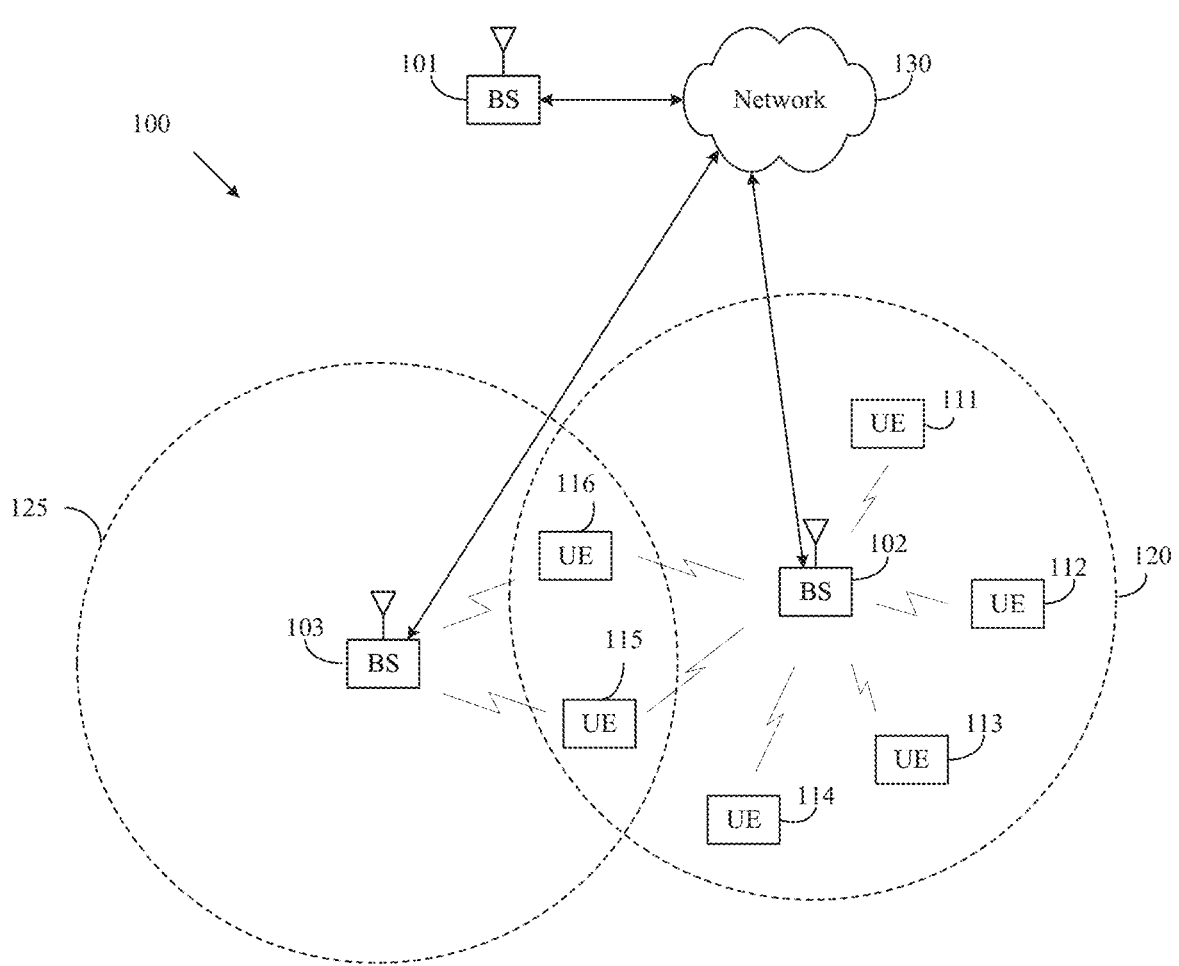
FIG. 1 illustrates an example of wireless network according to embodiments of the present disclosure.
Figure 2:
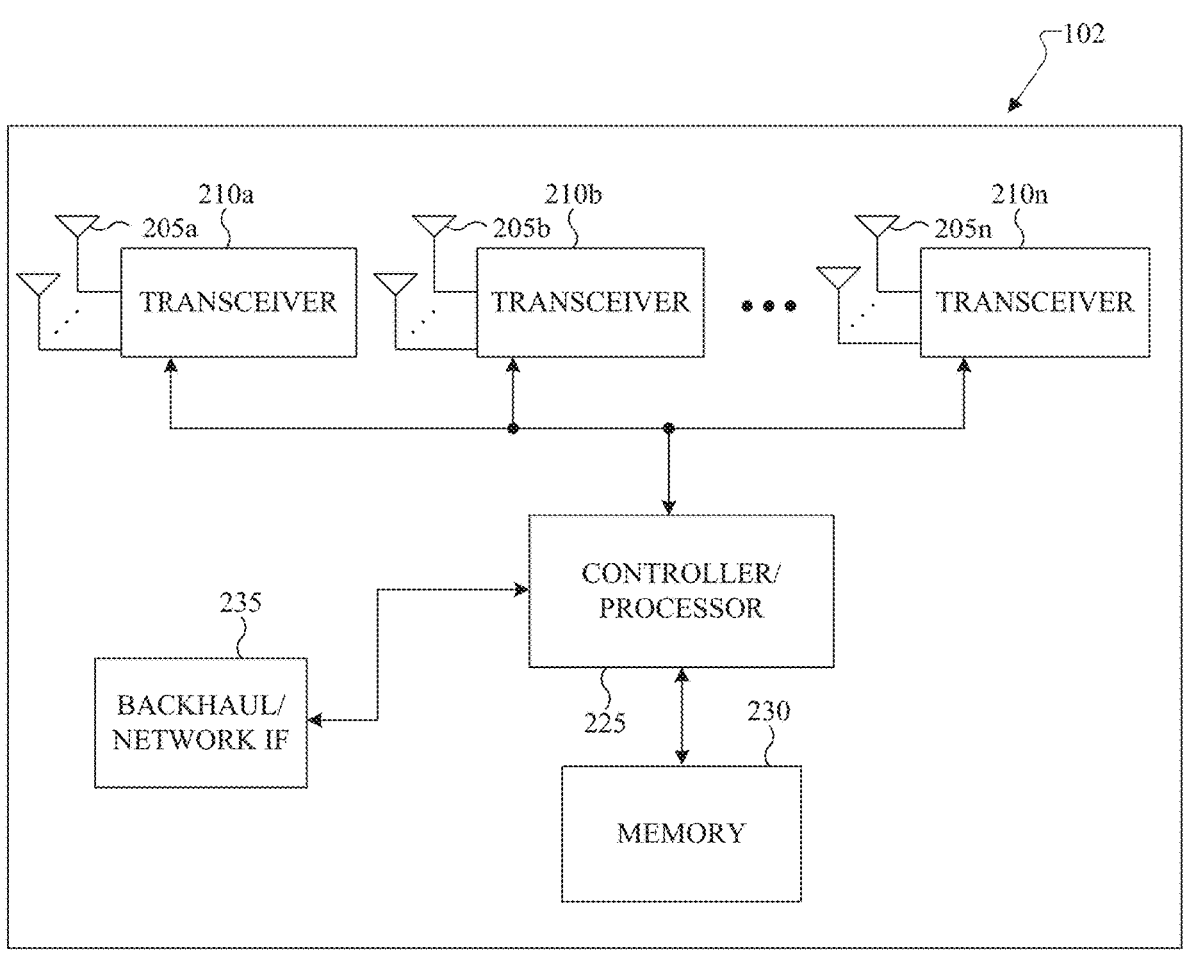
FIG. 2 illustrates an example of gNB according to embodiments of the present disclosure.
Figure 3:
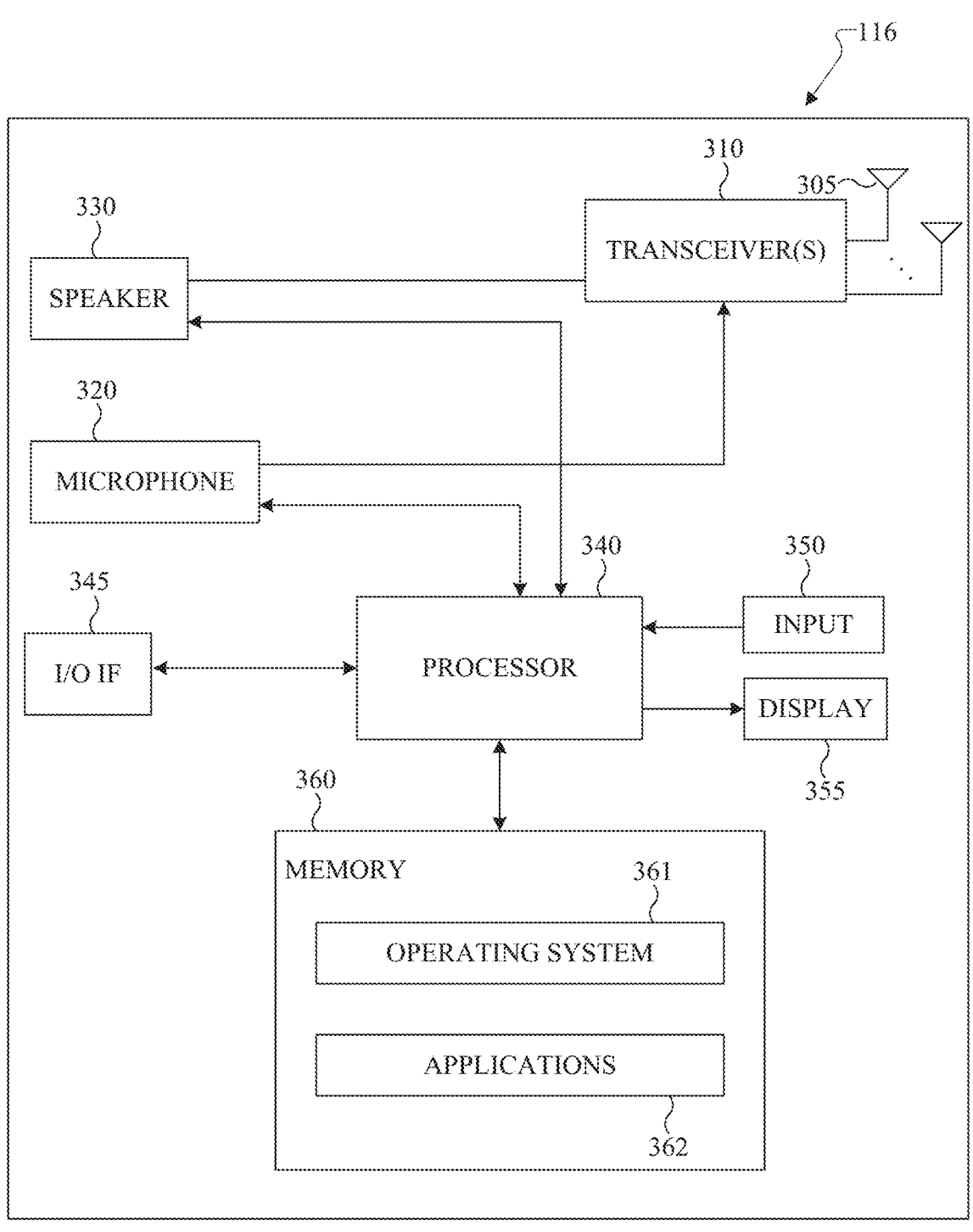
FIG. 3 illustrates an example of UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3$^{rd}$ generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for a determination of the TCI state in a wireless communication system. In certain embodiments, and one or more of the gNBs 101-103 includes circuitry, programing, or a combination thereof, for a determination of the TCI state in a wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple transceivers 210a-210n, a controller/processor 225, a memory 230, and a backhaul or network interface 235.

The transceivers 210a-210n receive, from the antennas 205a-205n, incoming RF signals, such as signals transmitted by UEs in the network 100. The transceivers 210a-210n down-convert the incoming RF signals to generate IF or baseband signals. The IF or baseband signals are processed by receive (RX) processing circuitry in the transceivers 210a-210n and/or controller/processor 225, which generates processed baseband signals by filtering, decoding, and/or digitizing the baseband or IF signals. The controller/processor 225 may further process the baseband signals.

Transmit (TX) processing circuitry in the transceivers 210a-210n and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210a-210n up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the transceivers 210a-210n in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as processes for a determination of the TCI state in a wireless communication system. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives from the antenna 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360, such as processes for a determination of the TCI state in a wireless communication system.

The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350 and the display 355m which includes for example, a touchscreen, keypad, etc., The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figures 4, 5:
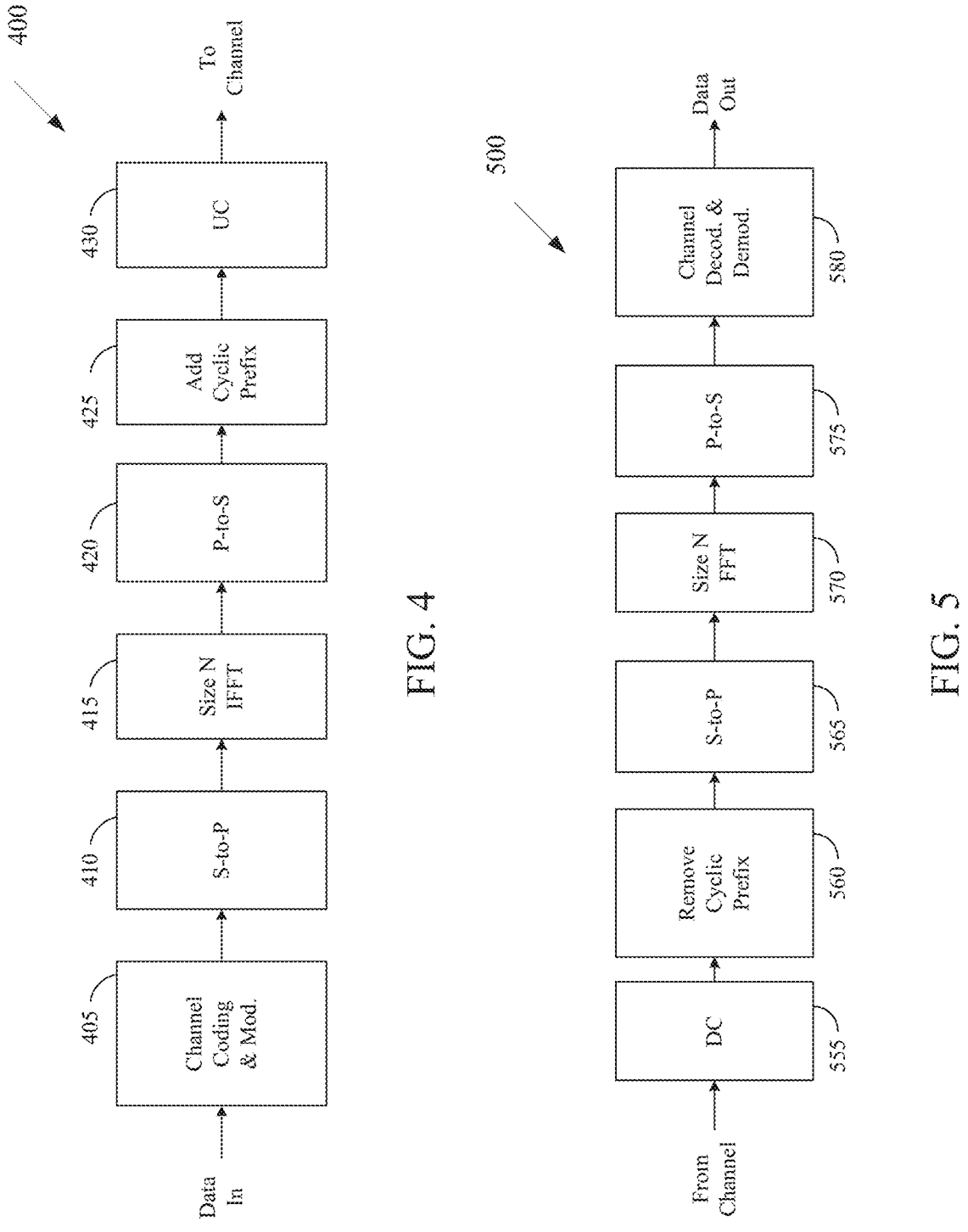
FIGS. 4 and 5 illustrate example of wireless transmit and receive paths according to this disclosure.

FIG. 4 and FIG. 5 illustrate example wireless transmit and receive paths according to this disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. In some embodiments, the receive path 500 is configured to support a determination of the TCI state in a wireless communication system.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the downconverter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNB s 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and may implement the receive path 500 for receiving in the downlink from the gNBs 101-103.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 415 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

A unit for DL signaling or for UL signaling on a cell is referred to as a slot and can include one or more symbols. A bandwidth (BW) unit is referred to as a resource block (RB). One RB includes a number of sub-carriers (SCs). For example, a slot can have duration of one millisecond and an RB can have a bandwidth of 180 KHz and include 12 SCs with inter-SC spacing of 15 KHz. A slot can be either full DL slot, or full UL slot, or hybrid slot similar to a special subframe in time division duplex (TDD) systems.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. A UE can be indicated a spatial setting for a PDCCH reception based on a configuration of a value for a TCI state of a CORESET where the UE receives the PDCCH. The UE can be indicated a spatial setting for a PDSCH reception based on a configuration by higher layers or based on an indication by a DCI format scheduling the PDSCH reception of a value for a TCI state. The gNB can configure the UE to receive signals on a cell within a DL bandwidth part (BWP) of the cell DL BW.

A gNB transmits one or more of multiple types of RS including channel state information RS (CSI-RS) and demodulation RS (DMRS). A CSI-RS is primarily intended for UEs to perform measurements and provide channel state information (CSI) to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process consists of NZP CSI-RS and CSI-IM resources. A UE can determine CSI-RS transmission parameters through DL control signaling or higher layer signaling, such as an RRC signaling from a gNB. Transmission instances of a CSI-RS can be indicated by DL control signaling or configured by higher layer signaling. A DMRS is transmitted only in the BW of a respective PDCCH or PDSCH and a UE can use the DMRS to demodulate data or control information.

UL signals also include data signals conveying information content, control signals conveying UL control information (UCI), DMRS associated with data or UCI demodulation, sounding RS (SRS) enabling a gNB to perform UL channel measurement, and a random access (RA) preamble enabling a UE to perform random access. A UE transmits data information or UCI through a respective physical UL shared channel (PUSCH) or a physical UL control channel (PUCCH). A PUSCH or a PUCCH can be transmitted over a variable number of slot symbols including one slot symbol.

The gNB can configure the UE to transmit signals on a cell within an UL BWP of the cell UL BW.

UCI includes hybrid automatic repeat request acknowledgement (HARQ-ACK) information, indicating correct or incorrect detection of data transport blocks (TBs) in a PDSCH, scheduling request (SR) indicating whether a UE has data in the buffer of UE, and CSI reports enabling a gNB to select appropriate parameters for PDSCH or PDCCH transmissions to a UE. HARQ-ACK information can be configured to be with a smaller granularity than per TB and can be per data code block (CB) or per group of data CBs where a data TB includes a number of data CBs.

A CSI report from a UE can include a channel quality indicator (CQI) informing a gNB of a largest modulation and coding scheme (MCS) for the UE to detect a data TB with a predetermined block error rate (BLER), such as a 10% BLER, of a precoding matrix indicator (PMI) informing a gNB how to combine signals from multiple transmitter antennas in accordance with a multiple input multiple output (MIMO) transmission principle, and of a rank indicator (RI) indicating a transmission rank for a PDSCH. UL RS includes DMRS and SRS. DMRS is transmitted only in a BW of a respective PUSCH or PUCCH transmission. A gNB can use a DMRS to demodulate information in a respective PUSCH or PUCCH. SRS is transmitted by a UE to provide a gNB with an UL CSI and, for a TDD system, an SRS transmission can also provide a PMI for DL transmission. Additionally, in order to establish synchronization or an initial higher layer connection with a gNB, a UE can transmit a physical random-access channel.

In the present disclosure, a beam is determined by either of: (1) a TCI state, which establishes a quasi-colocation (QCL) relationship between a source reference signal (e.g., synchronization signal/physical broadcasting channel (PBCH) block (SSB) and/or CSI-RS) and a target reference signal; or (2) spatial relation information that establishes an association to a source reference signal, such as SSB or CSI-RS or SRS. In either case, the ID of the source reference signal identifies the beam.

The TCI state and/or the spatial relation reference RS can determine a spatial Rx filter for reception of downlink channels at the UE, or a spatial Tx filter for transmission of uplink channels from the UE.

Figure 6A:
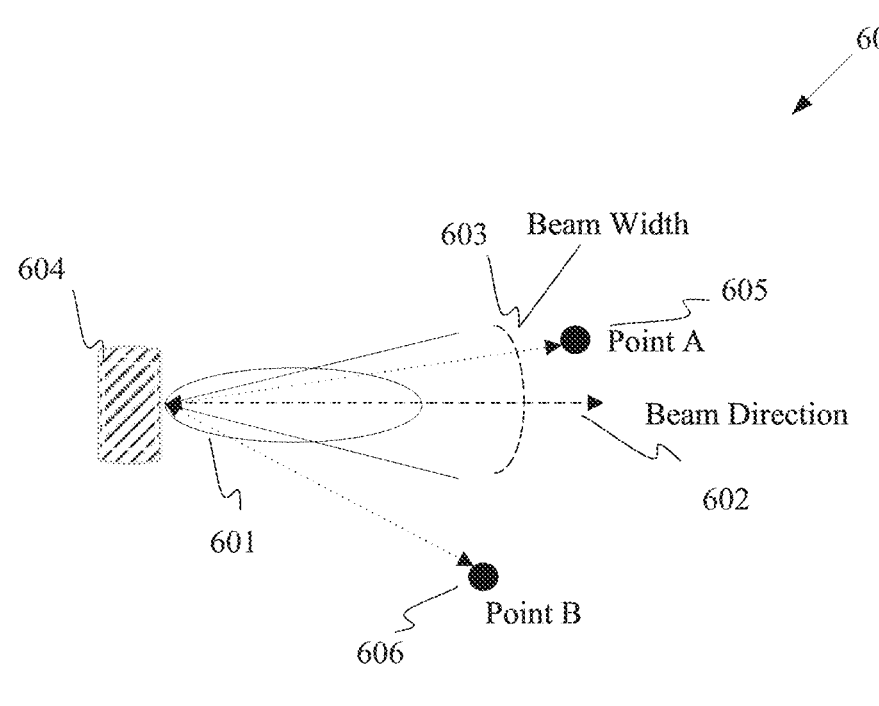
FIG. 6A illustrates an example of wireless system beam according to embodiments of the present disclosure.

FIG. 6A illustrates an example wireless system beam 600 according to embodiments of the present disclosure. An embodiment of the wireless system beam 600 shown in FIG. 6A is for illustration only.

As illustrated in FIG. 6A, in a wireless system a beam 601, for a device 604, can be characterized by a beam direction 602 and a beam width 603. For example, a device 604 with a transmitter transmits radio frequency (RF) energy in a beam direction and within a beam width. The device 604 with a receiver receives RF energy coming towards the device in a beam direction and within a beam width. As illustrated in FIG. 6A, a device at point A 605 can receive from and transmit to the device 604 as point A is within a beam width of a beam traveling in a beam direction and coming from the device 604.

As illustrated in FIG. 6A, a device at point B 606 cannot receive from and transmit to the device 604 as point B is outside a beam width of a beam traveling in a beam direction and coming from the device 604. While FIG. 6A, for illustrative purposes, shows a beam in 2-dimensions (2D), it may be apparent to those skilled in the art, that a beam can be in 3-dimensions (3D), where the beam direction and beam width are defined in space.

Figure 6B:
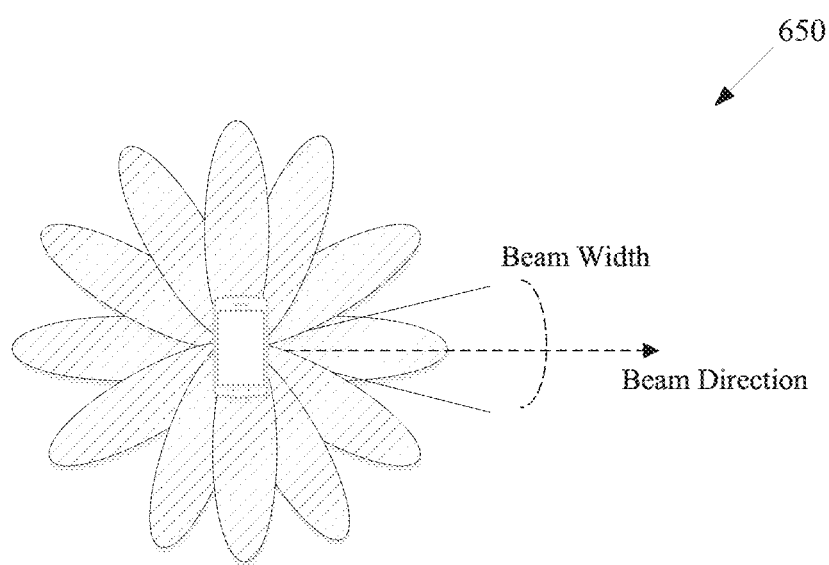
FIG. 6B illustrates an example of multi-beam operation according to embodiments of the present disclosure.

FIG. 6B illustrates an example multi-beam operation 650 according to embodiments of the present disclosure. An embodiment of the multi-beam operation 650 shown in FIG. 6B is for illustration only.

In a wireless system, a device can transmit and/or receive on multiple beams. This is known as "multi-beam operation" and is illustrated in FIG. 6B. While FIG. 6B, for illustrative purposes, is in 2D, it may be apparent to those skilled in the art, that a beam can be 3D, where a beam can be transmitted to or received from any direction in space.

Rel.14 LTE and Rel.15 NR support up to 32 CSI-RS antenna ports which enable an eNB to be equipped with a large number of antenna elements (such as 64 or 128). In this case, a plurality of antenna elements is mapped onto one CSI-RS port. For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 7.

Figure 7:
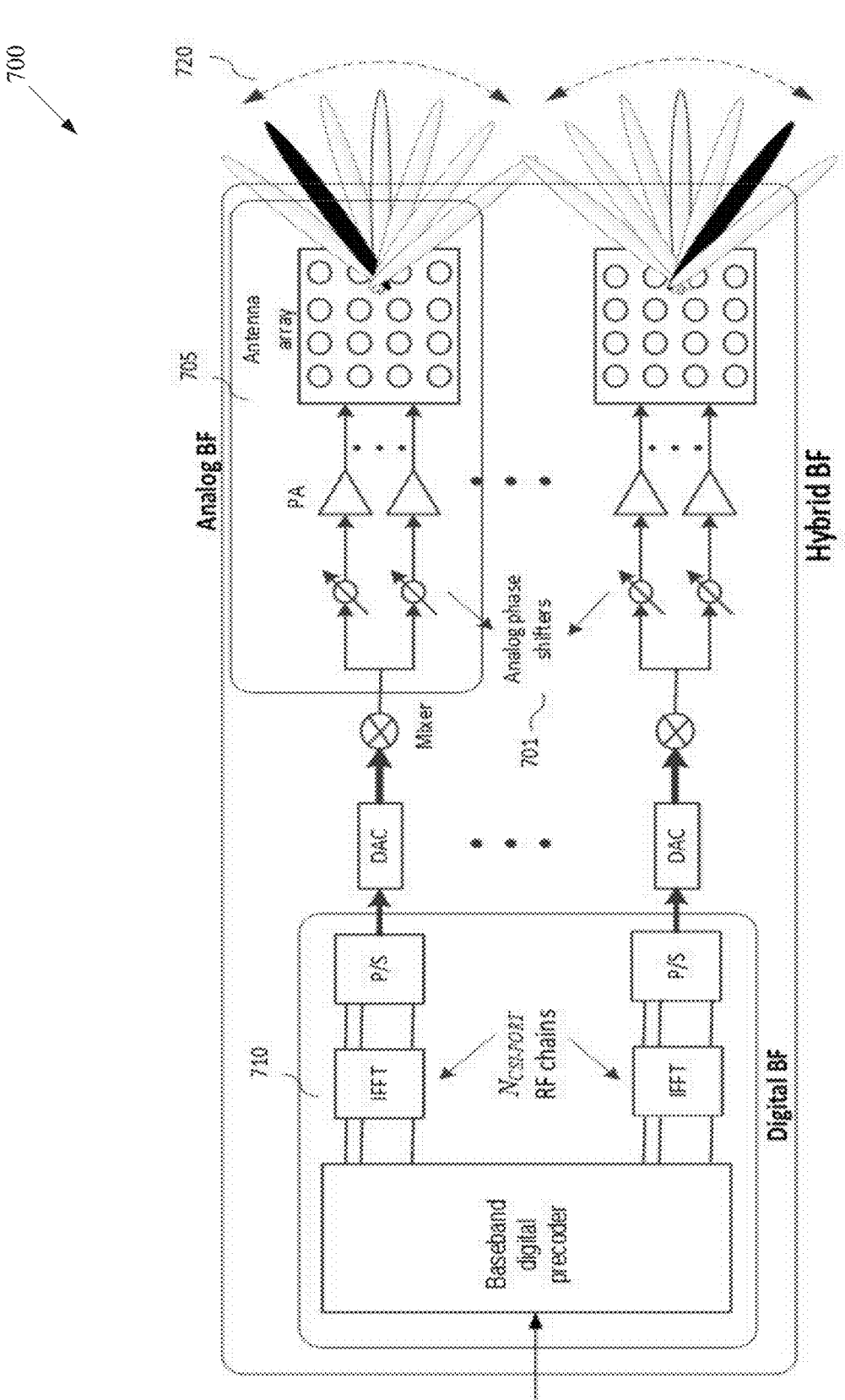
FIG. 7 illustrates an example of antenna structure according to embodiments of the present disclosure.

FIG. 7 illustrates an example antenna structure 700 according to embodiments of the present disclosure. An embodiment of the antenna structure 700 shown in FIG. 7 is for illustration only.

In this case, one CSI-RS port is mapped onto a large number of antenna elements which can be controlled by a bank of analog phase shifters 701. One CSI-RS port can then correspond to one sub-array which produces a narrow analog beam through analog beamforming 705. This analog beam can be configured to sweep across a wider range of angles 720 by varying the phase shifter bank across symbols or subframes. The number of sub-arrays (equal to the number of RF chains) is the same as the number of CSI-RS ports $N_{CSI\text{-}PORT}$. A digital beamforming unit 710 performs a linear combination across $N_{CSI\text{-}PORT}$ analog beams to further increase precoding gain. While analog beams are wideband (hence not frequency-selective), digital precoding can be varied across frequency sub-bands or resource blocks. Receiver operation can be conceived analogously.

Since the aforementioned system utilizes multiple analog beams for transmission and reception (wherein one or a small number of analog beams are selected out of a large number, for instance, after a training duration—to be performed from time to time), the term "multi-beam operation" is used to refer to the overall system aspect. This includes, for the purpose of illustration, indicating the assigned DL or UL TX beam (also termed "beam indication"), measuring at least one reference signal for calculating and performing beam reporting (also termed "beam measurement" and "beam reporting," respectively), and receiving a DL or UL transmission via a selection of a corresponding RX beam.

The aforementioned system is also applicable to higher frequency bands such as >52.6 GHz. In this case, the system can employ only analog beams. Due to the O2 absorption loss around 60 GHz frequency (~10 dB additional loss @100 m distance), larger number of and sharper analog beams (hence larger number of radiators in the array) may be needed to compensate for the additional path loss.

Figure 8:
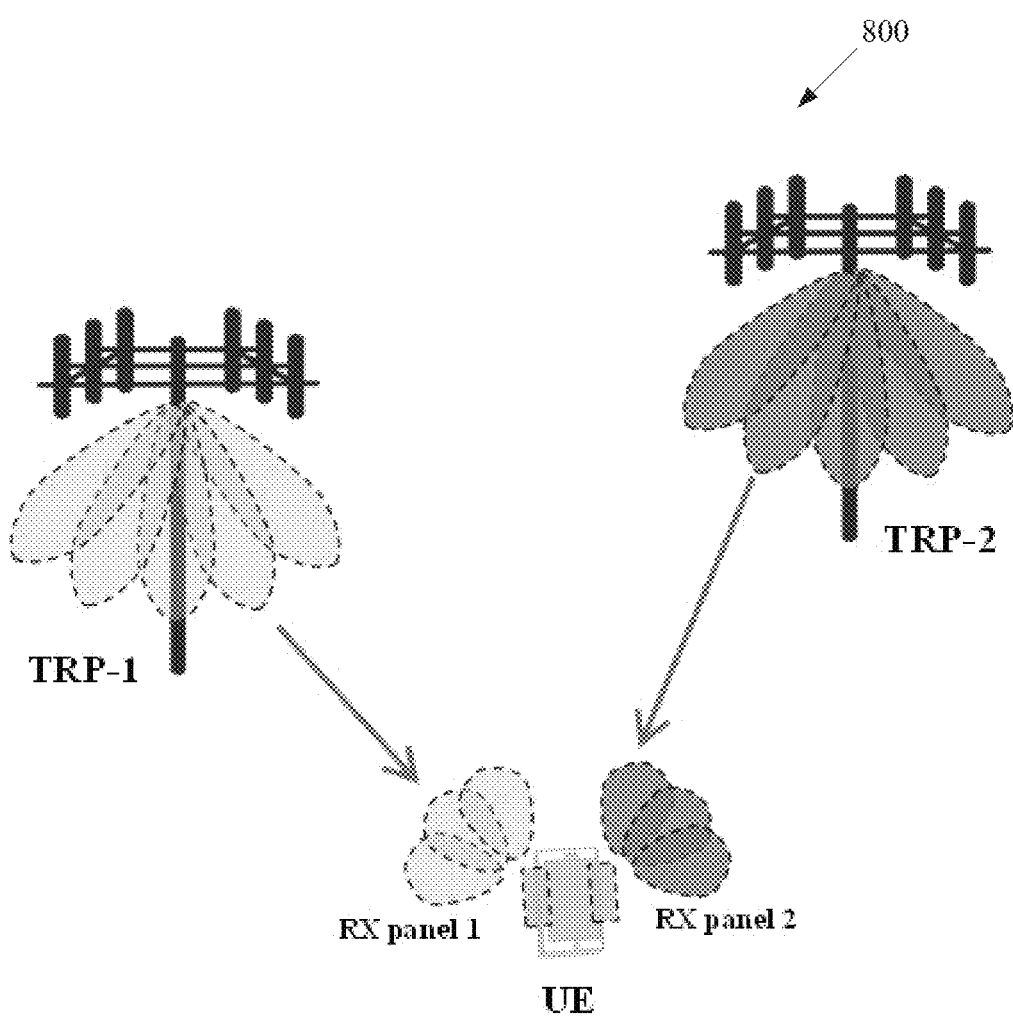
FIG. 8 illustrates an example of multiple transmission and reception point system according to embodiments of the present disclosure.

FIG. 8 illustrates an example of multiple transmission and reception point system 800 according to embodiments of the present disclosure. An embodiment of the multiple transmission and reception point system 800 shown in FIG. 8 is for illustration only.

A UE receives from the network downlink control information through one or more PDCCHs. The UE may use the downlink control information to configure one or more receive parameters/settings to decode subsequent downlink data channels (i.e., PDSCHs) transmitted from the network. Under certain settings, the UE could start receiving and/or decoding the PDSCH after the UE has decoded the PDCCH and obtained the corresponding control information. In this case, the time offset between the reception of the PDCCH and the reception of the PDS CH is beyond a preconfigured threshold, which, e.g., could correspond to the time required for decoding the PDCCH and adjusting the receive parameters. The time offset between the receptions of the PDCCH and the PDSCH could be smaller than the threshold (e.g., the network could send the PDSCH close to the PDCCH in time or even overlapping with the PDCCH in time).

In this case, the UE may not be able to decode the PDSCH because they do not have enough time to decode the PDCCH to set appropriate receive parameters such as the receive spatial filter for receiving/decoding the PDSCH. Hence, there is a need to configure one or more default TCI states for the PDSCH transmission, and therefore, one or more default receive beams for the UE to buffer the PDSCH when the UE is in the process of receiving and/or decoding the PDCCH control information. In a multi-TRP system (depicted in FIG. 8), wherein the UE could simultaneously receive multiple PDSCHs from multiple physically non-co-located TRPs, the configuration of the default TCI state(s)/receive beam(s) could be different from that for the single-TRP operation. Further, the configurations of the default TCI state(s)/receive beam(s) could also be different between single-DCI (or single-PDCCH) and multi-DCI (or multi-PDCCH) based multi-TRP systems.

For the single-PDCCH or single-DCI based multi-TRP operation, if the time offset between the reception of the PDCCH and the reception of the PDSCH is less than the threshold, the UE could assume that the DMRS ports of the PDSCH follow the QCL parameters indicated by the default TCI state(s), which could correspond to the lowest code-point among the TCI codepoints containing two different TCI states activated for the PDSCH. For the multi-PDCCH or multi-DCI based multi-TRP operation (assuming that the CORESETPOOLIndex is configured), if the time offset between the reception of the PDCCH and the reception of the PDSCH is less than the threshold, the UE could assume that the DMRS ports of the PDSCH follow the QCL parameters indicated by the default TCI state(s), which could be used for the PDCCH with the lowest CORESET index among the CORESETs configured with the same value of CORESETPOOLIndex.

The default TCI state(s)/receive beam(s) configurations in the 3GPP Rel. 15/16 assume that the PDCCH and the PDSCH could employ different beams, and therefore, the UE could use different spatial filters to receive the PDCCH and the PDSCH beams. If a common TCI state/beam is used/configured for various types of channels such as PDCCH and PDSCH, the configuration of the default TCI state(s)/receive beam(s) could be different from the existing solutions (described above, relying on lowest CORESET ID/TCI codepoint). Further, whether the UE could simultaneously receive the PDSCHs transmitted from the coordinating TRPs may also be considered when configuring the default TCI state(s) for the multi-TRP operation.

The present disclosure provides various design options for configuring default TCI state(s)/receive beam(s) in both single-DCI and multi-DCI based multi-TRP systems. Specifically, the common TCI state/beam indication is used as the baseline framework to configure the default TCI state(s). The UE could also follow the legacy behavior(s) defined in the 3GPP Rel. 15/16 to determine the default receive beam(s) under certain settings/conditions, which are also discussed in the present disclosure.

Figure 9:
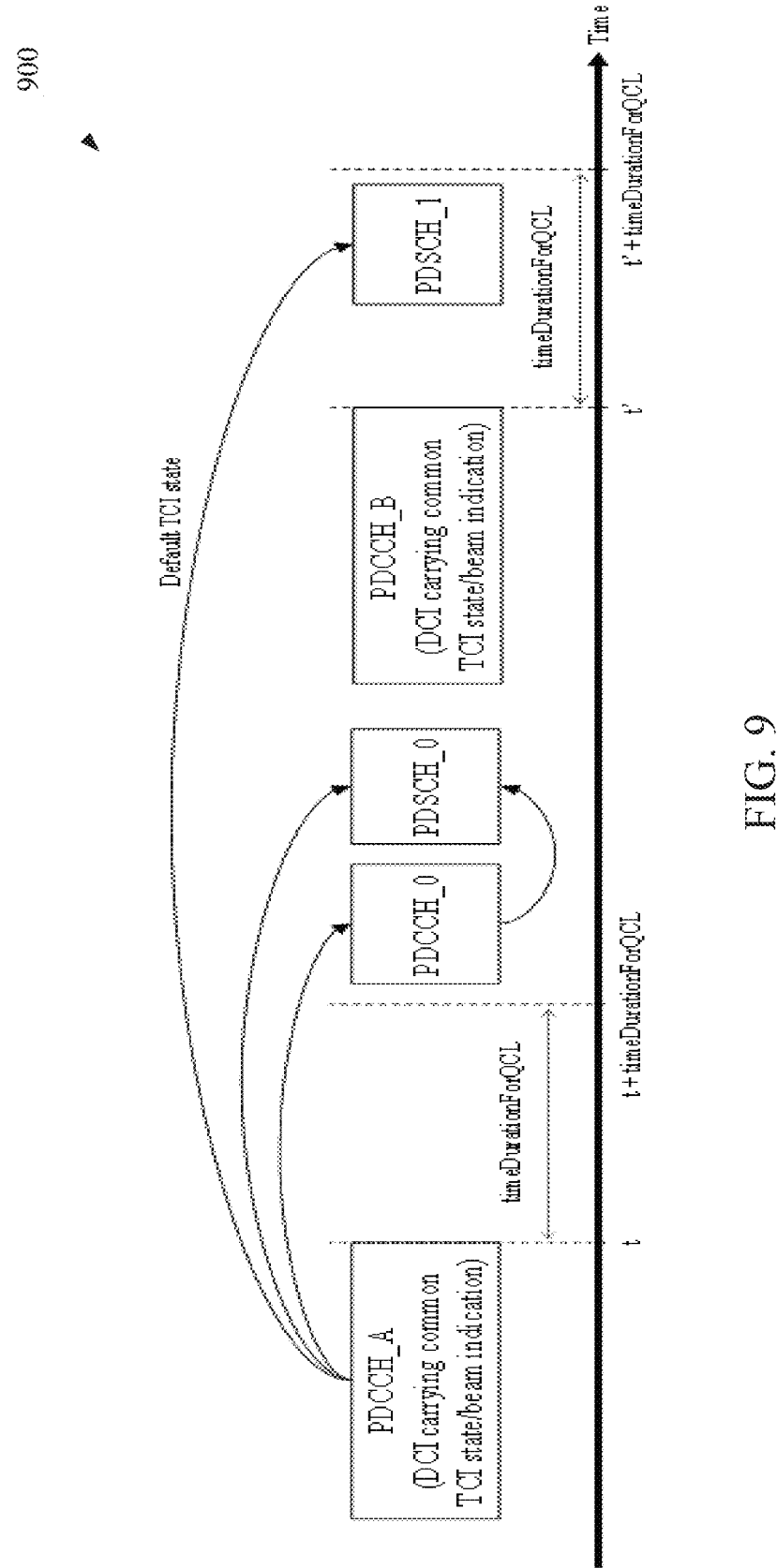
FIG. 9 illustrates an example of determining default TCI state(s) for PDSCH reception according to embodiments of the present disclosure.

FIG. 9 illustrates an example of determining default TCI state(s) for PDSCH reception 900 according to embodiments of the present disclosure. An embodiment of determining the default TCI state(s) for the PDSCH reception 900 shown in FIG. 9 is for illustration only.

The UE could be configured/indicated by the network a common TCI state/beam for various types of channels such as PDCCH and PDSCH. In FIG. 9, a conceptual example of using a DCI to indicate the common TCI for both the PDCCH and the PDSCH is presented. The common TCI signaled in the DCI at time t may become effective at t+timeDurationForQCL. As illustrated in the example shown in FIG. 9, the UE could be able to first decode PDCCH_A (conveying the DCI that indicates the common TCI) and obtain the necessary QCL parameters.

The UE could then follow the QCL parameters and set appropriate receive parameters such as the receive spatial filter to receive and decode PDCCH_0 and PDSCH_0. The UE, however, is not able to set the receive parameters according to the QCL configured in PDCCH_B (conveying the DCI that indicates the common TCI) to decode PDSCH_1 because the time offset between the reception of PDCCH_B and that of PDSCH_1 is less than timeDuration-ForQCL. Hence, the UE may need to follow the QCL indications in the default TCI state to set appropriate receive parameters such as the receive spatial filter (default receive beam). For example, the default TCI state could correspond to the common TCI indicated/configured in PDCCH_A. There could be various other means to configure the default TCI state(s)/receive beam(s) depending on whether/how the common TCI state/beam is indicated and/or simultaneous PDSCH reception requirement for the multi-TRP operation.

FIGS. 10 to 15 illustrate examples of the common TCI states/beams indication in a multi-TRP system 1000 to 1500 according to embodiments of the present disclosure. Embodiments of the common TCI states/beams indication in a multi-TRP system 1000 to 1500 shown in FIGS. 10 to 15 are for illustration only.

In the multi-DCI based multi-TRP system, different coordinating TRPs (e.g., TRP-1 and TRP-2 in FIG. 8) could transmit to the UE separate PDCCHs (and therefore, separate PDSCHs) associated with different values of the higher layer signaling index CORESETPOOLIndex (if configured). For example, TRP-1 in FIG. 8 could transmit PDCCH-1 to the UE, and TRP-2 could transmit PDCCH-2 to the UE; PDCCH-1 could be associated with "CORESET-POOLIndex=0" while PDCCH-2 could be associated with "CORESETPOOLIndex=1."

Figure 10:
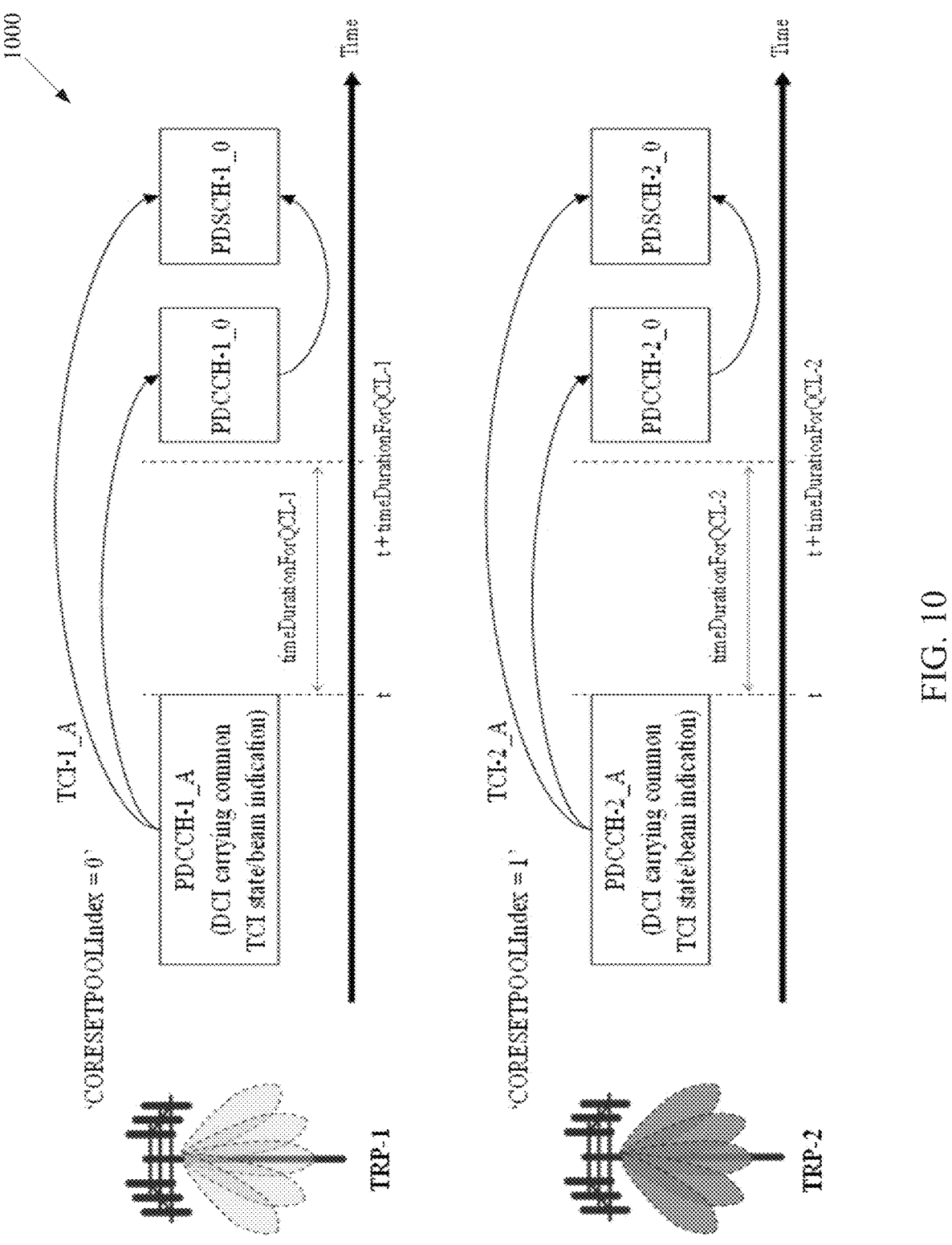
FIGS. 10 to 15 illustrate examples of determining default TCI state(s) for PDSCH reception in a multi-TRP system according to embodiments of the present disclosure.

Further, if the common TCI state/beam indication is enabled for the multi-TRP operation, the UE could be configured with multiple common TCI states/beams (N_tci>1), each corresponding to a coordinating TRP. Under the multi-DCI framework, the common TCI states/beams, and therefore, their indicating PDCCHs, could also be associated with the CORESETPOOLIndex. In FIG. 10, a conceptual example characterizing the common TCI states/beams indication in a multi-TRP system comprising of two coordinating TRPs is provided. As illustrated in FIG. 10, PDCCH-1_A is from TRP-1 and indicates to the UE the common TCI state/beam from TRP-1 (TCI-1_A).

Further, PDCCH-1_A is associated with "CORESET-POOLIndex=0." PDCCH-1_B indicates to the UE the common TCI state/beam from TRP-2 (TCI-2_A), and is associated with "CORESETPOOLIndex=1." The UE could set the receive spatial filter based on TCI-1_A for receiving and/or decoding PDCCH-1_0 and PDSCH-1_0 because the time offsets between them and PDCCH-1_A are less than timeDurationForQCL-1. Similarly, the UE could also be able to set appropriate receive spatial filter to receive and/or decode PDCCH-2_0 and PDSCH-2_0 from TRP-2 as the UE could have enough time (time offsets are less than timeDurationForQCL-2) to decode PDCCH-2_A first and extract the necessary QCL configurations/assumptions for decoding the subsequent PDCCH/PDSCH transmissions. The two thresholds timeDurationForQCL-1 and timeDurationForQCL-2 for TRP-1 and TRP-2 could be common or different. For instance, the UE could use different receive panels with different array configurations to receive the PDCCHs/PDSCHs from different coordinating TRPs, resulting in different thresholds for different TRPs.

Figure 11:
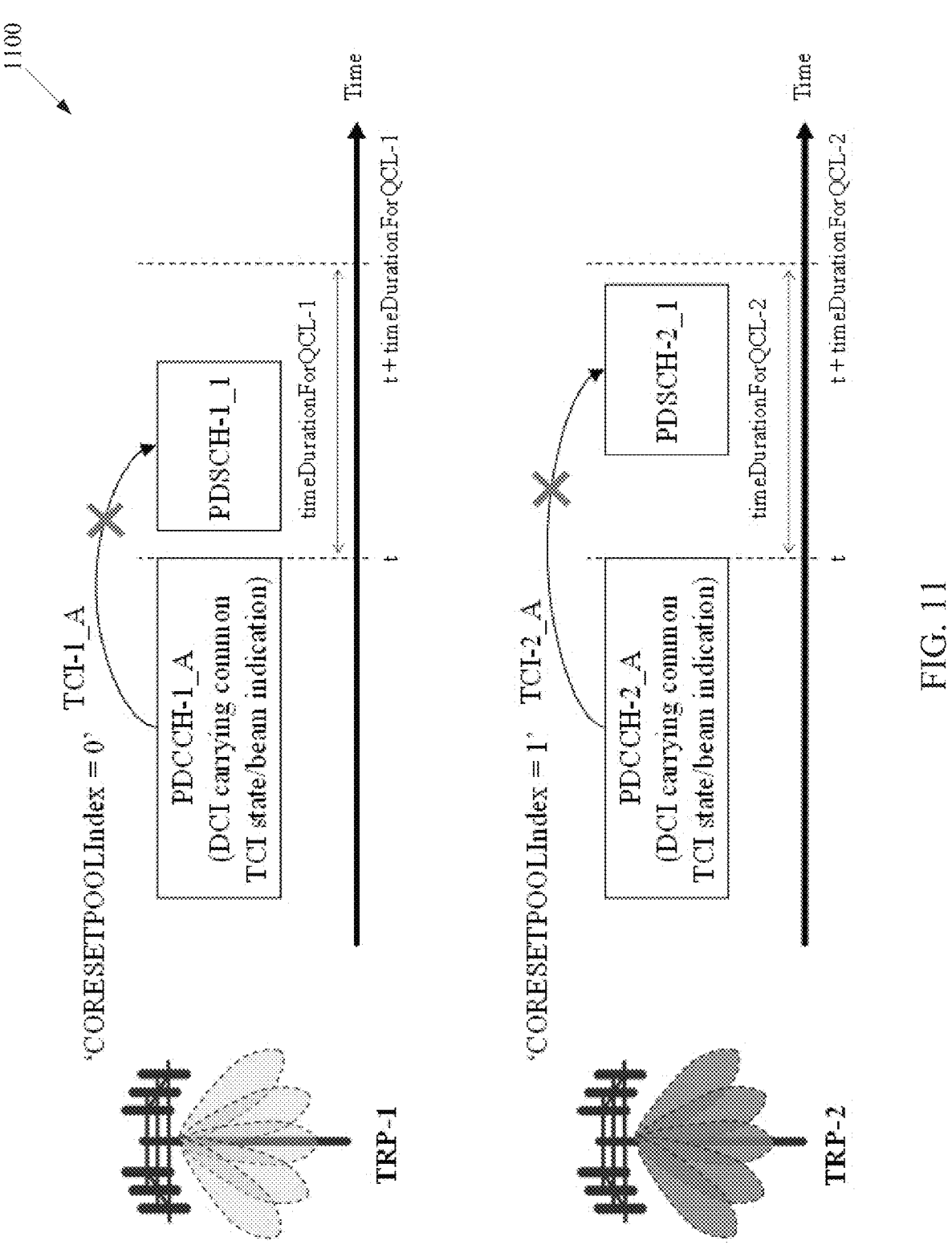

In FIG. 11, another example depicting the common TCI states/beams indication in a multi-TRP system is presented. In this example, prior to fully decoding PDCCH-1_A, the UE may receive PDSCH-1_1 from TRP-1 (their time offset is less than timeDurationForQCL-1), and prior to fully decoding PDCCH-2_A, the UE may receive PDSCH-2_1 from TRP-2 (their time offset is less than timeDurationForQCL-2). In this case, the UE may need to set appropriate spatial receive filters (default receive beams) to buffer PDSCH-1_1 and PDSCH-2_1 without relying on the common TCI states/beams indicated in PDCCH-1_A and PDCCH-2_A. In the following, various design options to configure default TCI states/beams for the PDSCH transmissions (or equivalently, to determine default receive beams for the UE to buffer the PDSCHs) in the multi-DCI based multi-TRP system are presented.

In one example of Option-1, if the CORESETPOOLIndex is configured and the time offset between the reception of a first PDCCH carrying the common TCI state/beam indication (e.g., PDCCH-1_A in FIG. 11) and the reception of the PDSCH (e.g., PDSCH-1_1 in FIG. 11) is less than the threshold (e.g., timeDurationForQCL-1 in FIG. 11), the UE could assume that the QCL parameters for the DMRS ports of the PDSCH follow those of the default TCI state/beam, which could correspond to the previous common TCI state/beam indicated in a second PDCCH, which is associated with the same CORESETPOOLIndex (value) as that associated with the first PDCCH.

Figure 12:
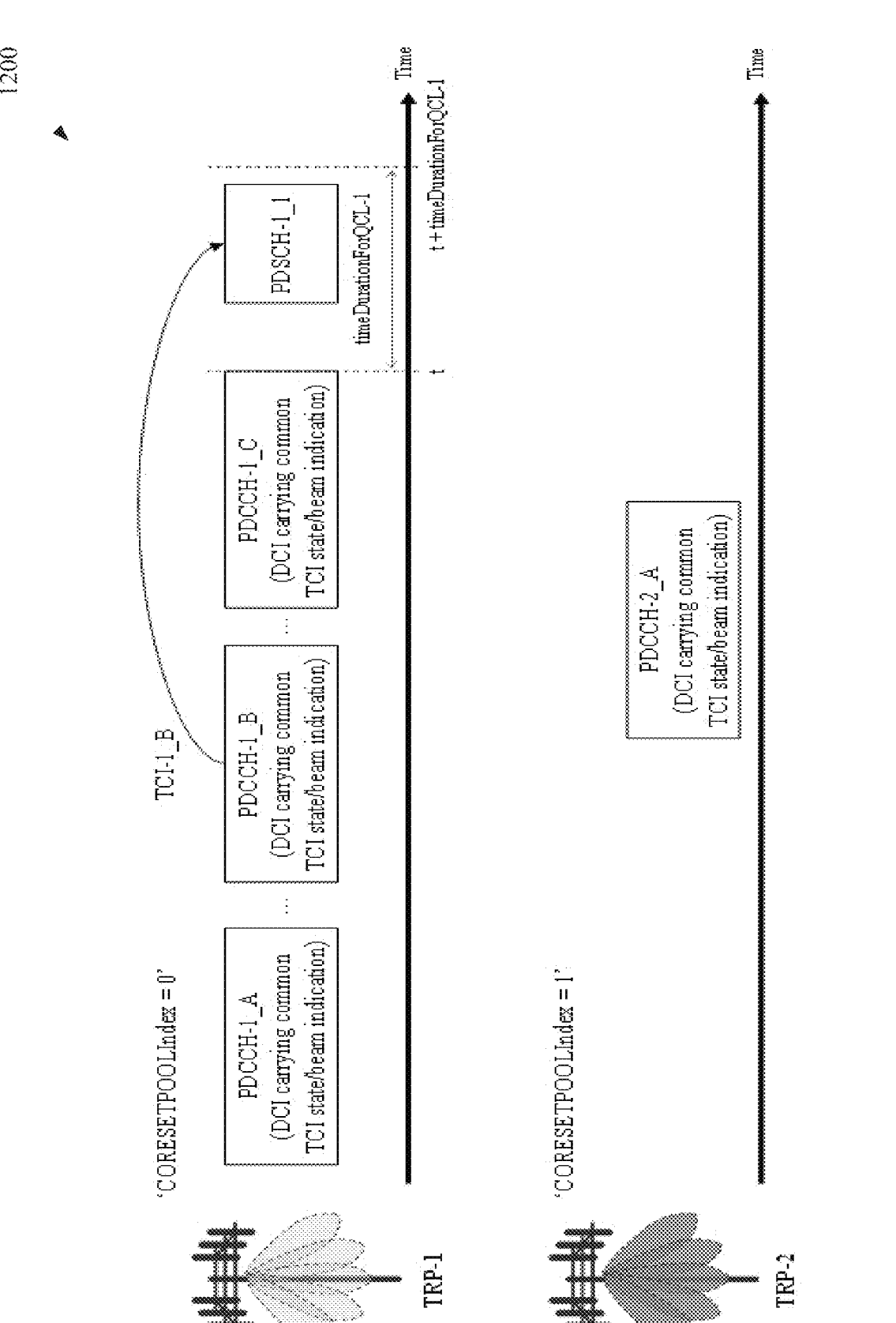

In FIG. 12, a conceptual example illustrating Option-1 is given. As indicated in FIG. 12, the UE cannot use the common TCI state/beam indicated in PDCCH-1_C (the first PDCCH in Option-1) to set the receive parameter(s) for decoding PDSCH-1_1 because their time offset is less than timeDurationForQCL-1. According to Option-1, the default TCI state for PDSCH-1_1 in this example is the common TCI state (TCI-1_B) indicated in PDCCH-1_B (the second PDCCH in Option-1). This is because the time offset between the reception of PDCCH-1_B and that of PDSCH-1_1 is beyond timeDurationForQCL-1, and PDCCH-1_B and PDCCH-1_C share the same CORESETPOOLIndex ("0"), i.e., both of them are transmitted from the same TRP-1. Further, PDCCH-1_B is the closest to PDSCH-1_1 in time among all PDCCHs from TRP-1 that carry the common TCI state/beam indications and have been decoded by the UE. Note that in this case, the common TCI state/beam indicated in PDCCH-2_A cannot be configured as the default TCI state/beam for PDSCH-1_1 because the common TCI state/beam is associated with a different value of CORESETPOOLIndex ("1").

In one example of Option-2, if the time offset between the reception of the PDCCH carrying the common TCI state/beam indication (e.g., PDCCH-1_A in FIG. 11) and the reception of the PDSCH (e.g., PDSCH-1_1 in FIG. 11) is less than the threshold (e.g., timeDurationForQCL-1 in FIG. 11), the UE could assume that the QCL parameters for the DMRS ports of the PDSCH follow those of the default TCI state/beam, which could correspond to the previous common TCI state/beam indicated to the UE regardless of the transmitting TRP. This design option does not depend on whether the CORESETPOOLIndex is configured.

Figure 13:
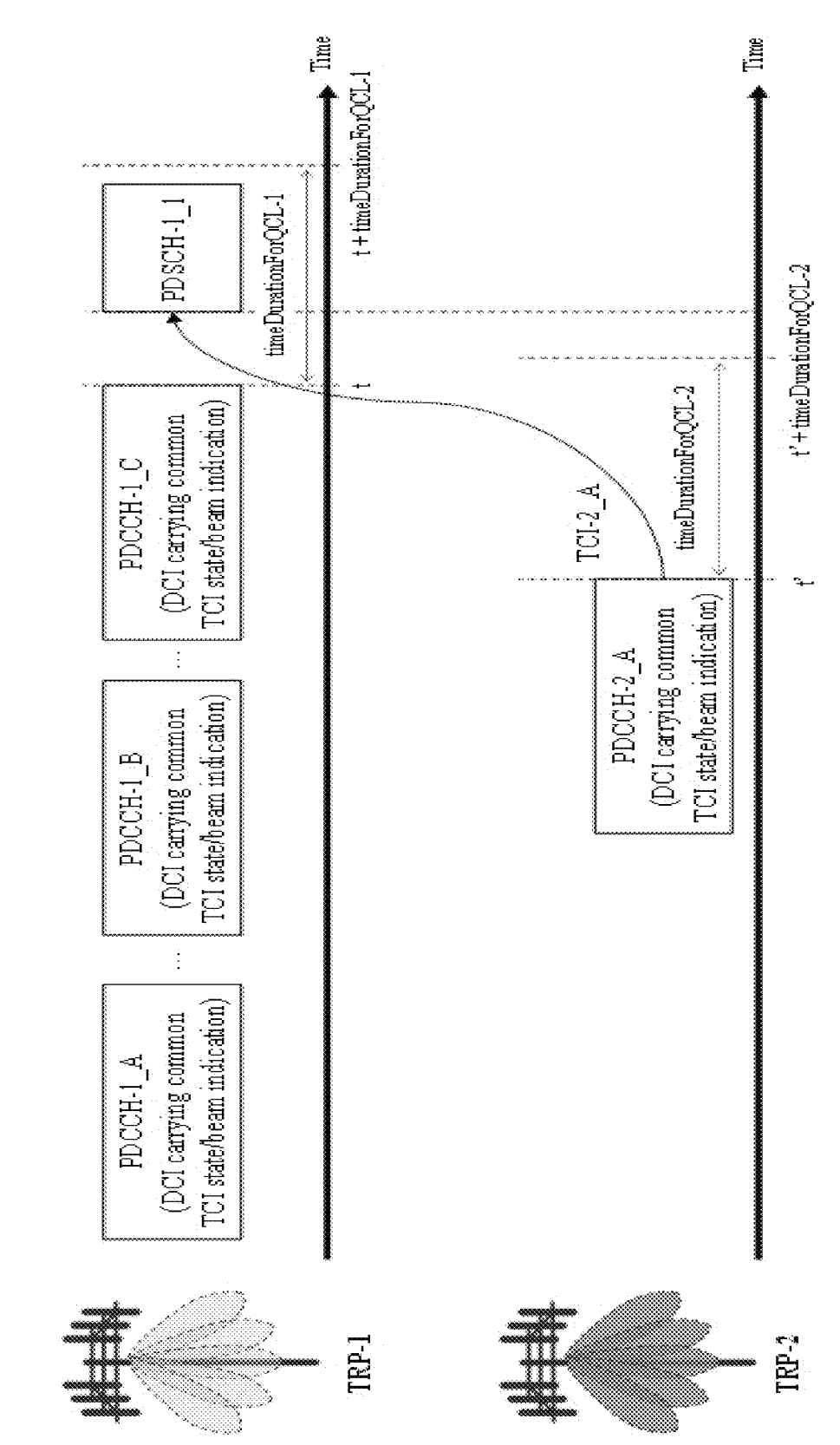

In FIG. 13, a conceptual example characterizing Option-2 is provided. Different from the example for Option-1 shown in FIG. 12, the CORESETPOOLIndex is not configured for the multi-DCI based multi-TRP system. Hence, the default TCI state/beam for PDSCH-1_1 from TRP-1 could correspond to the previous common TCI state/beam indicated to the UE. In this example, the previous common TCI state/beam indicated to the UE is TCI-2_A indicated in PDCCH-2_A from TRP-2. That is, PDCCH-2_A is the closest PDCCH to PDSCH-1_1 in time among all the PDCCHs from both TRP-1 and TRP-2 that carry the common TCI state/beam indications and have been decoded by the UE.

In one example of Option-3, if the CORESETPOOLIndex is configured and the time offset between the reception of a first PDCCH carrying the common TCI state/beam indication (e.g., PDCCH-1_A in FIG. 11) and the reception of the PDSCH (e.g., PDSCH-1_1 in FIG. 9) is less than the threshold (e.g., timeDurationForQCL-1 in FIG. 11), the UE could assume that the QCL parameters for the DMRS ports of the PDSCH follow those of the default TCI state/beam, which could be used for the latest PDCCH carrying the common TCI state/beam indication (a third PDCCH) associated with the same CORESETPOOLIndex (value) as that associated with the first PDCCH.

Figure 14:
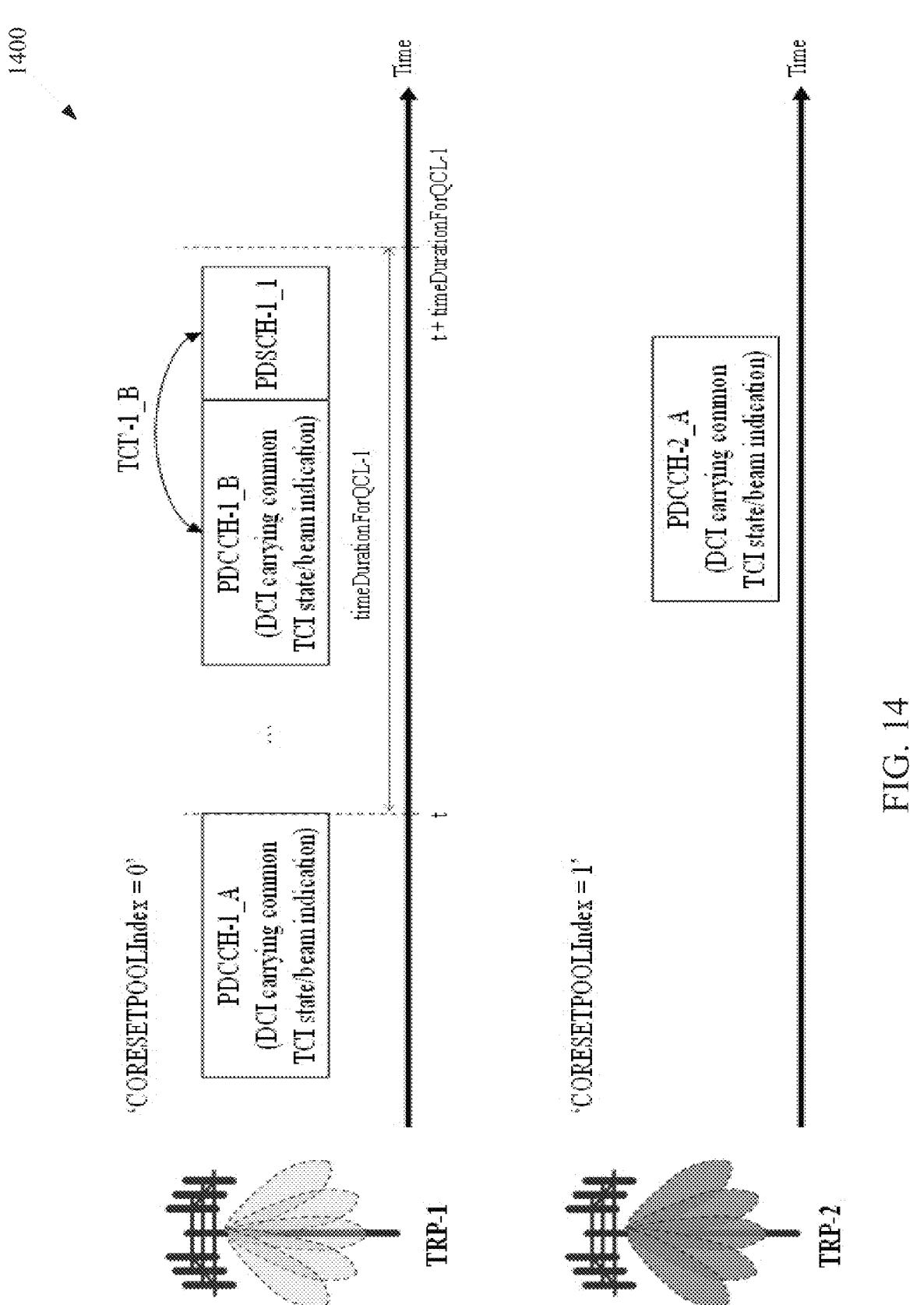

In FIG. 14, a conceptual example of Option-3 default TCI state/beam configuration in a multi-DCI based multi-TRP system is presented. In this example, the UE cannot set the receive spatial filter to receive and/or decode PDSCH-1_1 according to the common TCI state/beam indicated in PDCCH-1_A because their time offset is less than timeDurationForQCL-1. The UE, however, could use the same spatial receive filter as that used for receiving PDCCH-1_B to receive and/or decode PDSCH-1_1. This is because for PDSCH-1_1, PDCCH-1_B is the latest PDCCH carrying the common TCI state/beam indication and shares the same CORESETPOOLIndex (value) with PDCCH-1_A. Hence, based on Option-3, the UE may assume the same TCI state (and therefore the corresponding QCL parameters) for the DMRS ports of PDSCH-1_1 as that used for PDCCH-1_B (TCI'-1_B). Note that TCI'-1_B for PDCCH-1_B could be activated by MAC-CE from a pool of TCI states configured by RRC signaling. Further, in this example, if PDCCH-1_B is not present, the TCI state used for PDCCH-1_A could be the default TCI state for PDSCH-1_1 because now PDCCH-1_A becomes the "third PDCCH" in Option-3.

In one example of Option-4, if the time offset between the reception of a first PDCCH carrying the common TCI state/beam indication (e.g., PDCCH-1_A in FIG. 11) and the reception of the PDSCH (e.g., PDSCH-1_1 in FIG. 11) is less than the threshold (e.g., timeDurationForQCL-1 in FIG. 11), the UE could assume that the QCL parameters for the DMRS ports of the PDSCH follow those of the default TCI state/beam, which could be used for the latest PDCCH carrying the common TCI state/beam indication (a fourth PDCCH) regardless of the transmitting TRP. This design option does not depend on whether the CORESETPOOLIndex is configured.

Figure 15:
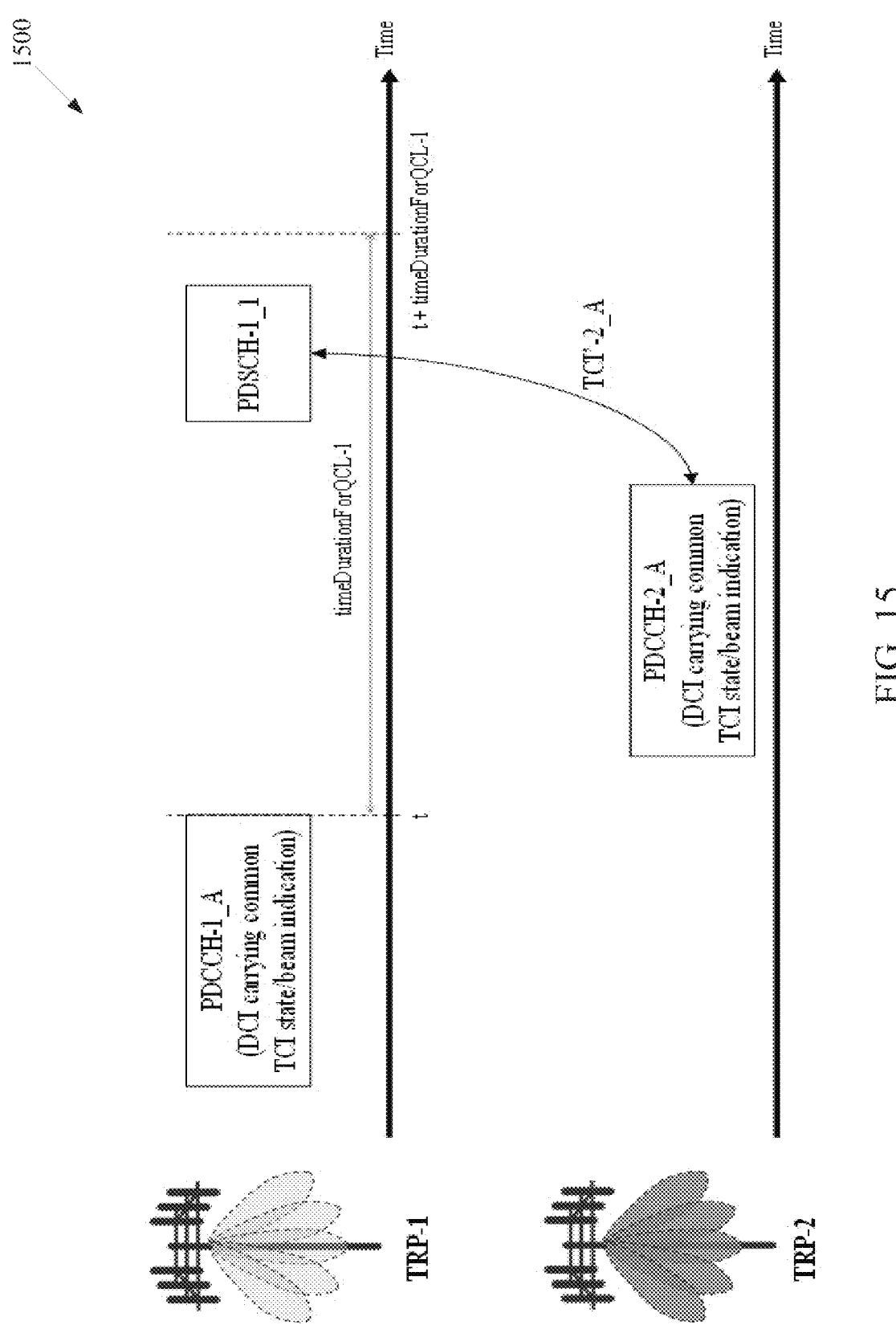

The example shown in FIG. 15 assumes that the CORESETPOOLIndex is not configured, and the latest PDCCH that conveys the common TCI state/beam with respect to the PDSCH of interest, i.e., PDSCH-1_1 from TRP-1, is PDCCH-2_A from TRP-2. Based on Option-4, the default TCI state for PDSCH-1_1 could therefore be configured as TCI'-2_A used for PDCCH-2_A. That is, the UE could use the same receive parameters to receive PDSCH-1_1 as those used for receiving PDCCH-2_A.

In one example of Option-5, the configuration of the default TCI state/beam for PDSCH follows the legacy procedure defined in the 3GPP Rel. 16 for multi-DCI based multi-TRP. If the CORESETPOOLIndex is configured and the time offset between the reception of a first PDCCH carrying the common TCI state/beam indication (e.g., PDCCH-1_A in FIG. 11) and the reception of the PDSCH (e.g., PDSCH-1_1 in FIG. 11) is less than the threshold (e.g., timeDurationForQCL-1 in FIG. 11), the UE could assume that the QCL parameters for the DMRS ports of the PDSCH follow those of the default TCI state/beam, which could be used for the latest PDCCH with the lowest CORESET index among the CORESETs configured with the same value of CORESETPOOLIndex as that associated with the first PDCCH.

In one example of Option-6, the configuration of the default TCI state/beam for PDSCH follows the legacy procedure defined in the 3GPP Rel. 15. If the time offset between the reception of a first PDCCH carrying the common TCI state/beam indication (e.g., PDCCH-1_A in FIG. 11) and the reception of the PDSCH (e.g., PDSCH-1_1 in FIG. 11) is less than the threshold (e.g., timeDuration-ForQCL-1 in FIG. 11), the UE could assume that the QCL parameters for the DMRS ports of the PDSCH follow those of the default TCI state/beam, which could be used for the PDCCH with the lowest CORESET index among the CORESETs associated with a monitored search space in the latest slot. This design option does not depend on whether the CORESETPOOLIndex is configured.

In one example of Option-7, if the UE is provided, e.g., in PDCCH-Config, two values of CORESETPoolIndex (i.e., 0 and 1), and when the scheduling/time offset between the reception of a PDCCH in a CORESET associated with a value of CORESETPoolIndex and the reception of a PDSCH—e.g., scheduled by the PDCCH—is less than a threshold (e.g., timeDurationforQCL), wherein the PDCCH could carry a DCI (e.g., DCI format 1_1 or 1_2 with or without DL assignment) indicating one or more joint or separate DL/UL TCI states by one or more TCI codepoints for UE-dedicated reception on PDSCH/PDCCH or dynamic-grant/configured-grant based PUSCH and all of dedicated PUCCH resources.

For example, the UE could assume the DMRS ports of the PDSCH are quasi co-located (QCL'ed) with the reference signals provided in two default TCI states—a first default TCI state and a second default TCI state, wherein the first (or second) default TCI state/beam could be a joint or separate DL TCI state indicated for receiving the PDCCH in a CORESET associated with a value (e.g., 0) of CORESET-PoolIndex, and the second (or first) default TCI state/beam could be a joint or separate DL TCI state indicated for receiving PDCCH in a CORESET associated with a different value (e.g., 1) of CORESETPoolIndex.

For another example, the UE could assume the DMRS ports of the PDSCH are quasi co-located (QCL'ed) with the reference signals provided in a default TCI state, wherein the default TCI state/beam could be a joint or separate DL TCI state indicated for receiving the PDCCH in a CORESET associated with value 0 of CORESETPoolIndex.

Yet for another example, the UE could assume the DMRS ports of the PDSCH are quasi co-located (QCL'ed) with the reference signals provided in a default TCI state, wherein the default TCI state/beam could be a joint or separate DL TCI state indicated for receiving the PDCCH in a CORESET associated with value 1 of CORESETPoolIndex.

Yet for another example, if the PDSCH is associated with value 0 of CORESETPoolIndex, the UE could assume the DMRS ports of the PDSCH are quasi co-located (QCL'ed) with the reference signals provided in a default TCI state, wherein the default TCI state/beam could be a joint or separate DL TCI state indicated for receiving PDCCH in a CORESET associated with value 0 (or 1) of CORESET-PoolIndex.

Yet for another example, if the PDSCH is associated with value 1 of CORESETPoolIndex, the UE could assume the DMRS ports of the PDSCH are quasi co-located (QCL'ed) with the reference signals provided in a default TCI state, wherein the default TCI state/beam could be a joint or separate DL TCI state indicated for receiving PDCCH in a CORESET associated with value 1 (or 0) of CORESET-PoolIndex.

In one example of Option-8, the UE could be provided, e.g., in PDCCH-Config, two values of CORESETPoolIndex (i.e., 0 and 1). The UE could receive a first group of one or more PDCCHs/PDCCH candidates in one or more CORE-SETs associated with value 0 of CORESETPoolIndex, and a second group of one or more PDCCHs/PDCCH candidates in one or more CORESETs associated with value 1 of CORESETPoolIndex. When the scheduling/time offset between the reception of a PDSCH—e.g., scheduled by one or more of the PDCCHs in the first or second group—and the reception of each of the PDCCHs in the first or second group is less than a threshold (e.g., timeDurationforQCL), For example, the UE could assume the DMRS ports of the PDSCH are quasi co-located (QCL'ed) with the reference signals provided in two default TCI states—a first default TCI state and a second default TCI state, wherein the first (or second) default TCI state/beam could be a joint or separate DL TCI state indicated for receiving the PDCCH that starts the earliest in time or ends the latest in time among the PDCCHs in the first group, and the second (or first) default TCI state/beam could be a joint or separate DL TCI state indicated for receiving the PDCCH that starts the earliest in time or ends the latest in time among the PDCCHs in the second group.

For another example, the UE could assume the DMRS ports of the PDSCH are quasi co-located (QCL'ed) with the reference signals provided in a default TCI state, wherein the default TCI state/beam could be a joint or separate DL TCI state indicated for receiving the PDCCH that starts the earliest in time or ends the latest in time among the PDCCHs in the first group.

Yet for another example, the UE could assume the DMRS ports of the PDSCH are quasi co-located (QCL'ed) with the reference signals provided in a default TCI state, wherein the default TCI state/beam could be a joint or separate DL TCI state indicated for receiving the PDCCH that starts the earliest in time or ends the latest in time among the PDCCHs in the second group.

Yet for another example, if the PDSCH is associated with value 0 of CORESETPoolIndex, the UE could assume the DMRS ports of the PDSCH are quasi co-located (QCL'ed) with the reference signals provided in a default TCI state, wherein the default TCI state/beam could be a joint or separate DL TCI state indicated for receiving the PDCCH that starts the earliest in time or ends the latest in time among the PDCCHs in the first (or second) group.

Yet for another example, if the PDSCH is associated with value 1 of CORESETPoolIndex, the UE could assume the DMRS ports of the PDSCH are quasi co-located (QCL'ed) with the reference signals provided in a default TCI state, wherein the default TCI state/beam could be a joint or separate DL TCI state indicated for receiving the PDCCH that starts the earliest in time or ends the latest in time among the PDCCHs in the second (or first) group.

Yet for another example, the UE could assume the DMRS ports of the PDSCH are quasi co-located (QCL'ed) with the reference signals provided in a default TCI state, wherein the default TCI state/beam could be a joint or separate DL TCI state indicated for receiving the PDCCH that starts the earliest in time or ends the latest in time among all the PDCCHs in the first and second groups.

Figure 16:
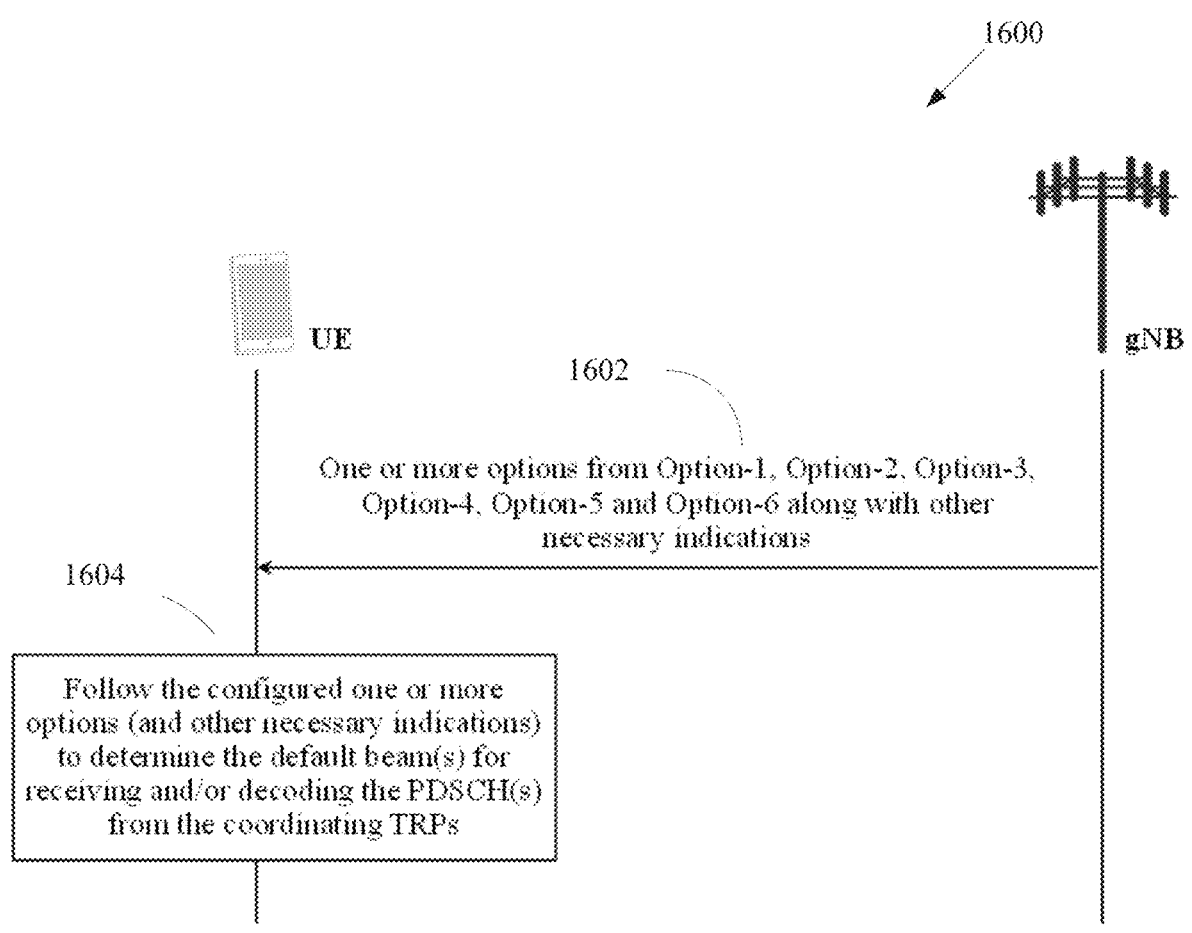
FIGS. 16 to 18 illustrate examples of signaling flows for determining default TCI state(s) for PDSCH reception in a multi-TRP system according to embodiments of the present disclosure.
Figure 17:
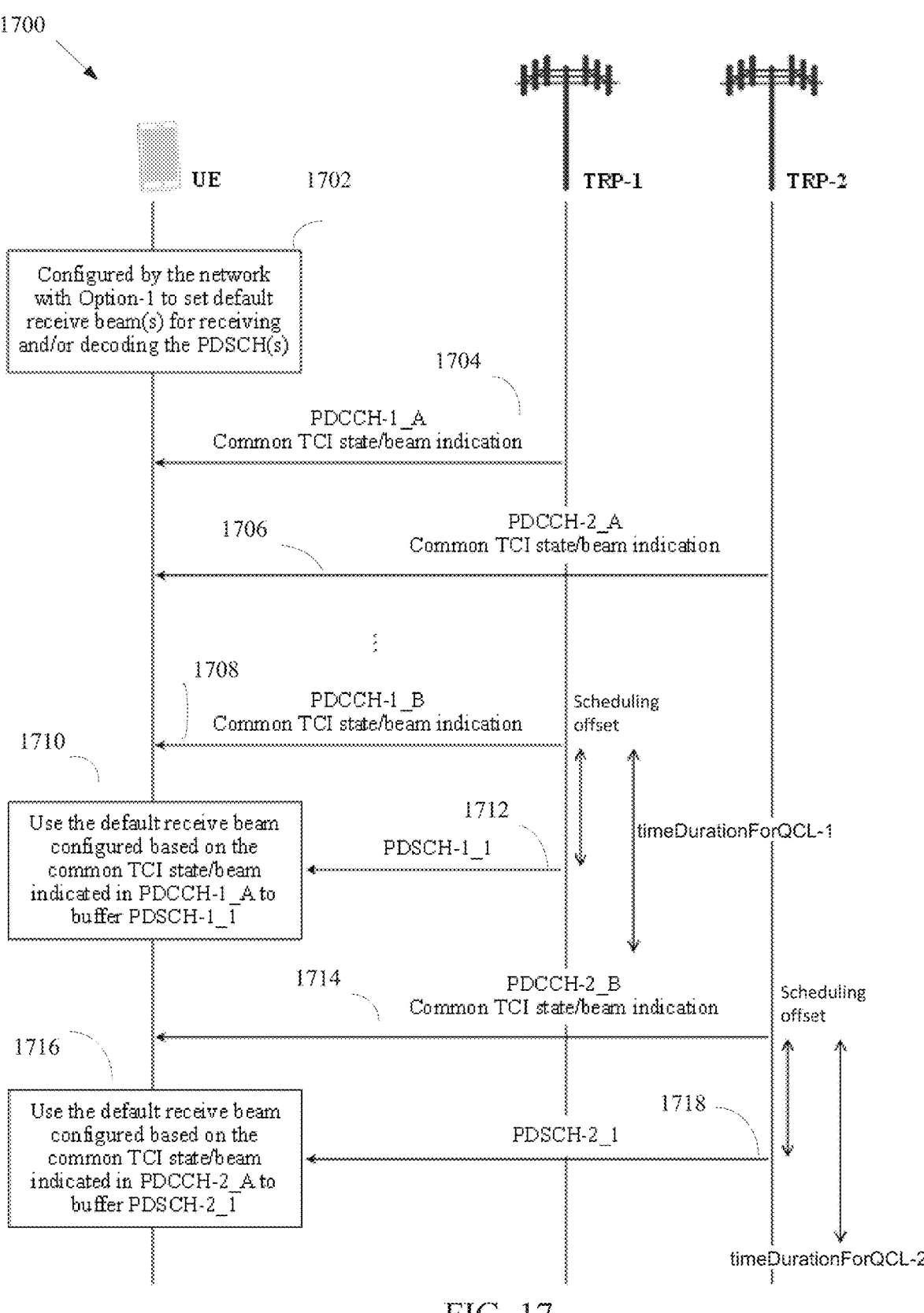
Figure 18:
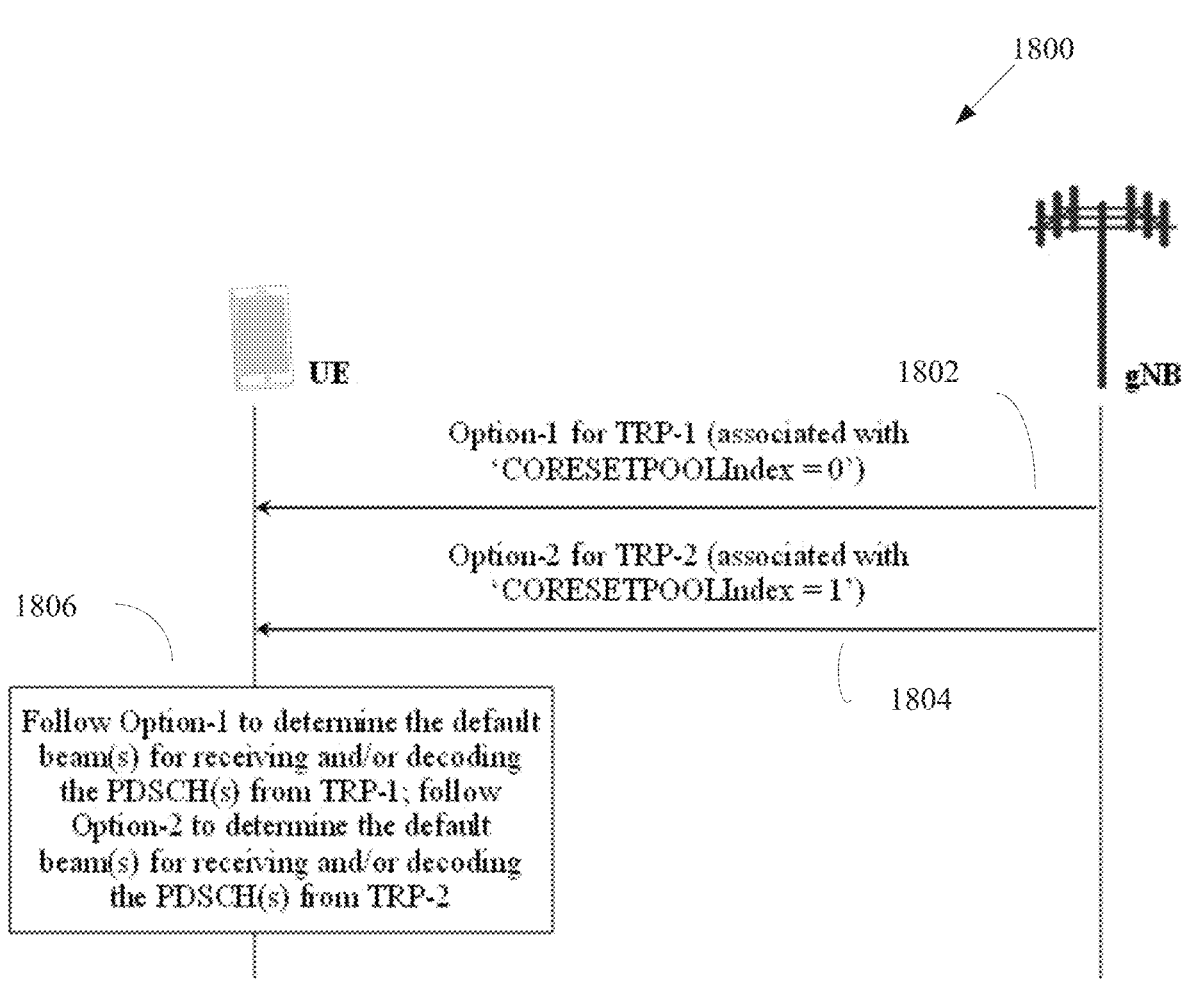

FIGS. 16 to 18 illustrate example of signaling flows for a multi-DCI based multi-TRP system 1600 to 1800 according to embodiments of the present disclosure. The signaling flows 1600 to 1800 as may be performed by a UE (e.g., 111-116 as illustrated in FIG. 1) and a BS (e.g., 101-103 as illustrated in FIG. 1). Embodiments of the signaling flows for a multi-DCI based multi-TRP system 1600 to 1800 shown in FIGS. 16 to 18 are for illustration only. One or more of the components illustrated in FIGS. 16 to 18 can be implemented in specialized circuitry configured to perform the noted functions or one or more of the components can be implemented by one or more processors executing instructions to perform the noted functions.

The UE could be configured by the network one or more design options described above to configure the default beam(s) for receiving the PDSCH(s) in a multi-DCI based multi-TRP system (see FIG. 16). In the following, four configuration methods are discussed.

In one example of method-I, the UE is indicated by the network to follow only one design option, e.g., Option-1, to configure the default receive beam(s) for receiving and/or decoding the PDSCH(s). The configured design option applies to all of the coordinating TRPs in the multi-TRP system.

As illustrated in FIG. 16, in step 1602, a gNB send necessary indications based on options provided in the present disclosure. In step 1604, a UE follows the configuration based on the option provided by the gNB in order to determine the default beam(s) for receiving and/or decoding the PDSCH(s) from the coordinating TRPS.

In FIG. 17, the signaling procedure of configuring and determining the default TCI state(s)/beam(s) following Option-1 for both coordinating TRPs (TRP-1 and TRP-2) in a multi-DCI based multi-TRP system is depicted. In this example, the UE is indicated by the network to only follow Option-1 to configure the default receive beams for receiving and/or decoding the PDSCHs from both TRP-1 and TRP-2. For instance, according to Option-1, the UE may configure the receive spatial filter following the QCL parameters of the common TCI state/beam indicated in PDCCH_1-A to buffer PDSCH_1-1 from TRP-1. This is because the scheduling offset between PDCCH_1-B and PDSCH_1-1 is less than timeDurationForQCL-1 and PDCCH_1-A is the previous PDCCH that carries a common TCI state/beam indication. Similarly, the UE may configure the receive spatial filter following the QCL parameters of the common TCI state/beam indicated in PDCCH_2-A to buffer PDSCH 2-1 from TRP-2.

As illustrated in FIG. 17, in step 1702, a UE is configured by the network to set default receive beams. In step 1704, a TRP-1 sends PDCCH-1_A common TCI state/beam indication. In step 1706, a TRP-2 sends PDCCH-2_A common TCI state/beam indication. In step 1708, the TRP-1 sends PDCCH-1_B common TCI state/beam indication to the UE. In step 1710, the UE uses the default receive beam configured based on the common TCI state/beam indicated in PDCCH-1_A to buffer PDSCH-1_1. In step 1712, the TRP-1 sends the PDSCH-1_1. In step 1714, the TRP-2 sends the PDCCH-2_B common TCI state/beam indication. In step 1716, the UE uses the default receive beam configured based on the common TCI state/beam indicated in PDCCH-2_A to buffer PDSCH-2_1. In step 1718, the TRP-2 sends PDSCH-2_1. To the UE.

In one example of Method-II, the UE is indicated by the network to follow only one design option per TRP, or per CORESETPOOLIndex, to configure the default receive beam(s) for receiving and/or decoding the PDSCH(s). The design options configured for different TRPs (or different values of CORESETPOOLIndex) could be different. For instance, for a multi-DCI based multi-TRP system comprising of two coordinating TRPs (TRP-1 and TRP-2), the UE could be indicated by the network to follow Option-1 to configure the default receive beam for buffering the PDSCH from TRP-1, and Option-2 to configure the default receive beam for buffering the PDSCH from TRP-2 (see FIG. 18). For another example, assuming that the common TCI state/beam indication is enabled for TRP-1 but not for TRP-2, the UE could be indicated by the network to follow Option-1 to configure the default receive beam for buffering the PDSCH from TRP-1, and Option-5 to configure the default receive beam for buffering the PDSCH from TRP-2.

As illustrated in FIG. 18, in step 1802, a gNB sends an indication for TRP-1 (e.g., associated with the "CORESET-POOLIndex=0"). In step 1804, the gNB sends an indication for TRP-2 (e.g., associated with the "CORESETPOOLIndex=1"). In step 1806, the UE follows the indications to determine the default beam(s) for receiving and/or decoding the PDSCH(s) from the TRP-1 and follows the indications to determine the default beam(s) for receiving and/or decoding the PDSCH(s) from the TRP-2.

In one example of Method-III, the UE is configured by the network more than one (N_opt>1) design options, e.g., Option-1 and Option-2. Further, the UE is configured by the network a priority rule and or a set of conditions. Based on the priority rule and/or the set of conditions, the UE could determine an appropriate design option (out of all the configured design options) to follow to configure the default receive beam(s) for buffering the PDSCH(s). The configured design options along with the priority rule and/or the set of conditions are common for all the coordinating TRPs in the multi-TRP system.

Figure 20:
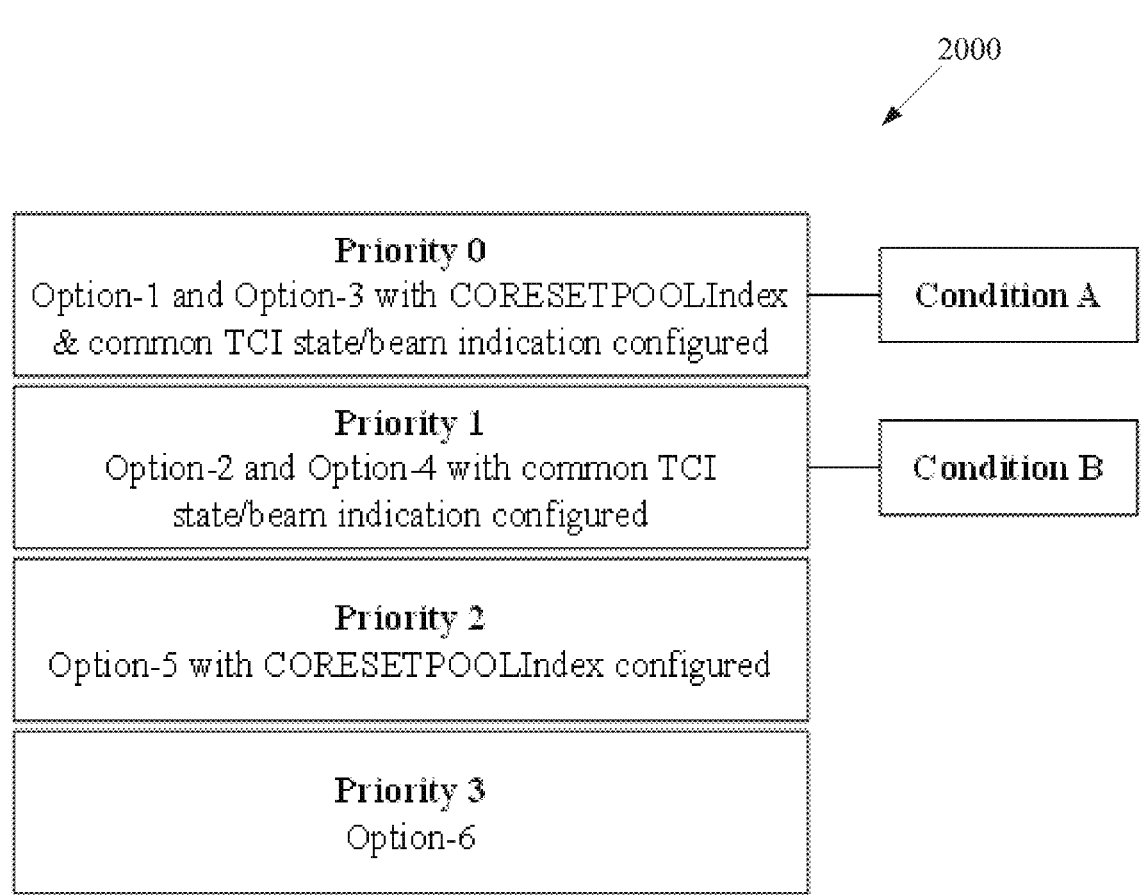

FIGS. 19 and 20 illustrate examples of the priority rule/order 1900 and 2000 according to embodiments of the present disclosure. Embodiments of the priority rule/order 1900 and 2000 shown in FIGS. 19 and 20 are for illustration only.

In FIG. 19, one example depicting the priority rule/order is presented. In the diagram shown in FIG. 19, Priority 0 is the highest priority and Priority 5 is the lowest priority. Option-3 has the highest priority in this example, followed by Option-1, Option-4, Option-2, Option-5, and Option-6 has the lowest priority. For instance, if the UE is configured by the network with both Option-3 and Option-2, the UE may follow Option-3 to set the default receive beam(s) for buffering the PDSCH(s) if the CORESETPOOLIndex is configured. Otherwise, if the CORESETPOOLIndex is not configured, the UE may follow Option-2 to set the default receive beam(s) for buffering the PDSCH(s).

For another example, assume that the UE is configured by the network with Option-2, Option-5 and Option-6. If the common TCI state/beam indication is configured/enabled, regardless of whether the CORESETPOOLIndex is configured, the UE may follow Option-2 to configure the default receive beam(s). If the common TCI state/beam indication is not configured/enabled but the CORESETPOOLIndex is configured, the UE may follow Option-5 to set the default receive beam(s). Otherwise, the UE may fall back to Option-6 to set the default receive beam(s) for buffering the PDSCH(s). Other priority rules/orderings than that shown in FIG. 19 are also possible. In FIG. 20, another example of priority rule/ordering is given. In this example, Option-1 and Option-3 have the same priority, and Option-2 and Option-4 have the same priority. Hence, the network may better not configure the design options with the same priority (e.g., Option-1 and Option-3) to the UE, unless the UE could rely on other criteria/conditions to prioritize them.

Based on the above discussions, in addition to the priority rule/ordering, the UE could also be indicated by the network a set of conditions. The UE could decide the appropriate design option (out of the total configured design options) based on the indicated conditions to set the default receive beam(s) for receiving/buffering the PDSCH(s). As indicated in FIG. 20, Condition A is associated with Priority 0 to differentiate between Option-1 and Option-3, and Condition B is associated with Priority 1 to differentiate between Option-2 and Option-4. For instance, if Condition A is satisfied, the UE may choose Option-1 over Option-3 as the design option to follow to set the appropriate default receive beam(s). Otherwise, the UE may follow Option-3. Similarly, if Condition B is satisfied, the UE may follow Option-2 to configure the default receive beam(s) for buffering the PDSCH(s).

Figure 21:
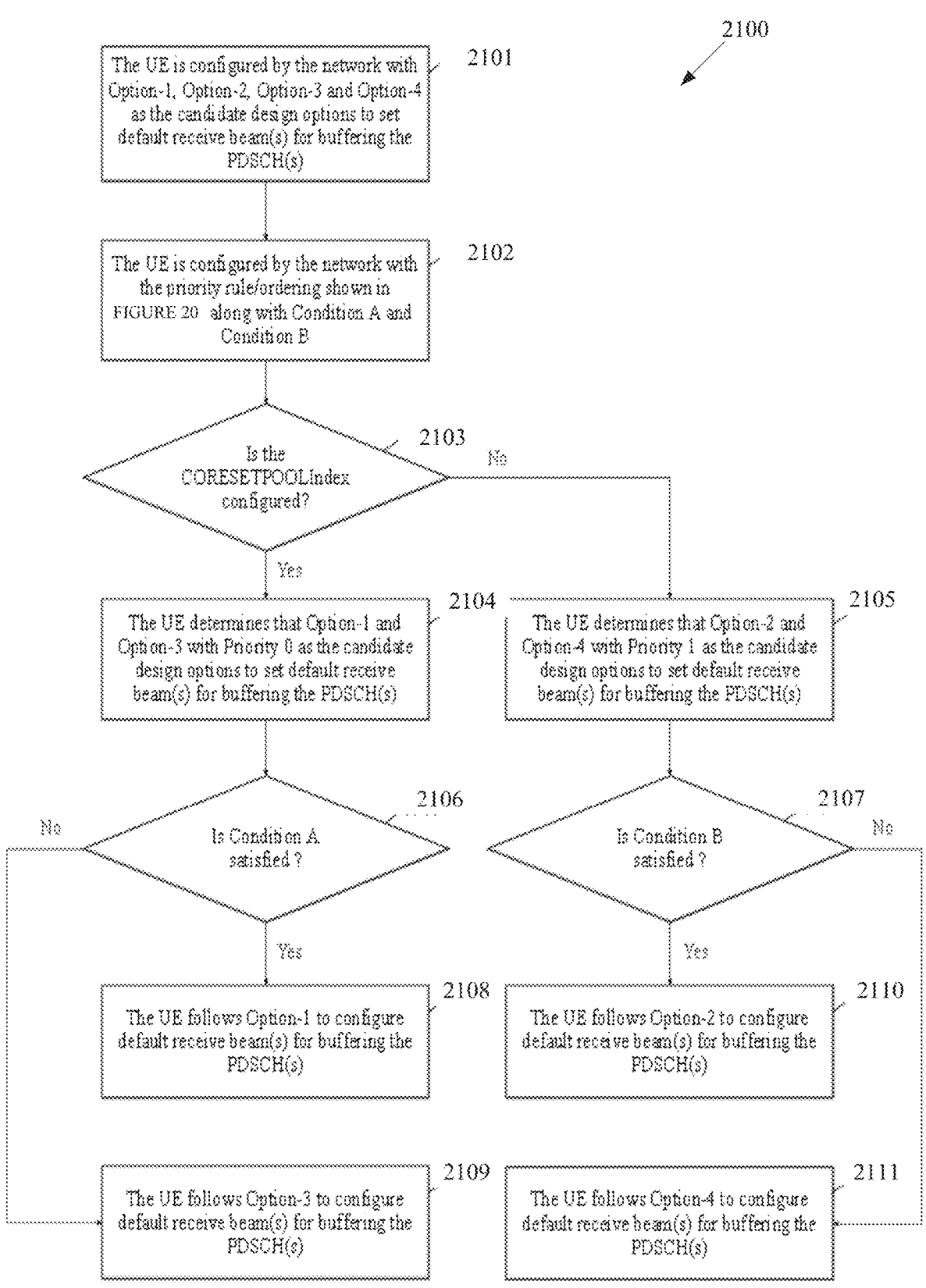
Figure 23:
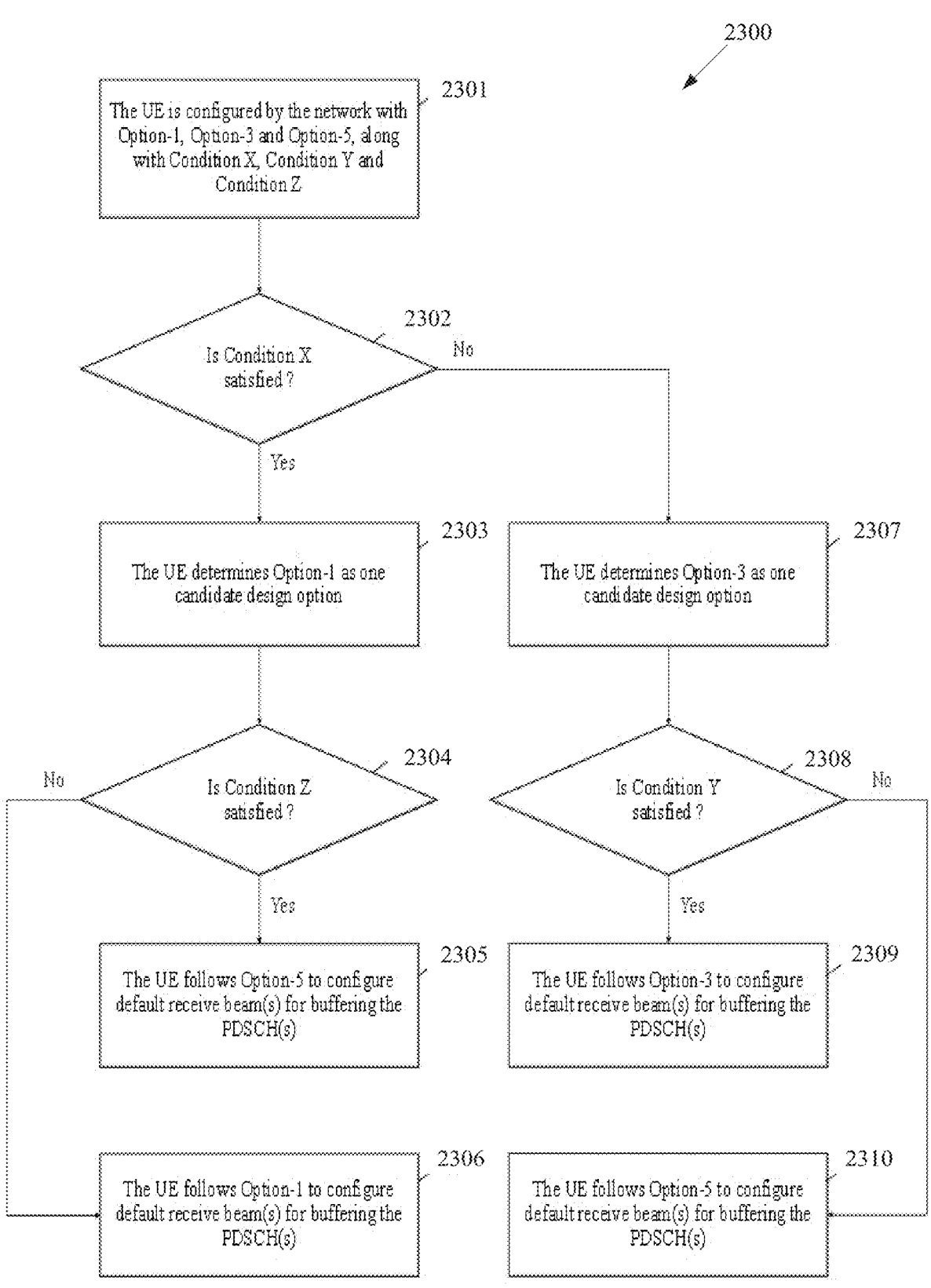

FIGS. 21 to 23 illustrate flowcharts of methods 2100 to 2300 for a configuration and priority rules/orderings according to embodiments of the present disclosure. The method 2100 to 2300 as may be performed by a UE (e.g., 111-116 as illustrated in FIG. 1). Embodiments of the method 2100 to 2300 shown in FIGS. 21 to 23 are for illustration only. One or more of the components illustrated in FIGS. 21 to 23 can be implemented in specialized circuitry configured to perform the noted functions or one or more of the components can be implemented by one or more processors executing instructions to perform the noted functions.

In FIG. 21, an algorithm flowchart illustrating the above described procedures is presented assuming that the UE is configured by the network with Option-1, Option-2, Option-3 and Option-4 as the candidate design options to set the default receive beam(s) for receiving and/or decoding the PDSCH(s). In FIG. 22, another algorithm flowchart is depicted assuming that the UE is configured by the network with Option-1, Option-2, Option-5 and Option-6 as the candidate design options. As can be seen from FIG. 22, besides checking whether the CORESETPOOLIndex is configured or not, no additional conditions are needed to prioritize between Option-5 and Option-6.

As illustrated in FIG. 21, in step 2102, a UE is configured by a network with at least on options provided in the present disclosure. In step 2102, the UE is configured by the network with a priority rule/ordering based on FIG. 20. In step 2103, the UE determines whether the CORESETPOOLIndex is configured. In step 2104, the UE determines that at least one option with priority 0. In step 2105, the UE determines at least one option with priority 1. In step 2106, the UE determines whether the Condition A is satisfied. In step 2107, the UE determines whether the Condition B is configured. In step 2108, the UE follows at least one option to configure default receive beam(s) for buffering the PDSCH(s). In step 2110, the UE follows at least one option to configure default receive beam(s) for buffering the PDSCH(s). In step 2109, the UE follows at least one option to configure default receive beam(s) for buffering the PDSCH(s). In step 2111, the UE follows at least one option to configure default receive beam(s) for buffering the PDSCH(s).

As illustrated in FIG. 22, in step 2201, a UE is configured by a network with at least on options provided in the present disclosure. In step 2202, the UE is configured by the network with a priority rule/ordering based on FIG. 20. In step 2203, the UE determines whether the common TCI state/beam indication is configured/enabled. In step 2204, the UE determines that at least one option with priority 0. In step 2205, the UE determines whether the Condition A is satisfied. In step 2208, the UE determines whether the CORESETPOOLIndex is configured. In step 2206, the UE follows at least one option to configure default receive beam(s) for buffering the PDSCH(s). In step 2209, the UE follows at least one option to configure default receive beam(s) for buffering the PDSCH(s). In step 2207, the UE follows at least one option to configure default receive beam(s) for buffering the PDSCH(s). In step 2211, the UE follows at least one option to configure default receive beam(s) for buffering the PDSCH(s).

Condition A and/or Condition B shown in FIG. 20 could correspond to a variety of possible conditions as shown below.

In one example, Condition A is used for prioritizing between Option-1 and Option-3 under Priority 0 in FIG. 20.

In one instance of Condition A.1, if the time offset between the PDSCH of interest and the previous PDCCH (the second PDCCH in Option-1, which shares the same CORESETPOOLIndex with the first PDCCH and has been decoded by the UE) carrying the common TCI state/beam indication is below a threshold (e.g., X ms/slots/symbols), Option-1 has a higher priority than Option-3.

In one instance of Condition A.2, if the time offset between the PDSCH of interest and the previous PDCCH (the second PDCCH in Option-1, which shares the same CORESETPOOLIndex with the first PDCCH and has been decoded by the UE) carrying the common TCI state/beam indication is below a threshold (e.g., X ms/slots/symbols), but the receive beam configured according to the common TCI state/beam indicated in the second PDCCH and that used for receiving the latest PDCCH that carries the common TCI state/beam indication (the third PDCCH in Option-3) are from different panels, Option-3 has a higher priority than Option-1.

In one instance of Condition A.3, if the UE could simultaneously receive the common beam indicated in the second PDCCH and the current beam from a different CORESETPOOLIndex (TRP), Option-1 has a higher priority than Option-3.

In one instance of Condition A.4, if the UE could simultaneously receive the third PDCCH and the current beam from a different CORESETPOOLIndex (TRP), Option-3 has a higher priority than Option-1.

In one example, Condition B is used for prioritizing between Option-2 and Option-4 under Priority 1 in FIG. 20.

In one instance of Condition B.1, if the time offset between the PDSCH of interest and the previous PDCCH carrying the common TCI state/beam indication (which has been decoded by the UE) is below a threshold (e.g., X ms/slots/symbols), Option-2 has a higher priority than Option-4.

In one instance of Condition B.2, if the time offset between the PDSCH of interest and the previous PDCCH carrying the common TCI state/beam indication (which has been decoded by the UE) is below a threshold (e.g., X ms/slots/symbols), but the receive beam configured according to the common TCI state/beam indicated in the previous PDCCH and that used for receiving the latest PDCCH that carries the common TCI state/beam indication (the fourth PDCCH in Option-4) are from different panels, Option-4 has a higher priority than Option-2.

Other conditions to Condition A.1, Condition A.2, Condition A.3, Condition B.1 and Condition B.2 are also possible. For Condition A.2 and Condition B.2, the UE may report to the network the receive antenna panel information such as panel ID along with the channel measurement report. For Condition A.3 and Condition A.4, certain level of backhaul coordination between the TRPs is needed as one TRP may need to know the current transmit beam from another TRP (associated with a different value of CORE-SETPOOLIndex).

The UE could be configured by the network with all necessary conditions described above. The UE could then be indicated by the network to use one or more of them. For instance, the UE could be indicated by the network to only use Condition A.1 if both Option-1 and Option-3 are configured, though the UE could be configured by the network with Condition A.1, Condition A.2, Condition A.3, Condition A.4, Condition A.5, Condition B.1 and Condition B.2.

In some cases, the UE may not be configured by the network any priority rule/ordering (e.g., FIG. 19 and FIG. 20), but instead a set of explicit conditions along with the configured design options. For instance, the UE could be first configured by the network three options, Option-1, Option-3 and Option-5. Further, the UE could be configured by the network three conditions, denoted by Condition X, Condition Y and Condition Z. If Condition X is satisfied, the UE may follow Option-1 over Option-3. If Condition Y is satisfied, the UE may follow Option-3 over Option-5. If Condition Z is satisfied, Option-5 has a higher priority than Option-1. One example charactering how the UE may determine the appropriate design option (from Option-1, Option-3 and Option-5) according to the configured conditions (Condition X, Condition Y and Condition Z) is shown in FIG. 23. As indicated in FIG. 23, the UE could follow Option-5 instead of Option-1 and Option-3 to configure the default receive beam(s) for receiving the PDSCHs, which is not possible if the UE is configured and follows the priority rules/orderings in FIG. 19 and FIG. 20.

For example, Condition Z in FIG. 23 could be: if the time offset between the PDSCH of interest and the previous PDCCH (the second PDCCH in Option-1, which shares the same CORESETPOOLIndex with the first PDCCH and has been decoded by the UE) carrying the common TCI state/beam indication is below a threshold (e.g., X ms/slots/symbols), Option-1 has a higher priority than Option-5. Otherwise, the UE may follow Option-5 over Option-1 to configure the default receive beam(s), which was used for receiving the latest PDCCH with the lowest CORESET index among the CORESETs configured with the same value of CORESETPOOLIndex as that associated with the first PDCCH.

As illustrated in FIG. 23, in step 2301, a UE is configured by a network with at least on option provided in the present disclosure. In step 2302, the UE determines whether the Condition X is satisfied. In step 2303, the UE determines at least one option as a candidate design option. In step 2307, the UE determines at least one option as a candidate design option. In step 2304, the UE determines whether the Condition Z is satisfied. In step 2308, the UE determines whether the Condition Y is satisfied. In step 2305, the UE follows at least one option to configure default receive beam(s) for buffering the PDSCH(s). In step 2309, the UE follows at least one option to configure default receive beam(s) for buffering the PDSCH(s). In step 2306, the UE follows at least one option to configure default receive beam(s) for buffering the PDSCH(s). In step 2310, the UE follows at least one option to configure default receive beam(s) for buffering the PDSCH(s).

In one embodiment of Method-IV, the UE is configured by the network more than one (N_opt>1) design options per TRP (or per CORESETPOOLIndex). The design options configured for different TPRs could be mutually exclusive. For instance, if the CORESETPOOLIndex is configured, the UE could be configured with Option-1 and Option-3 for TRP-1 (associated with "CORESETPOOLIndex=0") and Option-2 and Option-5 for TRP-2 (associated with "CORESETPOOLIndex=1"). Similar to Method-III, the UE could be indicated by the network one or more priority rules/orderings and/or one or more sets of conditions to help UE determine appropriate design option for each coordinating TRP. The priority rules/orderings and/or the sets of conditions could be common for all TRPs, are customized on a per TRP basis. Detailed methods of configuring and using the priority rules/orderings and/or the sets of conditions follow those described in FIGS. 19 to 23.

In a single-DCI based multi-TRP system, the UE could be configured by the network a single PDCCH/DCI to schedule the PDSCH transmissions from different coordinating TRPs. For common TCI state(s)/beam(s) indication, the corresponding PDCCH could signal N_tci>1 common TCI states/beams, each corresponding to a coordinating TRP. For instance, for a multi-TRP system comprising of two coordinating TRPs (e.g., TRP-1 and TRP-2 in FIG. 8), the TCI codepoint in the PDCCH that indicates the common TCI state(s)/beam(s) to the UE could be formulated as (TCI #a, TCI #b), where TCI #a could represent the common TCI state for TRP-1, and TCI #b could be the common TCI state for TRP-2. Similar to the example shown in FIG. 11 for the multi-DCI based multi-TRP system, the UE may also need to set the default receive beam(s) for buffering the PDSCH(s) in the single-DCI based multi-TRP system if the scheduling offset between the PDSCH(s) of interest and the PDCCH carrying the common TCI state(s)/beam(s) indication is less than a predetermined threshold.

Figure 24:
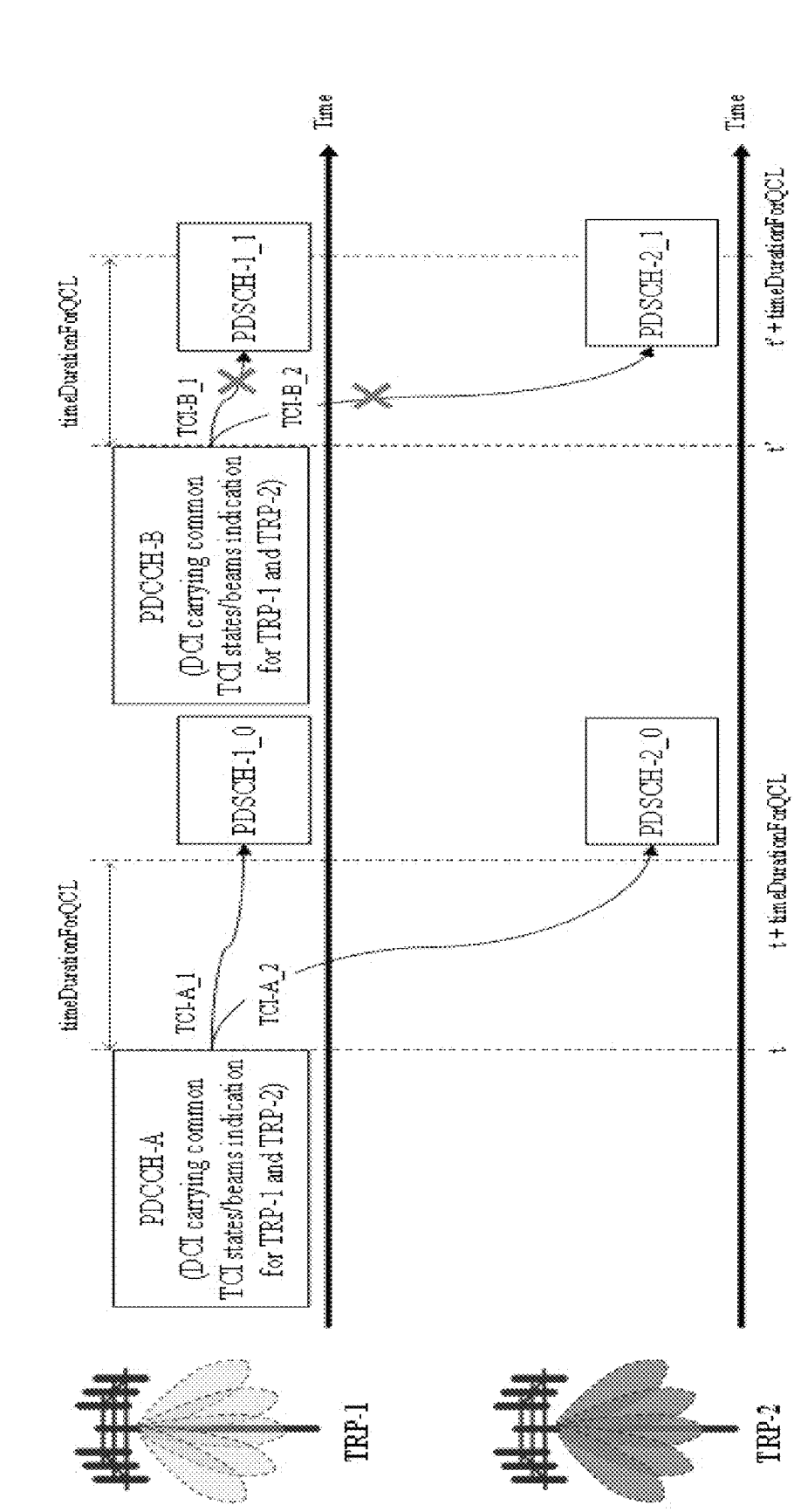
FIGS. 24 to 26 illustrate examples of determining default TCI state(s) for PDSCH reception in a multi-TRP system according to embodiments of the present disclosure.
Figure 25:
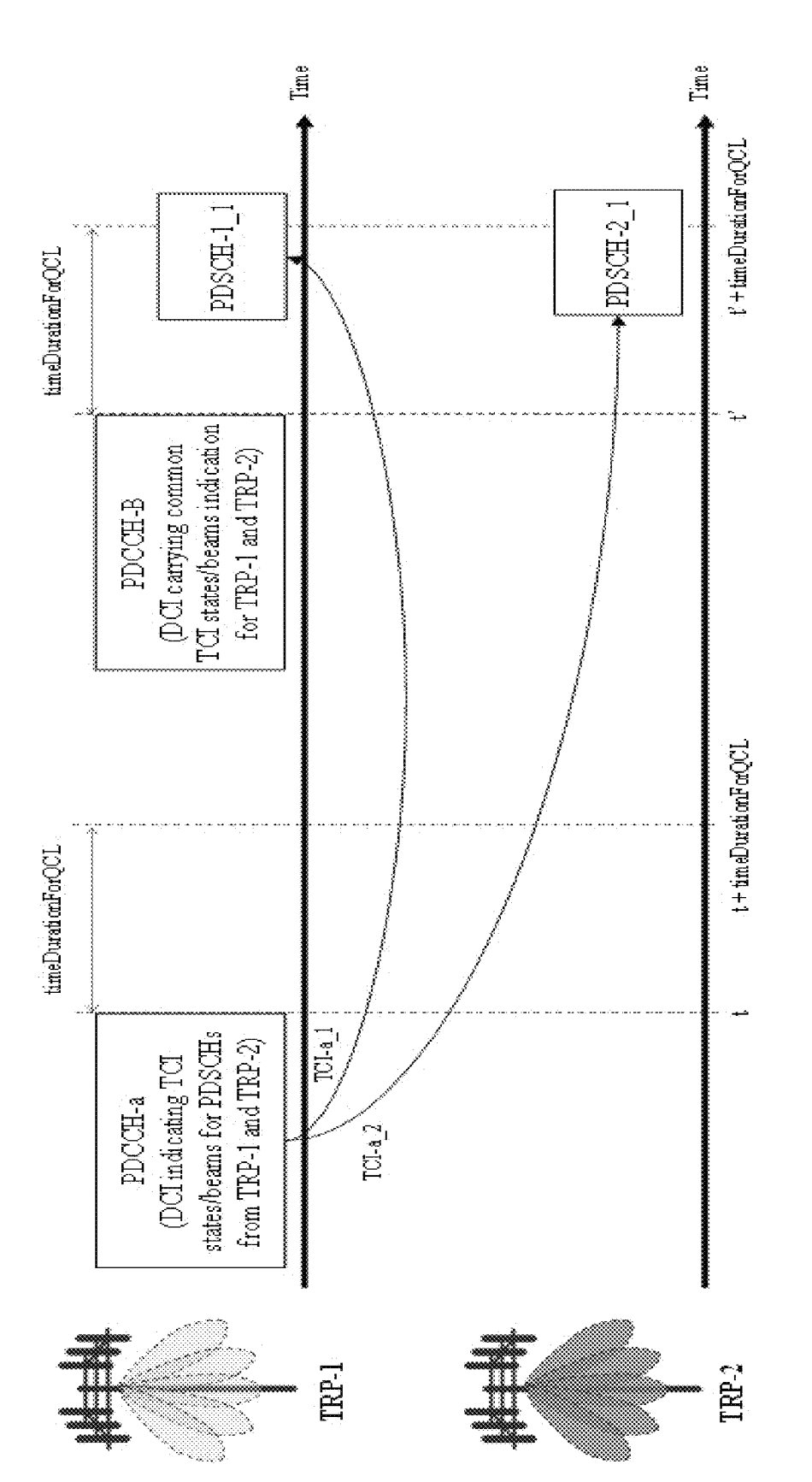
Figure 26:
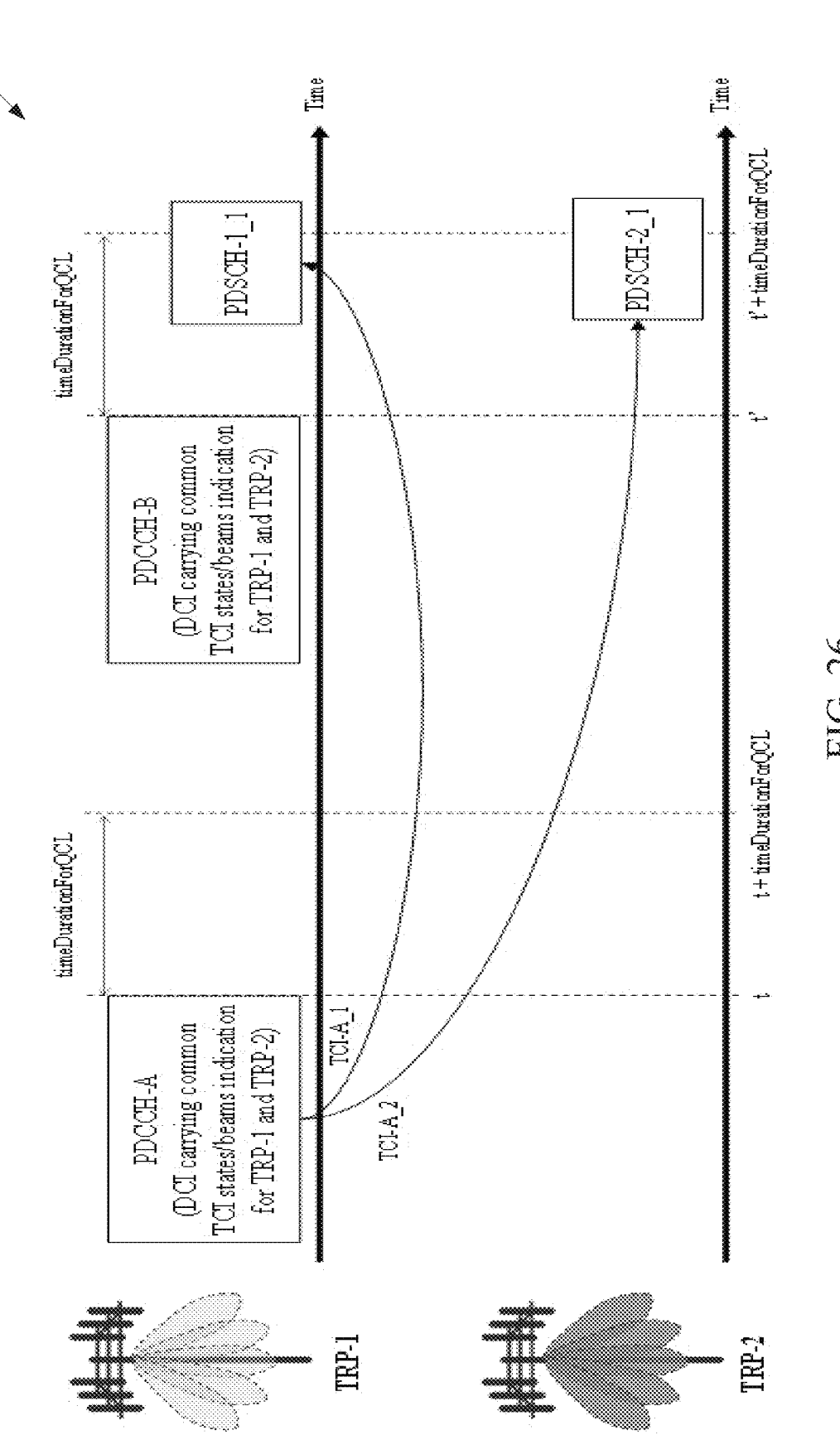

FIGS. 24 to 26 illustrate examples of the common TCI states/beams indication in a multi-TRP system 2400 to 2600 according to embodiments of the present disclosure. Embodiments of the common TCI states/beams indication in a multi-TRP system 2400 to 2600 shown in FIGS. 24 to 26 are for illustration only.

In FIG. 24, a conceptual example depicting the common TCI state/beam indication in the single-DCI based multi-TRP system is presented. It is shown in FIG. 24 that the scheduling offset between PDSCH-1_0/PDSCH-2_0 and PDCCH-A carrying the common TCI states/beams for both TRP-1 and TRP-2 is beyond timeDurationForQCL. Hence, the UE could configure the receive spatial filters for receiving and/or decoding PDSCH-1_0 and PDSCH-2_0 based on the QCL parameters in TCI-A_1 and TCI-A_2 indicated in PDCCH-A. The scheduling offset between PDSCH-1_1/PDSCH-2_1 and PDCCH-B carrying the common TCI states/beams for both TRP-1 and TRP-2, however, is below the threshold timeDurationForQCL. In this case, the UE is not able to set the receive spatial filters for receiving and/or decoding PDSCH-1_1 and PDSCH-2_1 according to the QCL parameters of TCI-B_1 and TCI-B_2 indicated in PDCCH-B. Hence, the UE needs to configure appropriate default receive beams for buffering PDSCH-1_1 and PDSCH-2_1. In the following, several design options of configuring and determining default TCI states/receive beams in the single-DCI based multi-TRP system with common TCI state/beam indication are discussed.

In one example of Option-A, if the time offsets between the reception of a first PDCCH carrying the common TCI states/beams for all the coordinating TRPs (e.g., PDCCH-B in FIG. 24) and the receptions of the PDSCHs (e.g., PDSCH-1_1 and PDSCH-2_1 in FIG. 24) are less than the threshold (e.g., timeDurationForQCL in FIG. 24), the UE could assume that the QCL parameters for the DMRS ports of the PDSCHs follow those of the default TCI states/beams, which could correspond to the previous N_tci (>1) TCI states/beams (not common TCI states/beams) indicated in a single DCI for all the PDSCHs transmitted from the coordinating TRPs.

In FIG. 25, a conceptual example describing the provided Option-A is presented. In this example, PDCCH-a is the previous PDCCH with respect to PDCCH-B that signals the DCI that indicates two TCI states, i.e., TCI-a_1 and TCI-a_2, for the PDSCHs transmitted from TRP-1 and TRP-2. For instance, (TCI-a_1, TCI-a_2) could correspond to one of the TCI codepoints (e.g., a total of eight TCI codepoints specified in the 3GPP Rel. 16) activated by MAC-CE from a pool of TCI states configured by RRC. As the scheduling offsets between PDSCH-1_1 and PDCCH-B, and PDSCH-2_1 and PDCCH-B, are less than timeDurationForQCL, the UE cannot configure the receive spatial filters for receiving PDSCH-1_1 and PDSCH-2_1 according to the QCL parameters of the common TCI states/beams indicated in PDCCH-B. According to Option-A, the UE may set the default receive beams for buffering PDSCH-1_1 and PDSCH-2_1 based on the QCL parameters of the TCI states/beams indicated in PDCCH-a.

In one example of Option-B, if the time offsets between the reception of a first PDCCH carrying the common TCI states/beams for all the coordinating TRPs (e.g., PDCCH-B in FIG. 24) and the receptions of the PDSCHs (e.g., PDSCH-1_1 and PDSCH-2_1 in FIG. 24) are less than the threshold (e.g., timeDurationForQCL in FIG. 24), the UE could assume that the QCL parameters for the DMRS ports of the PDSCHs follow those of the default TCI states/beams, which could correspond to the previous N_tci (>1) common TCI states/beams indicated in a single DCI for all the coordinating TRPs.

A conceptual example illustrating the provided Option-B in configuring and determining the default receive beams is given in FIG. 26. Different from the example for Option-A shown in FIG. 25, the UE in FIG. 26 may configure the default receive beams for buffering PDSCH-1_1 and PDSCH-2_1 based on the QCL parameters of the two common TCI states, TCI-A_1 and TCI-A_2, indicated in PDCCH-A. This is because in this example, TCI-A_1 and TCI-A_2 are the previous common TCI states (with respect to those indicated in PDCCH-B) indicated in a single DCI (PDCCH-A) for all the coordinating TRPs (TRP-1 and TRP-2).

In one example of Option-C, if the time offsets between the reception of a first PDCCH carrying the common TCI states/beams for all the coordinating TRPs (e.g., PDCCH-B in FIG. 24) and the receptions of the PDSCHs (e.g., PDSCH-1_1 and PDSCH-2_1 in FIG. 24) are less than the threshold (e.g., timeDurationForQCL in FIG. 24), the UE could assume that the QCL parameters for the DMRS ports of the PDSCHs follow those of the default TCI states/beams, which could correspond to the lowest codepoint among the TCI codepoints containing N_tci (>1) different TCI states activated for the PDSCH. This design option is similar to the configuration of the default TCI state specified in the 3GPP Rel. 16 for the single-DCI based multi-TRP system.

Figure 27:
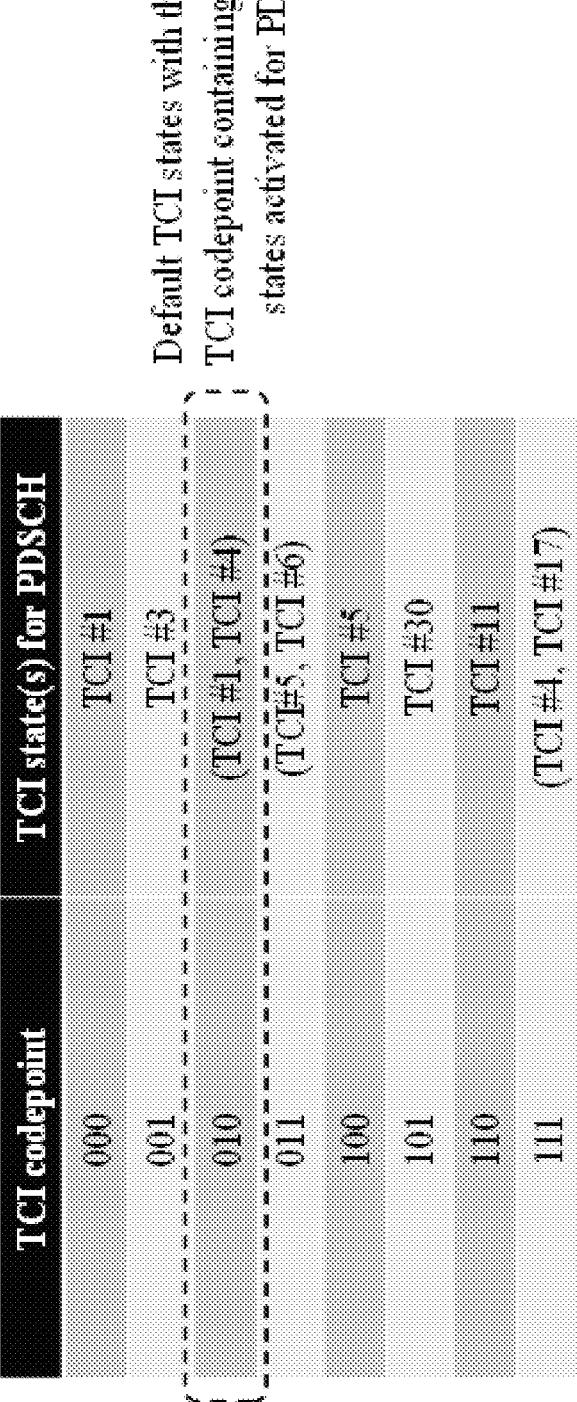

FIGS. 27 and 28 illustrate examples of TCI codepoints 2700 and 2800 according to embodiments of the present disclosure. Embodiments of the TCI codepoints 2700 and 2800 shown in FIGS. 27 and 28 are for illustration only.

As can be seen from the example shown in FIG. 27, a total of 8 TCI codepoints are activated for PDSCH by MAC-CE from a pool of TCI states configured by RRC. Each TCI codepoint corresponds to one or two TCI states. According to Option-C, the default TCI states/beams may correspond to the lowest TCI codepoint containing two different TCI states. In this example, the default TCI states are then TCI #1 and TCI #4, and the corresponding TCI codepoint is "010." The UE may configure the default receive beams for buffering the PDSCHs (e.g., PDSCH-1_1 and PDSCH-2_1 in FIG. 24) based on the QCL parameters of TCI #1 and TCI #4.

In one example of Option-D, if the time offsets between the reception of a first PDCCH carrying the common TCI states/beams for all the coordinating TRPs (e.g., PDCCH-B in FIG. 24) and the receptions of the PDSCHs (e.g., PDSCH-1_1 and PDSCH-2_1 in FIG. 24) are less than the threshold (e.g., timeDurationForQCL in FIG. 24), the UE could assume that the QCL parameters for the DMRS ports of the PDSCHs follow those of the default TCI states/beams, which could be configured by the network and indicated to the UE.

For instance, the UE could be explicitly configured/indicated by the network N_tci (>1) common TCI states/beams as the default TCI states/beams, upon which the UE could configure the receive spatial filters for buffering the PDSCHs transmitted from the coordinating TRPs. For a multi-TRP system comprising of two TRPs (TRP-1 and TRP-2), the UE could be configured by the network (TCI #1, TCI #4) as the default common TCI states. The UE may configure the default receive beams for buffering the PDSCHs (e.g., PDSCH-1_1 and PDSCH-2_1 in FIG. 24) based on the QCL parameters of TCI #1 and TCI #4 until the default common TCI states are updated/reconfigured by the network.

For another example, the UE could be configured by the network via higher layer signaling such as RRC a pool of default TCI sets. Each default TCI set could correspond to a single common TCI state, or N_tci (>1) common TCI states. The MAC-CE could activate one of the default TCI sets, and the UE could configure the default receive beam(s) for buffering the PDSCH(s) according to the QCL parameters of the common TCI state(s) indicated in the activated default TCI set. In FIG. 28, two examples of the default TCI sets are presented. On the upper-half of FIG. 27, a default TCI set could contain a single common TCI state (e.g., for the single-TRP operation) or two common TCI states (e.g., for the multi-TRP operation). One the lower-half of FIG. 27, a default TCI set contains two common TCI states. If the MAC-CE activates the default TCI set #2 as shown on the lower-half of FIG. 27, the UE may configure the default receive beams for buffering the PDSCHs (e.g., PDSCH-1_1 and PDSCH-2_1 in FIG. 24) based on the QCL parameters of TCI #1 and TCI #4 until the MAC-CE activates a new default TCI set.

In one example of Option-E, the configuration of the default TCI state(s)/beam(s) for PDSCH follows the legacy procedure defined in the 3GPP Rel. 15. If the time offset between the reception of a first PDCCH carrying the common TCI states/beams for all the coordinating TRPs (e.g., PDCCH-B in FIG. 24) and the receptions of the PDSCHs (e.g., PDSCH-1_1 and PDSCH-2_1 in FIG. 24) are less than the threshold (e.g., timeDurationForQCL in FIG. 24), the UE could assume that the QCL parameters for the DMRS ports of the PDSCHs follow those of the default TCI state(s)/beam(s), which could be used for the PDCCH with the lowest CORESET index among the CORESETs associated with a monitored search space in the latest slot.

The UE could be configured by the network one or more design options described above to configure the default beam(s) for receiving the PDSCH(s) in a single-DCI based multi-TRP system. For instance, the UE could be indicated by the network to follow only one design option, e.g., Option-A, to configure the default receive beam(s) for receiving and/or decoding the PDSCH(s). For another example, the UE could be indicated by the network more than one design options along with a priority rule/ordering and/or a set of conditions, upon which the UE could determine and follow an appropriate design option to configure the default receive beam(s) for buffering the PDSCH(s).

Figure 29:
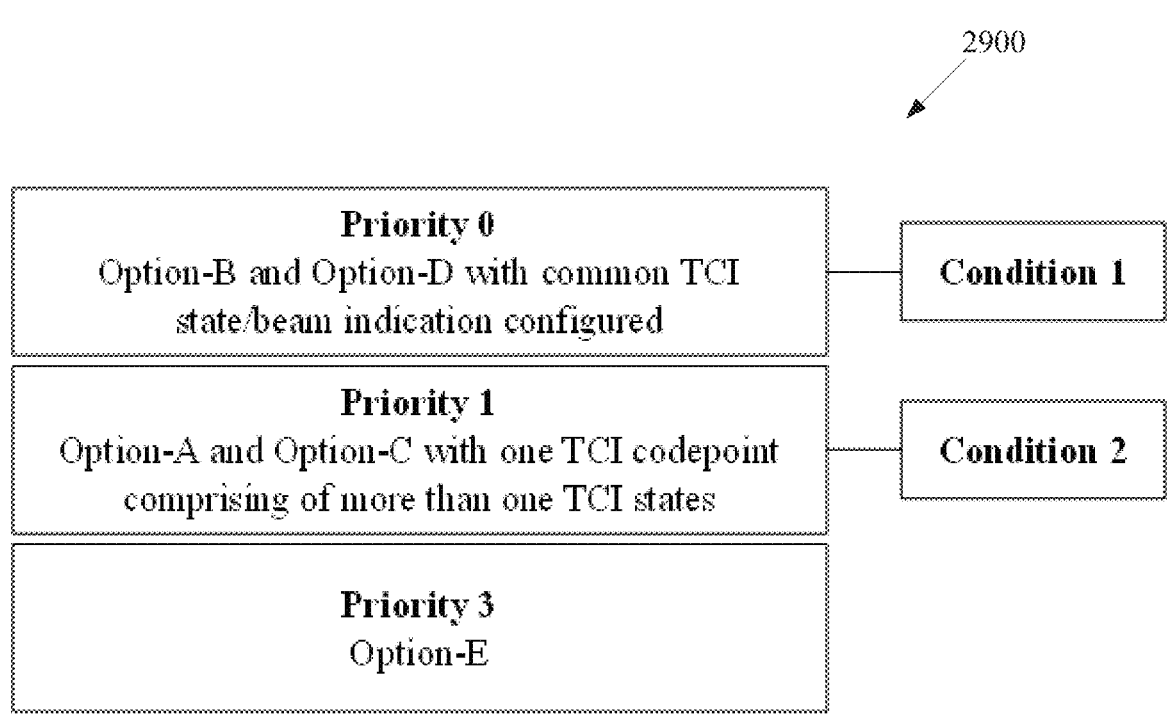
FIG. 29 illustrates an example of a priority rule of determining default TCI state(s) for PDSCH reception in a multi-TRP system according to embodiments of the present disclosure.

A priority rule/ordering example is given in FIG. 29, in which Priority 0 has the highest priority while Priority 3 has the lowest priority. In this example, Option-B and Option-D belong to Priority 0, Option-A and Option-C belong to Priority 1, and Option-E corresponds to Priority 3. For instance, if the UE is indicated by the network Option-A and Option-B, the UE may follow Option-B to configure the default receive beam(s) as long as the common TCI state/beam indication is configured/enabled. For another example, assume that the UE is indicated by the network Option-C and Option-E. The UE may follow Option-E to set the default receive beam(s) if all of the TCI codepoints activated by the MAC-CE comprise of a single TCI state.

Under certain settings, the UE could be indicated/configured by the network the design options that belong to the same priority order, e.g., Option-B and Option-D in the example shown in FIG. 29. In this case, the UE needs additional indications/conditions from the network so that the UE could prioritize one option over the other. In this example, the UE may be indicated by the network Condition 1 if the UE is configured with both Option-B and Option-D. Similarly, the UE may be indicated by the network Condition 2 if the UE is configured with both Option-A and Option-C. In the following, several possibilities for Condition 1 and Condition 2 are presented.

In one example, Condition 1 is used for prioritizing between Option-B and Option-D under Priority 0 in FIG. 29.

In one instance of Condition 1.1, if the UE is explicitly configured by the network the default (common) TCI states/beams (e.g., activating a default TCI set from a pool of default TCI sets each comprising of $N\_tci>1$ common TCI states), Option-D has a higher priority than Option-B.

In one instance of Condition 1.2, it may assume that the UE is explicitly configured by the network the default (common) TCI states/beams. If the previous $N\_tci$ ($>1$) common TCI states/beams (indicated in the single DCI for all the coordinating TRPs) are different from the explicitly configured default (common) TCI states and/or configured at a later time, Option-B has a higher priority than Option-D.

In one instance of Condition 1.3, if the receive default beam(s) configured according to Option-B and the beam for receiving the first PDCCH are from different panels, meanwhile the receive default beam(s) configured following Option-D and the beam for receiving the first PDCCH are from the same panel, Option-D has a higher priority than Option-B.

In one instance of Condition 1.4, if the receive default beam(s) configured according to Option-D and the beam for receiving the first PDCCH are from different panels, meanwhile the receive default beam(s) configured following Option-B and the beam for receiving the first PDCCH are from the same panel, Option-B has a higher priority than Option-D.

In one example, Condition 2 is used for prioritizing between Option-A and Option-C under Priority 1 in FIG. 29.

In one instance of Condition 2.1, if there is at least one TCI codepoint activated for PDSCH comprising of $N\_tci$ ($>1$) TCI states, Option-A has a higher priority than Option-C.

In one instance of Condition 2.2, it may assume that there is at least one TCI codepoint activated for PDSCH comprising of $N\_tci$ ($>1$) TCI states. If the previous $N\_tci$ ($>1$) TCI states/beams (not common TCI states/beams) indicated in the single DCI for all the coordinating TRPs are different from those corresponding to the lowest TCI codepoint among all the TCI codepoints comprising of $N\_tci$ ($>1$) TCI states and/or configured at a later time, Option-C has a higher priority than Option-A.

In one instance of Condition 2.3, if the receive default beam(s) configured according to Option-A and the beam for receiving the first PDCCH are from different panels, meanwhile the receive default beam(s) configured following Option-C and the beam for receiving the first PDCCH are from the same panel, Option-C has a higher priority than Option-A.

In one instance of Condition 2.4, if the receive default beam(s) configured according to Option-C and the beam for receiving the first PDCCH are from different panels, meanwhile the receive default beam(s) configured following Option-A and the beam for receiving the first PDCCH are from the same panel, Option-A has a higher priority than Option-C.

FIG. 29 illustrates an example of a priority rule of determining default TCI state(s) for PDSCH reception 2900 in a multi-TRP system according to embodiments of the present disclosure. An embodiment of the priority rule of determining the default TCI state(s) for the PDSCH reception 2900 in the multi-TRP system shown in FIG. 29 is for illustration only.

Other priority rules/orderings than that shown in FIG. 29 are also possible. Further, other conditions than those described above can be implemented as well. Note that for Condition 1.3, Condition 1.4, Condition 2.3 and Condition 2.4, the UE may need to report to the network their receive panel information such as panel ID along with the channel measurement report. The UE could be configured by the network with all necessary conditions described above. The UE could then be indicated by the network to use one or more of them. For instance, the UE could be indicated by the network to only use Condition 1.1 if both Option-B and Option-D are configured, though the UE could be configured by the network with Condition 1.1, Condition 1.2, Condition 1.3, Condition 1.4, Condition 2.1, Condition 2.2, Condition 2.3 and Condition 2.4 in the first place.

In some cases, the UE may not be configured by the network any priority rule/ordering (e.g., FIG. 29), but instead a set of explicit conditions along with the configured design options. For instance, the UE could be first configured by the network three options, Option-A, Option-B and Option-D. Further, the UE could be configured by the network three conditions, denoted by Condition I, Condition II and Condition III. If Condition I is satisfied, the UE may follow Option-A over Option-B. If Condition II is satisfied, the UE may follow Option-A over Option-D. If Condition III is satisfied, Option-B has a higher priority than Option-D. One example charactering how the UE may determine the appropriate design option (from Option-A, Option-B and Option-D) according to the configured conditions (Condition I, Condition II and Condition III) is shown in FIG. 30.

Figure 30:
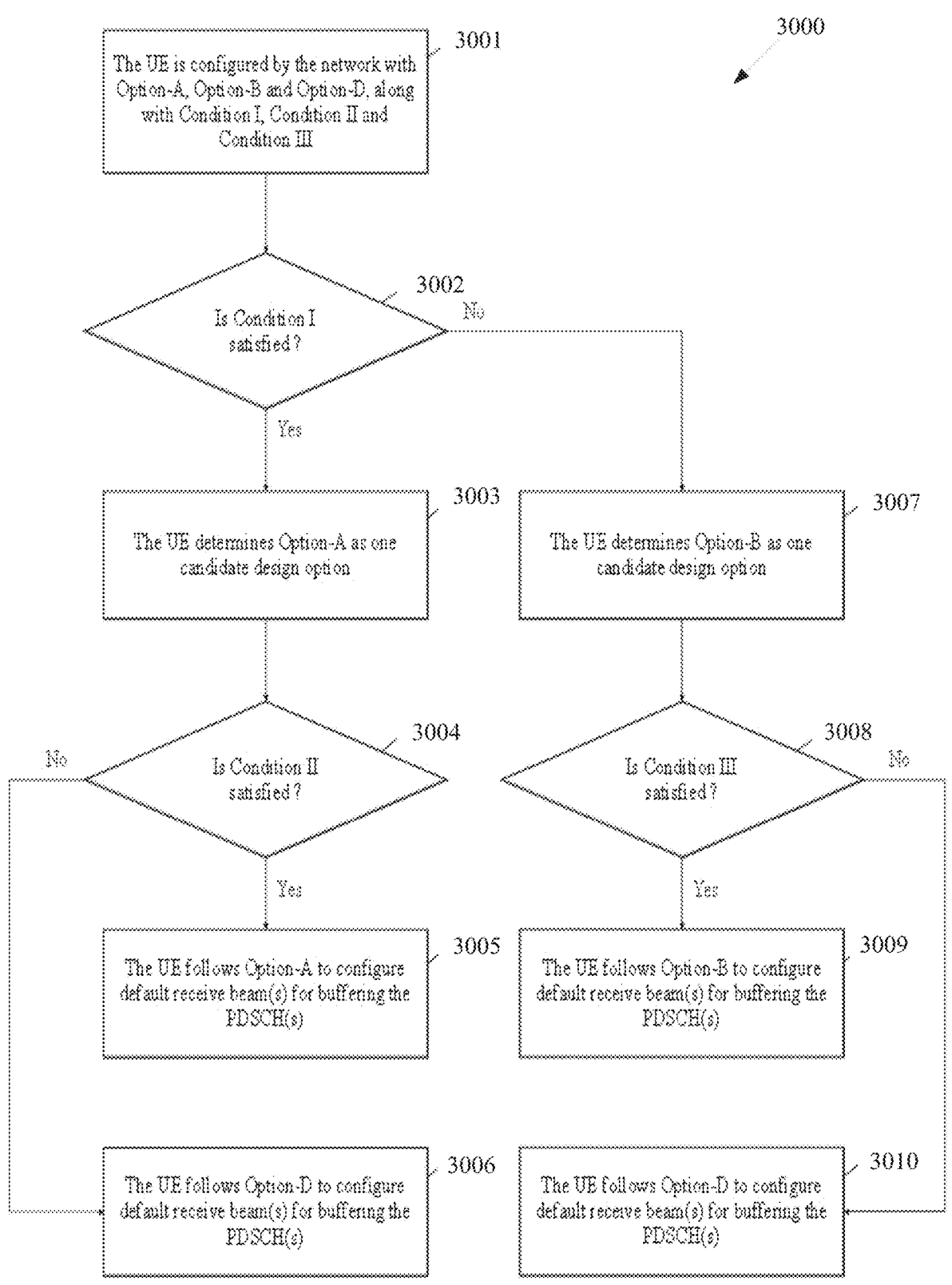
FIG. 30 illustrates an example of following the priority rule to determine default TCI state(s) for PDSCH reception in a multi-TRP system according to embodiments of the present disclosure.

FIG. 30 illustrates an example of following the priority rule to determine default TCI state(s) for PDSCH reception 3000 in a multi-TRP system according to embodiments of the present disclosure. The method 3000 as may be performed by a UE (e.g., 111-116 as illustrated in FIG. 1). Embodiments of the method 3000 shown in FIG. 30 are for illustration only. One or more of the components illustrated in FIG. 30 can be implemented in specialized circuitry configured to perform the noted functions or one or more of the components can be implemented by one or more processors executing instructions to perform the noted functions.

As indicated in FIG. 30, the UE could follow Option-A instead of Option-B and Option-D to configure the default receive beam(s) for receiving the PDSCHs, which is not possible if the UE is configured and follows the priority rule/ordering in FIG. 29. For example, Condition II in FIG. 30 could be: the previous N_tci (>1) TCI states/beams (not common TCI states/beams) indicated in the single DCI for all the coordinating TRPs are different from the explicitly configured default (common) TCI states and/or configured at a later time.

As illustrated in FIG. 30, in step 3001, a UE is configured by a network with at least on option provided in the present disclosure. In step 3002, the UE determines whether the Condition I is satisfied. In step 3003, the UE determines at least one option as a candidate design option. In step 3007, the UE determines at least one option as a candidate design option. In step 3004, the UE determines whether the Condition II is satisfied. In step 3008, the UE determines whether the Condition III is satisfied. In step 3005, the UE follows at least one option to configure default receive beam(s) for buffering the PDSCH(s). In step 3009, the UE follows at least one option to configure default receive beam(s) for buffering the PDSCH(s). In step 3006, the UE follows at least one option to configure default receive beam(s) for buffering the PDSCH(s). In step 3010, the UE follows at least one option to configure default receive beam(s) for buffering the PDSCH(s).

As specified herein in the present disclosure, in a (multi-DCI based) multi-TRP system, a UE could be indicated/provided/configured by the network, e.g., in PDCCH-Config, two values (i.e., 0 and 1) of CORESET pool index (denoted by CORESETPoolIndex), wherein each CORESET could be configured with a value of CORESETPoolIndex.

Furthermore, a UE could be indicated/provided/configured by the network, e.g., via a beam indication MAC CE or a DCI (e.g., via one or more TCI codepoints of one or more TCI fields in the corresponding DCI format 1_1/1_2 with or without DL assignment) associated to a CORESET pool index value (e.g., 0 or 1), one or more TCI states/pairs of TCI states for the same (or different) CORESET pool index value, wherein a TCI state could be a joint DL and UL TCI state or a separate DL TCI state provided by TCI-State/DLorJointTCI-State or a separate UL TCI state provided by TCI-State/UL-TCIState indicated for channels/signals such as PDCCH, PDSCH, PUCCH and PUSCH associated to the same (or different) CORESET pool index value, and a pair of TCI states could include/contain a separate DL TCI state provided by TCI-State/DLorJointTCI-State or a separate UL TCI State provided by TCI-State/UL-TCIState indicated for channels/signals such as PDCCH, PDSCH, PUCCH and PUSCH associated to the same (or different) CORESET pool index value, under the unified TCI framework.

The UE could report to the network a capability signaling, denoted by twoBeamsMDCI, to indicate to the network that the UE is able to use/apply or capable of using/applying two beams/TCI states to simultaneously receive one or more channels/signals such as PDSCH(s)—e.g., after the indicated beam(s) can be applied (i.e., after beam application time (BAT)), wherein the one or more channels/signals could be associated with different values of CORESET-PoolIndex (e.g., both values of CORESTPoolIndex 0 and 1) or different values of physical layer cell identifier (PCI) (e.g., the serving cell PCI and/or a PCI other than the serving cell PCI) or different values of PCI index (each pointing to an entry/PCI in a higher layer configured list/set/pool of PCIs comprising at least a PCI other than the serving cell PCI); e.g., when/if the one or more channels are PDSCH(s), the PDSCH(s) could be scheduled/activated by PDCCH(s)/DCI(s) received in CORESET(s) associated/configured with different values of CORESETPoolIndex (e.g., both values of CORESTPoolIndex 0 and 1) or different values of PCI (e.g., the serving cell PCI and/or a PCI other than the serving cell PCI) or different values of PCI index (each pointing to an entry/PCI in a higher layer configured list/set/pool of PCIs comprising at least a PCI other than the serving cell PCI), and the PDSCH(s) could be UE-dedicated PDSCH(s) or non-UE-dedicated PDSCH(s).

Furthermore, the UE could be indicated/configured/provided by the network, e.g., via higher layer RRC signaling/parameter (e.g., by enableTwoBeamsMDCI or by setting enableTwoBeamsMDCI to "enabled") and/or MAC CE command and/or dynamic DCI based L1 signaling, that the UE could use/apply two beams/TCI states to simultaneously receive one or more channels/signals such as PDSCH(s)—e.g., after the indicated beam(s) can be applied (i.e., after beam application time BAT)—as specified herein in the present disclosure, wherein the one or more channels/signals could be associated with different values of CORESET-PoolIndex (e.g., both values of CORESTPoolIndex 0 and 1) or different values of PCI (e.g., the serving cell PCI and/or a PCI other than the serving cell PCI) or different values of PCI index (each pointing to an entry/PCI in a higher layer configured list/set/pool of PCIs comprising at least a PCI other than the serving cell PCI).

The UE could report to the network a capability signaling, denoted by twoDefaultBeamsMDCI, to indicate to the network that the UE is able to use/apply or capable of using/applying two beams/TCI states to simultaneously receive one or more channels/signals such as PDSCH(s) when the scheduling offset is less than or equal to a threshold, wherein the one or more channels/signals could be associated with different values of CORESETPoolIndex (e.g., both values of CORESTPoolIndex 0 and 1) or different values of PCI (e.g., the serving cell PCI and/or a PCI other than the serving cell PCI) or different values of PCI index (each pointing to an entry/PCI in a higher layer configured list/set/pool of PCIs comprising at least a PCI other than the serving cell PCI); e.g., when/if the one or more channels are PDSCH(s), the PDSCH(s) could be scheduled/activated by PDCCH(s)/ DCI(s) received in CORESET(s) associated/configured with different values of CORESETPoolIndex (e.g., both values of CORESTPoolIndex 0 and 1) or different values of PCI (e.g., the serving cell PCI and/or a PCI other than the serving cell PCI) or different values of PCI index (each pointing to an entry/PCI in a higher layer configured list/set/pool of PCIs comprising at least a PCI other than the serving cell PCI), and the PDSCH(s) could be UE-dedicated PDSCH(s) or non-UE-dedicated PDSCH(s).

Furthermore, the UE could be indicated/configured/provided by the network, e.g., via higher layer RRC signaling/ parameter (e.g., by enableTwoDefaultBeamsMDCI or by setting enableTwoDefaultBeamsMDCI to "enabled") and/or MAC CE command and/or dynamic DCI based L1 signaling, that the UE could use/apply two beams/TCI states to simultaneously receive one or more channels/signals such as PDSCH(s) when the scheduling offset is less than or equal to a threshold as specified herein in the present disclosure, wherein the one or more channels/signals could be associated with different values of CORESETPoolIndex (e.g., both values of CORESTPoolIndex 0 and 1) or different values of PCI (e.g., the serving cell PCI and/or a PCI other than the serving cell PCI) or different values of PCI index (each pointing to an entry/PCI in a higher layer configured list/ set/pool of PCIs comprising at least a PCI other than the serving cell PCI).

For a CORESET pool index value (e.g., 0 or 1), the UE could be able to use/apply one or more of the indicated TCI states/pairs of TCI states associated to the CORESET-PoolIndex value—e.g., the TCI state(s) is indicated in a beam indication DCI received in a CORESET configured/ associated with the CORESETPoolIndex value—for receiving PDSCH(s) associated to the CORESETPoolIndex value—e.g., the PDSCH(s) is scheduled by a scheduling DCI received in a CORESET configured/associated with the CORESETPoolIndex value, t_1 (e.g., in terms of slots, symbols, and etc.) after reception of the beam indication DCI (e.g., t_1 slots/symbols after the last symbol/slot of the PDCCH/PDCCH candidate that carries the beam indication DCI).

In the present disclosure, t_1 could be referred to as the beam application time specified under the unified TCI framework, which is defined as follows: (1) when/if the beam indication DCI also carries PDSCH assignment, and when the UE may transmit the last symbol of a PUCCH with HARQ-ACK information corresponding to the PDSCH scheduled by the beam indication DCI, and if the one or more indicated TCI states is different from the previously indicated one(s), the one or more indicated TCI states could be applied starting from the first slot that is at least BeamAppTime_r17 symbols after the last symbol of the PUCCH; the first slot and the BeamAppTime_r17 symbols could be both determined on the carrier with the smallest SCS among the carrier(s) applying the beam indication; (2) when/if the beam indication DCI does not carry PDSCH assignment, and when the UE may transmit the last symbol of a PUCCH with HARQ-ACK information corresponding to the beam indication DCI, and if the one or more indicated TCI states is different from the previously indicated one(s), the one or more indicated TCI states could be applied starting from the first slot that is at least BeamAppTime_r17 symbols after the last symbol of the PUCCH; the first slot and the BeamAppTime_r17 symbols could be both determined on the carrier with the smallest SCS among the carrier(s) applying the beam indication.

Optionally, when the UE is configured/provided by the network enableTwoBeamsMDCI_as specified herein in the present disclosure, the UE could be able to use/apply one or more of the indicated TCI states/pairs of TCI states (respectively) associated to both of the CORESETPoolIndex values 0 and 1—e.g., the TCI states are indicated in one or more beam indication DCIs received in CORESETs (respectively) configured/associated with both of the CORESETPoolIndex values 0 and 1—to simultaneously receive PDSCH(s) (respectively) associated to both of the CORESETPoolIndex values 0 and 1—e.g., the PDSCH(s) is scheduled by one or more scheduling DCIs received in CORESETs (respectively) configured/associated with both of the CORESET-PoolIndex values 0 and 1, t_1 (e.g., in terms of slots, symbols, and etc.) after reception of a beam indication DCI (e.g., t_1 slots/symbols after the last symbol/slot of the PDCCH/PDCCH candidate that carries the beam indication DCI), wherein the beam indication DCI could be received in CORESET(s) associated/configured with CORESETPoolIndex value(s) 0 and/or 1 according to network's configuration/indication via higher layer RRC signaling/parameter and/or MAC CE command and/or dynamic DCI based L1 signaling, and/or the beam indication DCI could be received the earliest or the latest in time among all the beam indication DCIs received in CORESET(s) associated/configured with CORESETPoolIndex value(s) 0 and/or 1.

In the present disclosure, t_1 could be referred to as the beam application time specified under the unified TCI framework, which is defined as follows: (1) when/if the beam indication DCI also carries PDSCH assignment, and when the UE may transmit the last symbol of a PUCCH with HARQ-ACK information corresponding to the PDSCH scheduled by the beam indication DCI, and if the one or more indicated TCI states is different from the previously indicated one(s), the one or more indicated TCI states could be applied starting from the first slot that is at least BeamAppTime_r17 symbols after the last symbol of the PUCCH; the first slot and the BeamAppTime_r17 symbols could be both determined on the carrier with the smallest SCS among the carrier(s)—e.g., associated with CORESET-PoolIndex value(s) 0 and/or 1—applying the beam indication; (2) when/if the beam indication DCI does not carry PDSCH assignment, and when the UE may transmit the last symbol of a PUCCH with HARQ-ACK information corresponding to the beam indication DCI, and if the one or more indicated TCI states is different from the previously indicated one(s), the one or more indicated TCI states could be applied starting from the first slot that is at least BeamApp-Time_r17 symbols after the last symbol of the PUCCH; the first slot and the BeamAppTime_r17 symbols could be both determined on the carrier with the smallest SCS among the carrier(s)—e.g., associated with CORESETPoolIndex value(s) 0 and/or 1—applying the beam indication.

In one example, when/if the scheduling offset—e.g., the time duration/difference between the last symbol/slot of the PDCCH/PDCCH candidate received in a CORESET configured/associated with CORESETPoolIndex value 0 that carries the beam indication DCI_a and the first symbol/slot of the PDSCH associated to CORESETPoolIndex value 0, e.g., scheduled by the beam indication DCI_a—is less than or equal to t_1 associated to the beam indication DCI_a, the UE could use/apply one or more (previously) indicated TCI states for CORESETPoolIndex value 0 (or 1), e.g., in a beam indication DCI_a' received in a CORESET configured/ associated with CORESETPoolIndex value 0 (or 1), to receive the PDSCH, and/or when/if the UE is configured/ provided by the network enableTwoDefaultBeamsMDCI (and/or set to "enabled") as specified herein in the present disclosure, the UE could use/apply one or more—e.g., two—(previously) indicated TCI states for CORESET-PoolIndex values 0 and 1, e.g., in beam indication DCI_a' received in CORESETs respectively configured/associated with CORESETPoolIndex values 0 and 1, to simultaneously receive the PDSCH(s) respectively associated to CORESET-PoolIndex values 0 and 1—e.g., scheduled/activated by PDCCH(s)/DCI(s) received in CORESET(s) respectively associated/configured with CORESETPoolIndex values 0 and 1, wherein (1) the time offset between the beam indication DCI_a' (e.g., received the earliest or latest in time among all the beam indication DCIs received in CORESETs associated/configured with CORESETPoolIndex value(s) 0 and/or 1) and the PDSCH—e.g., the time duration/difference between the last symbol/slot of the PDCCH/PDCCH candidate that carries the beam indication DCI_a' and the first symbol/slot of the PDSCH—is greater than or equal to t_1 associated to the beam indication DCI_a," and/or (2) the beam indication DCI_a' is received the most recent in time relative to the beam indication DCI_a, and/or (3) the TCI state(s) indicated in the beam indication DCI_a' is joint or (separate) DL TCI state(s) provided by TCI-State or DLor-Joint-TCIState, and/or (4) the number of the TCI state(s) indicated in the beam indication DCI_a' is one or two.

In another example, when/if the scheduling offset—e.g., the time duration/difference between the last symbol/slot of the PDCCH/PDCCH candidate received in a CORESET configured/associated with CORESETPoolIndex value 1 that carries the beam indication DCI_b and the first symbol/slot of the PDSCH associated to CORESETPoolIndex value 1, e.g., scheduled by the beam indication DCI_b—is less than or equal to t_1 associated to the beam indication DCI_b, the UE could use/apply one or more (previously) indicated TCI states for CORESETPoolIndex value 1 (or 0), e.g., in a beam indication DCI_b' received in a CORESET configured/associated with CORESETPoolIndex value 1 (or 0), to receive the PDSCH, and/or when/if the UE is configured/provided by the network enableTwoDefaultBeam-sMDCI (and/or set to "enabled") as specified herein in the present disclosure, the UE could use/apply one or more—e.g., two—(previously) indicated TCI states for CORESET-PoolIndex values 0 and 1, e.g., in beam indication DCI_b' received in CORESETs respectively configured/associated with CORESETPoolIndex values 0 and 1, to simultaneously receive the PDSCH(s) respectively associated to CORESET-PoolIndex values 0 and 1—e.g., scheduled/activated by PDCCH(s)/DCI(s) received in CORESET(s) respectively associated/configured with CORESETPoolIndex values 0 and 1, wherein (1) the time offset between the beam indication DCI_b' (e.g., received the earliest or latest in time among all the beam indication DCIs received in CORESETs associated/configured with CORESETPoolIndex value(s) 0 and/or 1) and the PDSCH—e.g., the time duration/difference between the last symbol/slot of the PDCCH/PDCCH candidate that carries the beam indication DCI_b' and the first symbol/slot of the PDSCH—is greater than or equal to t_1 associated to the beam indication DCI_b," and/or (2) the beam indication DCI_b' is received the most recent in time relative to the beam indication DCI_b, and/or (3) the TCI state(s) indicated in the beam indication DCI_b' is joint or (separate) DL TCI state(s) provided by TCI-State or DLor-Joint-TCIState, and/or (4) the number of the TCI state(s) indicated in the beam indication DCI_b' is one or two.

In yet another example, when/if the scheduling offset—e.g., the time duration/difference between the last symbol/slot of the PDCCH/PDCCH candidate received in a CORE- SET configured/associated with CORESETPoolIndex value 0 that carries the beam indication DCI_a and the first symbol/slot of the PDSCH associated to CORESETPoolIndex value 0, e.g., scheduled by the beam indication DCI_a—is less than or equal to t_1 associated to the beam indication DCI_a, and/or when/if the UE is configured/provided by the network enableTwoDefaultBeamsMDCI (and/or set to "enabled") as specified herein in the present disclosure, the UE could use/apply (1) one or more (previously) indicated TCI states for CORESETPoolIndex value 0 (or 1), e.g., in a beam indication DCI_a' received in a CORESET configured/associated with CORESETPoolIndex value 0 (or 1), and (2) one or more (previously) indicated TCI states for CORESETPoolIndex value 1 (or 0), e.g., in a beam indication DCI_b' received in a CORESET configured/associated with CORESETPoolIndex value 1 (or 0) to (simultaneously) receive the PDSCH, wherein (1) the time offset between the beam indication DCI_a' and the PDSCH—e.g., the time duration/difference between the last symbol/slot of the PDCCH/PDCCH candidate that carries the beam indication DCI_a' and the first symbol/slot of the PDSCH—is greater than or equal to t_1 associated to the beam indication DCI_a," and/or (2) the time offset between the beam indication DCI_b' and the PDSCH—e.g., the time duration/difference between the last symbol/slot of the PDCCH/PDCCH candidate that carries the beam indication DCI_b' and the first symbol/slot of the PDSCH—is greater than or equal to t_1 associated to the beam indication DCI_b," and/or (3) the beam indication DCI_a' and/or DCI_b' are received the most recent in time relative to the beam indication DCI_a, and/or (4) the TCI state(s) indicated in the beam indication DCI_a' and/or DCI_b' is joint or (separate) DL TCI state(s) provided by TCI-State or DLorJoint-TCIState, and/or (5) the number of the TCI state(s) indicated in the beam indication DCI_a' and/or DCI_b' is one or two.

In yet another example, when/if the scheduling offset—e.g., the time duration/difference between the last symbol/slot of the PDCCH/PDCCH candidate received in a CORE-SET configured/associated with CORESETPoolIndex value 1 that carries the beam indication DCI_b and the first symbol/slot of the PDSCH associated to CORESETPoolIndex value 1, e.g., scheduled by the beam indication DCI_b—is less than or equal to t_1 associated to the beam indication DCI_b, and/or when/if the UE is configured/provided by the network enableTwoDefaultBeamsMDCI (and/or set to "enabled") as specified herein in the present disclosure, the UE could use/apply (1) one or more (previously) indicated TCI states for CORESETPoolIndex value 0 (or 1), e.g., in a beam indication DCI_a' received in a CORESET config-ured/associated with CORESETPoolIndex value 0 (or 1), and (2) one or more (previously) indicated TCI states for CORESETPoolIndex value 1 (or 0), e.g., in a beam indica-tion DCI_b' received in a CORESET configured/associated with CORESETPoolIndex value 1 (or 0) to (simultaneously) receive the PDSCH, wherein (1) the time offset between the beam indication DCI_a' and the PDSCH—e.g., the time duration/difference between the last symbol/slot of the PDCCH/PDCCH candidate that carries the beam indication DCI_a' and the first symbol/slot of the PDSCH—is greater than or equal to t_1 associated to the beam indication DCI_a," and/or (2) the time offset between the beam indi-cation DCI_b' and the PDSCH—e.g., the time duration/difference between the last symbol/slot of the PDCCH/PDCCH candidate that carries the beam indication DCI_b' and the first symbol/slot of the PDSCH—is greater than or equal to t_1 associated to the beam indication DCI_b," and/or (3) the beam indication DCI_a' and/or DCI_b' are received the most recent in time relative to the beam indication DCI_b, and/or (4) the TCI state(s) indicated in the beam indication DCI_a' and/or DCI_b' is joint or (separate) DL TCI state(s) provided by TCI-State or DLorJoint-TCIState, and/or (5) the number of the TCI state(s) indicated in the beam indication DCI_a' and/or DCI_b' is one or two.

A UE could be indicated/configured/provided by the network, e.g., via higher layer RRC signaling/parameter and/or MAC CE command and/or dynamic DCI based L1 signaling, that inter-cell multi-TRP operation (e.g., for MDCI based multi-TRP framework) is enabled.

For instance, the UE could be provided/configured by the network a higher layer parameter InterCellMDCImTRP set to "enabled" or configured with (SSB) information related to PCI(s) other than the serving cell PCI—e.g., SSB-MTC-AdditionalPCI; for this case, CORESETs each provided by ControlResourceSet corresponding to different CORESET-PoolIndex values could be associated with different physical cell IDs, e.g., via activated/indicated TCI states of/for the CORESETs, where CORESETs configured/associated with one CORESETPoolIndex value—e.g., 0—could be associated with the serving cell physical cell ID and CORESETs configured/associated with another CORESETPoolIndex value—e.g., 1—could be associated with a PCI other than the serving cell PCI. For a CORESET pool index value (e.g., 0 or 1)—and therefore, the corresponding/associated PCI as specified herein in the present disclosure, the UE could be able to use/apply one or more of the indicated TCI states/pairs of TCI states associated to the CORESETPoolIndex value (and therefore, the corresponding/associated PCI value)—e.g., the TCI state(s) is indicated in a beam indication DCI received in a CORESET configured/associated with the CORESETPoolIndex value—for receiving PDSCH(s) associated to the CORESETPoolIndex value (and therefore, the corresponding/associated PCI value)—e.g., the PDSCH(s) is scheduled by a scheduling DCI received in a CORESET configured/associated with the CORESETPoolIndex value, t_1 (e.g., in terms of slots, symbols, and etc.) after reception of the beam indication DCI (e.g., t_1 slots/symbols after the last symbol/slot of the PDCCH/PDCCH candidate that carries the beam indication DCI). In the present disclosure, t_1 could be referred to as the beam application time specified under the unified TCI framework, which is defined as follows: (1) when/if the beam indication DCI also carries PDSCH assignment, and when the UE may transmit the last symbol of a PUCCH with HARQ-ACK information corresponding to the PDSCH scheduled by the beam indication DCI, and if the one or more indicated TCI states is different from the previously indicated one(s), the one or more indicated TCI states could be applied starting from the first slot that is at least BeamAppTime_r17 symbols after the last symbol of the PUCCH; the first slot and the BeamAppTime_r17 symbols could be both determined on the carrier with the smallest SCS among the carrier(s) applying the beam indication; (2) when/if the beam indication DCI does not carry PDSCH assignment, and when the UE may transmit the last symbol of a PUCCH with HARQ-ACK information corresponding to the beam indication DCI, and if the one or more indicated TCI states is different from the previously indicated one(s), the one or more indicated TCI states could be applied starting from the first slot that is at least BeamAppTime_r17 symbols after the last symbol of the PUCCH; the first slot and the BeamAppTime_r17 symbols could be both determined on the carrier with the smallest SCS among the carrier(s) applying the beam indication.

Optionally, when the UE is configured/provided by the network enableTwoBeamsMDCI_as specified herein in the present disclosure, the UE could be able to use/apply one or more of the indicated TCI states/pairs of TCI states (respectively) associated to both of the CORESETPoolIndex values 0 and 1 (and therefore, the corresponding/associated PCI values)—e.g., the TCI states are indicated in one or more beam indication DCIs received in CORESETs (respectively) configured/associated with both of the CORESETPoolIndex values 0 and 1 (and therefore, the corresponding/associated PCI values)—to simultaneously receive PDSCH(s) (respectively) associated to both of the CORESETPoolIndex values 0 and 1 (and therefore, the corresponding/associated PCI values)—e.g., the PDSCH(s) is scheduled by one or more scheduling DCIs received in CORESETs (respectively) configured/associated with both of the CORESETPoolIndex values 0 and 1 (and therefore, the corresponding/associated PCI values), t_1 (e.g., in terms of slots, symbols, and etc.) after reception of a beam indication DCI (e.g., t_1 slots/symbols after the last symbol/slot of the PDCCH/PDCCH candidate that carries the beam indication DCI), wherein the beam indication DCI could be received in CORESET(s) (respectively) associated/configured with CORESETPoolIndex value(s) 0 and/or 1 (and therefore, the corresponding/associated PCI value(s)) according to network's configuration/indication via higher layer RRC signaling/parameter and/or MAC CE command and/or dynamic DCI based L1 signaling, and/or the beam indication DCI could be received the earliest or the latest in time among all the beam indication DCIs received in CORESET(s) associated/configured with CORESETPoolIndex value(s) 0 and/or 1 (and therefore, the corresponding/associated PCI value(s)).

In the present disclosure, t_1 could be referred to as the beam application time specified under the unified TCI framework, which is defined as follows: (1) when/if the beam indication DCI also carries PDSCH assignment, and when the UE may transmit the last symbol of a PUCCH with HARQ-ACK information corresponding to the PDSCH scheduled by the beam indication DCI, and if the one or more indicated TCI states is different from the previously indicated one(s), the one or more indicated TCI states could be applied starting from the first slot that is at least BeamAppTime_r17 symbols after the last symbol of the PUCCH; the first slot and the BeamAppTime_r17 symbols could be both determined on the carrier with the smallest SCS among the carrier(s)—e.g., associated with CORESETPoolIndex value(s) 0 and/or 1 (and therefore, the corresponding/associated PCI value(s))—applying the beam indication; (2) when/if the beam indication DCI does not carry PDSCH assignment, and when the UE may transmit the last symbol of a PUCCH with HARQ-ACK information corresponding to the beam indication DCI, and if the one or more indicated TCI states is different from the previously indicated one(s), the one or more indicated TCI states could be applied starting from the first slot that is at least BeamApp-Time_r17 symbols after the last symbol of the PUCCH; the first slot and the BeamAppTime_r17 symbols could be both determined on the carrier with the smallest SCS among the carrier(s)—e.g., associated with CORESETPoolIndex value(s) 0 and/or 1 (and therefore, the corresponding/associated PCI value(s))—applying the beam indication.

In one example, when/if the scheduling offset—e.g., the time duration/difference between the last symbol/slot of the PDCCH/PDCCH candidate received in a CORESET—configured/associated with the CORESETPoolIndex value (e.g., 0) that is associated to the serving cell PCI—that carries the beam indication DCI_a and the first symbol/slot of the PDSCH associated to the CORESETPoolIndex value (and therefore, the serving cell PCI), e.g., scheduled by the beam indication DCI_a—is less than or equal to t_1 associated to the beam indication DCI_a, the UE could use/apply one or more (previously) indicated TCI states for the CORESET-PoolIndex value (and therefore, the serving cell PCI), e.g., in a beam indication DCI_a' received in a CORESET configured/associated with the CORESETPoolIndex value (e.g., 0) that is associated to the serving cell PCI, to receive the PDSCH, and/or when/if the UE is configured/provided by the network enableTwoDefaultBeamsMDCI (and/or set to "enabled") as specified herein in the present disclosure, the UE could use/apply one or more—e.g., two—(previously) indicated TCI states for CORESETPoolIndex values 0 and 1 (and therefore, the corresponding/associated serving cell PCI and a PCI other than the serving cell PCI), e.g., in beam indication DCI_a' received in CORESETs respectively configured/associated with CORESETPoolIndex values 0 and 1, to simultaneously receive the PDSCH(s) respectively associated to CORESETPoolIndex values 0 and 1—e.g., scheduled/activated by PDCCH(s)/DCI(s) received in CORESET(s) respectively associated/configured with CORESETPoolIndex values 0 and 1 (and therefore, the corresponding/associated serving cell PCI and a PCI other than the serving cell PCI), wherein (1) the time offset between the beam indication DCI_a' (e.g., received the earliest or latest in time among all the beam indication DCIs received in CORESETs associated/configured with CORE-SETPoolIndex value(s) 0 and/or 1, and therefore the corresponding serving cell PCI and/or the PCI other than the serving cell PCI) and the PDSCH—e.g., the time duration/difference between the last symbol/slot of the PDCCH/PDCCH candidate that carries the beam indication DCI_a' and the first symbol/slot of the PDSCH—is greater than or equal to t_1 associated to the beam indication DCI_a," and/or (2) the beam indication DCI_a' is received the most recent in time relative to the beam indication DCI_a, and/or (3) the TCI state(s) indicated in the beam indication DCI_a' is joint or (separate) DL TCI state(s) provided by TCI-State or DLorJoint-TCIState, and/or (4) the number of the TCI state(s) indicated in the beam indication DCI_a' is one or two, and/or (5) the PDSCH could be UE-dedicated PDSCH and/or non-UE-dedicated (or common) PDSCH (e.g., when enableTwoDefaultBeamsMDCI is configured/enabled).

In another example, when/if the scheduling offset—e.g., the time duration/difference between the last symbol/slot of the PDCCH/PDCCH candidate received in a CORESET—configured/associated with the CORESETPoolIndex value (e.g., 1) that is associated to the PCI other than the serving cell PCI—that carries the beam indication DCI_b and the first symbol/slot of the PDSCH associated to the CORE-SETPoolIndex value (and therefore, the PCI other than the serving cell PCI), e.g., scheduled by the beam indication DCI_b—is less than or equal to t_1 associated to the beam indication DCI_b, the UE could use/apply one or more (previously) indicated TCI states for the CORESETPoolIndex value (and therefore, the PCI other than the serving cell PCI), e.g., in a beam indication DCI_b' received in a CORESET configured/associated with the CORESET-PoolIndex value (e.g., 1) that is associated to the PCI other than the serving cell PCI, to receive the PDSCH, and/or when/if the UE is configured/provided by the network enableTwoDefaultBeamsMDCI (and/or set to "enabled") as specified herein in the present disclosure, the UE could use/apply one or more—e.g., two—(previously) indicated TCI states for CORESETPoolIndex values 0 and 1 (and therefore, the corresponding/associated serving cell PCI and a PCI other than the serving cell PCI), e.g., in beam indication DCI_b' received in CORESETs respectively configured/associated with CORESETPoolIndex values 0 and 1, to simultaneously receive the PDSCH(s) respectively associated to CORESETPoolIndex values 0 and 1—e.g., scheduled/activated by PDCCH(s)/DCI(s) received in CORESET(s) respectively associated/configured with CORESETPoolIndex values 0 and 1 (and therefore, the corresponding/associated serving cell PCI and a PCI other than the serving cell PCI), wherein (1) the time offset between the beam indication DCI_b' (e.g., received the earliest or latest in time among all the beam indication DCIs received in CORESETs associated/configured with CORE-SETPoolIndex value(s) 0 and/or 1, and therefore the corresponding serving cell PCI and/or the PCI other than the serving cell PCI) and the PDSCH—e.g., the time duration/difference between the last symbol/slot of the PDCCH/PDCCH candidate that carries the beam indication DCI_b' and the first symbol/slot of the PDSCH—is greater than or equal to t_1 associated to the beam indication DCI_b," and/or (2) the beam indication DCI_b' is received the most recent in time relative to the beam indication DCI_b, and/or (3) the TCI state(s) indicated in the beam indication DCI_b' is joint or (separate) DL TCI state(s) provided by TCI-State or DLorJoint-TCIState, and/or (4) the number of the TCI state(s) indicated in the beam indication DCI_b' is one or two, and/or (5) the PDSCH could be at least UE-dedicated PDSCH and/or non-UE-dedicated (or common) PDSCH (e.g., when enableTwoDefaultBeamsMDCI is configured/enabled).

In yet another example, when/if the scheduling offset—e.g., the time duration/difference between the last symbol/slot of the PDCCH/PDCCH candidate received in a CORE-SET—configured/associated with the CORESETPoolIndex value (e.g., 0) that is associated with the serving cell PCI—that carries the beam indication DCI_a and the first symbol/slot of the PDSCH associated to the CORESET-PoolIndex value (and therefore, the serving cell PCI), e.g., scheduled by the beam indication DCI_a—is less than or equal to t_1 associated to the beam indication DCI_a, and/or when/if the UE is configured/provided by the network enableTwoDefaultBeamsMDCI (and/or set to "enabled") as specified herein in the present disclosure, the UE could use/apply (1) one or more (previously) indicated TCI states for the CORESETPoolIndex value (e.g., 0) that is associated to the serving cell PCI, e.g., in a beam indication DCI_a' received in a CORESET configured/associated with the CORESETPoolIndex value (e.g., 0) that is associated to the serving cell PCI, and (2) one or more (previously) indicated TCI states for the CORESETPoolIndex value (e.g., 1) that is associated to the PCI other than the serving cell PCI, e.g., in a beam indication DCI_b' received in a CORESET configured/associated with the CORESETPoolIndex value (e.g., 1) that is associated to the PCI other than the serving cell PCI, to (simultaneously) receive the PDSCH, wherein (1) the time offset between the beam indication DCI_a' and the PDSCH—e.g., the time duration/difference between the last symbol/slot of the PDCCH/PDCCH candidate that carries the beam indication DCI_a' and the first symbol/slot of the PDSCH—is greater than or equal to t_1 associated to the beam indication DCI_a," and/or (2) the time offset between the beam indication DCI_b' and the PDSCH—e.g., the time duration/difference between the last symbol/slot of the PDCCH/PDCCH candidate that carries the beam indication DCI_b' and the first symbol/slot of the PDSCH—is greater than or equal to t_1 associated to the beam indication DCI_b," and/or (3) the beam indication DCI_a' and/or DCI_b' are received the most recent in time relative to the beam indication DCI_a, and/or (4) the TCI state(s) indicated in the beam indication DCI_a' and/or DCI_b' is joint or (separate) DL TCI state(s) provided by TCI-State or DLor-Joint-TCIState, and/or (5) the number of the TCI state(s) indicated in the beam indication DCI_a' and/or DCI_b' is one or two, and/or (6) the PDSCH could be UE-dedicated PDSCH and/or non-UE-dedicated (or common) PDSCH (e.g., when enableTwoDefaultBeamsMDCI is configured/enabled).

In yet another example, when/if the scheduling offset—e.g., the time duration/difference between the last symbol/slot of the PDCCH/PDCCH candidate received in a CORE-SET—configured/associated with the CORESETPoolIndex value (e.g., 1) that is associated with the PCI other than the serving cell PCI—that carries the beam indication DCI_b and the first symbol/slot of the PDSCH associated to the CORESETPoolIndex value (and therefore, the PCI other than serving cell PCI), e.g., scheduled by the beam indication DCI_b—is less than or equal to t_1 associated to the beam indication DCI_b, and/or when/if the UE is configured/provided by the network enableTwoDefaultBeamsMDCI (and/or set to "enabled") as specified herein in the present disclosure, the UE could use/apply (1) one or more (previously) indicated TCI states for the CORESETPoolIndex value (e.g., 0) that is associated to the serving cell PCI, e.g., in a beam indication DCI_a' received in a CORESET configured/associated with the CORESETPoolIndex value (e.g., 0) that is associated to the serving cell PCI, to receive at least non-UE-dedicated (or common) PDSCH, and (2) one or more (previously) indicated TCI states for the CORE-SETPoolIndex value (e.g., 1) that is associated to the PCI other than the serving cell PCI, e.g., in a beam indication DCI_b' received in a CORESET configured/associated with the CORESETPoolIndex value (e.g., 1) that is associated to the PCI other than the serving cell PCI, to receive at least UE-dedicated PDSCH, wherein (1) the time offset between the beam indication DCI_a' and the PDSCH—e.g., the time duration/difference between the last symbol/slot of the PDCCH/PDCCH candidate that carries the beam indication DCI_a' and the first symbol/slot of the PDSCH—is greater than or equal to t_1 associated to the beam indication DCI_a," and/or (2) the time offset between the beam indication DCI_b' and the PDSCH—e.g., the time duration/difference between the last symbol/slot of the PDCCH/PDCCH candidate that carries the beam indication DCI_b' and the first symbol/slot of the PDSCH—is greater than or equal to t_1 associated to the beam indication DCI_b," and/or (3) the beam indication DCI_a' and/or DCI_b' are received the most recent in time relative to the beam indication DCI_a, and/or (4) the TCI state(s) indicated in the beam indication DCI_a' and/or DCI_b' is joint or (separate) DL TCI state(s) provided by TCI-State or DLorJoint-TCIState, and/or (5) the number of the TCI state(s) indicated in the beam indication DCI_a' and/or DCI_b' is one or two, and/or (6) the PDSCH could be UE-dedicated PDSCH and/or non-UE-dedicated (or common) PDSCH (e.g., when enableTwoDefaultBeamsMDCI is configured/enabled).

In yet another example, when/if the scheduling offset—e.g., the time duration/difference between the last symbol/slot of the PDCCH/PDCCH candidate received in a CORE-SET—configured/associated with the CORESETPoolIndex value (e.g., 0) that is associated with the serving cell PCI—that carries the beam indication DCI_a and the first symbol/slot of the PDSCH associated to the CORESET-PoolIndex value (and therefore, the serving cell PCI), e.g., scheduled by the beam indication DCI_a—is less than or equal to t_1 associated to the beam indication DCI_a, and/or when/if the UE is configured/provided by the network enableTwoDefaultBeamsMDCI (and/or set to "enabled") as specified herein in the present disclosure, the UE could use/apply (1) one or more (previously) indicated TCI states for the CORESETPoolIndex value (e.g., 0) that is associated to the serving cell PCI, e.g., in a beam indication DCI_a' received in a CORESET configured/associated with the CORESETPoolIndex value (e.g., 0) that is associated to the serving cell PCI, and (2) one or more indicated TCI states for the CORESET associated with a monitored search space with the lowest CORESET ID among CORESETs, which are configured with the same value of a CORESETPoolIndex associated to the serving cell PCI (e.g., CORESET-PoolIndex="0") or the PCI other than the serving cell PCI (e.g., CORESETPoolIndex="1"), in the latest slot in which one or more CORESETs associated with the same value of the CORESETPoolIndex within the active BWP of the serving cell are monitored by the UE, to (simultaneously) receive the PDSCH, wherein (1) the time offset between the beam indication DCI_a' and the PDSCH—e.g., the time duration/difference between the last symbol/slot of the PDCCH/PDCCH candidate that carries the beam indication DCI_a' and the first symbol/slot of the PDSCH—is greater than or equal to t_1 associated to the beam indication DCI_a," and/or (2) the beam indication DCI_a' is received the most recent in time relative to the beam indication DCI_a, and/or (3) the TCI state(s) indicated in the beam indication DCI_a' is joint or (separate) DL TCI state(s) provided by TCI-State or DLorJoint-TCIState, and/or (4) the number of the TCI state(s) indicated in the beam indication DCI_a' is one or two, and/or (5) the PDSCH could be UE-dedicated PDSCH and/or non-UE-dedicated (or common) PDSCH (e.g., when enableTwoDefaultBeamsMDCI is configured/enabled).

In yet another example, when/if the scheduling offset—e.g., the time duration/difference between the last symbol/slot of the PDCCH/PDCCH candidate received in a CORE-SET—configured/associated with the CORESETPoolIndex value (e.g., 1) that is associated with the PCI other than the serving cell PCI—that carries the beam indication DCI_b and the first symbol/slot of the PDSCH associated to the CORESETPoolIndex value (and therefore, the PCI other than serving cell PCI), e.g., scheduled by the beam indication DCI_b—is less than or equal to t_1 associated to the beam indication DCI_b, and/or when/if the UE is configured/provided by the network enableTwoDefaultBeamsMDCI (and/or set to "enabled") as specified herein in the present disclosure, the UE could use/apply (1) one or more indicated TCI states for the CORESET associated with a monitored search space with the lowest CORESET ID among CORESETs, which are configured with the same value of a CORESETPoolIndex associated to the serving cell PCI (e.g., CORESETPoolIndex="0") or the PCI other than the serving cell PCI (e.g., CORESETPoolIndex="1"), in the latest slot in which one or more CORESETs associated with the same value of the CORESETPoolIndex within the active BWP of the serving cell are monitored by the UE, to receive at least non-UE-dedicated (or common) PDSCH, and (2) one or more (previously) indicated TCI states for the CORESETPoolIndex value (e.g., 1) that is associated to the PCI other than the serving cell PCI, e.g., in a beam indication DCI_b' received in a CORESET configured/associated with the CORESETPoolIndex value (e.g., 1) that is associated to the PCI other than the serving cell PCI, to receive at least UE-dedicated PDSCH, wherein (1) the time offset between the beam indication DCI_b' and the PDSCH—e.g., the time duration/difference between the last symbol/slot of the PDCCH/PDCCH candidate that carries the beam indication DCI_b' and the first symbol/slot of the PDSCH—is greater than or equal to t_1 associated to the beam indication DCI_b," and/or (2) the beam indication DCI_b' is received the most recent in time relative to the beam indication DCI_a, and/or (3) the TCI state(s) indicated in the beam indication DCI_b' is joint or (separate) DL TCI state(s) provided by TCI-State or DLorJoint-TCIState, and/or (4) the number of the TCI state(s) indicated in the beam indication DCI_b' is one or two, and/or (5) the PDSCH could be UE-dedicated PDSCH and/or non-UE-dedicated (or common) PDSCH (e.g., when enableTwoDefaultBeamsMDCI is enabled/configured).

Optionally, when the inter-cell multi-TRP operation is enabled as specified herein in the present disclosure, CORESETs each provided by ControlResourceSet corresponding to different CORESETPoolIndex values could be associated with different physical cell IDs, e.g., via activated/indicated TCI states of/for the CORESETs, where CORESETs configured/associated with one CORESETPoolIndex value—e.g., 0—could be associated with a first PCI other than the serving cell physical cell ID and CORESETs configured/associated with another CORESETPoolIndex value—e.g., 1—could be associated with a second PCI other than the serving cell PCI. For a CORESET pool index value (e.g., 0 or 1)—and therefore, the corresponding/associated PCI as specified herein in the present disclosure, the UE could be able to use/apply one or more of the indicated TCI states/pairs of TCI states associated to the CORESETPoolIndex value (and therefore, the corresponding/associated PCI value)—e.g., the TCI state(s) is indicated in a beam indication DCI received in a CORESET configured/associated with the CORESETPoolIndex value—for receiving PDSCH(s) associated to the CORESETPoolIndex value (and therefore, the corresponding/associated PCI value)—e.g., the PDSCH(s) is scheduled by a scheduling DCI received in a CORESET configured/associated with the CORESETPoolIndex value, t_1 (e.g., in terms of slots, symbols, and etc.) after reception of the beam indication DCI (e.g., t_1 slots/symbols after the last symbol/slot of the PDCCH/PDCCH candidate that carries the beam indication DCI).

In the present disclosure, t_1 could be referred to as the beam application time specified under the unified TCI framework, which is defined as follows: (1) when/if the beam indication DCI also carries PDSCH assignment, and when the UE may transmit the last symbol of a PUCCH with HARQ-ACK information corresponding to the PDSCH scheduled by the beam indication DCI, and if the one or more indicated TCI states is different from the previously indicated one(s), the one or more indicated TCI states could be applied starting from the first slot that is at least BeamAppTime_r17 symbols after the last symbol of the PUCCH; the first slot and the BeamAppTime_r17 symbols could be both determined on the carrier with the smallest SCS among the carrier(s) applying the beam indication; (2) when/if the beam indication DCI does not carry PDSCH assignment, and when the UE may transmit the last symbol of a PUCCH with HARQ-ACK information corresponding to the beam indication DCI, and if the one or more indicated TCI states is different from the previously indicated one(s), the one or more indicated TCI states could be applied starting from the first slot that is at least BeamAppTime_r17 symbols after the last symbol of the PUCCH; the first slot and the BeamAppTime_r17 symbols could be both determined on the carrier with the smallest SCS among the carrier(s) applying the beam indication.

Optionally, when the UE is configured/provided by the network enableTwoBeamsMDCI_as specified herein in the present disclosure, the UE could be able to use/apply one or more of the indicated TCI states/pairs of TCI states (respectively) associated to both of the CORESETPoolIndex values 0 and 1 (and therefore, the corresponding/associated PCI values)—e.g., the TCI states are indicated in one or more beam indication DCIs received in CORESETs (respectively) configured/associated with both of the CORESETPoolIndex values 0 and 1 (and therefore, the corresponding/associated PCI values)—to simultaneously receive PDSCH(s) (respectively) associated to both of the CORESETPoolIndex values 0 and 1 (and therefore, the corresponding/associated PCI values)—e.g., the PDSCH(s) is scheduled by one or more scheduling DCIs received in CORESETs (respectively) configured/associated with both of the CORESETPoolIndex values 0 and 1 (and therefore, the corresponding/associated PCI values), t_1 (e.g., in terms of slots, symbols, and etc.) after reception of a beam indication DCI (e.g., t_1 slots/symbols after the last symbol/slot of the PDCCH/PDCCH candidate that carries the beam indication DCI), wherein the beam indication DCI could be received in CORESET(s) (respectively) associated/configured with CORESETPoolIndex value(s) 0 and/or 1 (and therefore, the corresponding/associated PCI value(s)) according to network's configuration/indication via higher layer RRC signaling/parameter and/or MAC CE command and/or dynamic DCI based L1 signaling, and/or the beam indication DCI could be received the earliest or the latest in time among all the beam indication DCIs received in CORESET(s) associated/configured with CORESETPoolIndex value(s) 0 and/or 1 (and therefore, the corresponding/associated PCI value(s)).

In the present disclosure, t_1 could be referred to as the beam application time specified under the unified TCI framework, which is defined as follows: (1) when/if the beam indication DCI also carries PDSCH assignment, and when the UE may transmit the last symbol of a PUCCH with HARQ-ACK information corresponding to the PDSCH scheduled by the beam indication DCI, and if the one or more indicated TCI states is different from the previously indicated one(s), the one or more indicated TCI states could be applied starting from the first slot that is at least BeamAppTime_r17 symbols after the last symbol of the PUCCH; the first slot and the BeamAppTime_r17 symbols could be both determined on the carrier with the smallest SCS among the carrier(s)—e.g., associated with CORESETPoolIndex value(s) 0 and/or 1 (and therefore, the corresponding/associated PCI value(s))—applying the beam indication; (2) when/if the beam indication DCI does not carry PDSCH assignment, and when the UE may transmit the last symbol of a PUCCH with HARQ-ACK information corresponding to the beam indication DCI, and if the one or more indicated TCI states is different from the previously indicated one(s), the one or more indicated TCI states could be applied starting from the first slot that is at least BeamAppTime_r17 symbols after the last symbol of the PUCCH; the first slot and the BeamAppTime_r17 symbols could be both determined on the carrier with the smallest SCS among the carrier(s)—e.g., associated with CORESETPoolIndex value(s) 0 and/or 1 (and therefore, the corresponding/associated PCI value(s))—applying the beam indication.

In one example, when/if the scheduling offset—e.g., the time duration/difference between the last symbol/slot of the PDCCH/PDCCH candidate received in a CORESET—configured/associated with the CORESETPoolIndex value (e.g., 0) that is associated to the first PCI—that carries the beam indication DCI_a and the first symbol/slot of the PDSCH associated to the CORESETPoolIndex value (and therefore, the first PCI), e.g., scheduled by the beam indication DCI_a—is less than or equal to t_1 associated to the beam indication DCI_a, the UE could use/apply one or more (previously) indicated TCI states for the CORESETPoolIndex value (and therefore, the first PCI), e.g., in a beam indication DCI_a' received in a CORESET configured/ associated with the CORESETPoolIndex value (e.g., 0) that is associated to the first PCI, to receive the PDSCH, and/or when/if the UE is configured/provided by the network enableTwoDefaultBeamsMDCI (and/or set to "enabled") as specified herein in the present disclosure, the UE could use/apply one or more—e.g., two—(previously) indicated TCI states for CORESETPoolIndex values 0 and 1 (and therefore, the corresponding/associated first and second PCIs), e.g., in beam indication DCI_a' received in CORE- SETs respectively configured/associated with CORESET- PoolIndex values 0 and 1, to simultaneously receive the PDSCH(s) respectively associated to CORESETPoolIndex values 0 and 1—e.g., scheduled/activated by PDCCH(s)/ DCI(s) received in CORESET(s) respectively associated/ configured with CORESETPoolIndex values 0 and 1 (and therefore, the corresponding/associated first and second PCIs), wherein (1) the time offset between the beam indi- cation DCI_a' (e.g., received the earliest or latest in time among all the beam indication DCIs received in CORESETs associated/configured with CORESETPoolIndex value(s) 0 and/or 1, and therefore the corresponding first and/or second PCIs), wherein (1) the time offset between the beam indi- cation DCI_a' (e.g., received the earliest or latest in time among all the beam indication DCIs received in CORESETs associated/configured with CORESETPoolIndex value(s) 0 and/or 1, and therefore the corresponding first and/or second PCIs) and the PDSCH—e.g., the time duration/difference between the last symbol/slot of the PDCCH/PDCCH can- didate that carries the beam indication DCI_a' and the first symbol/slot of the PDSCH—is greater than or equal to t_1 associated to the beam indication DCI_a," and/or (2) the beam indication DCI_a' is received the most recent in time relative to the beam indication DCI_a, and/or (3) the TCI state(s) indicated in the beam indication DCI_a' is joint or (separate) DL TCI state(s) provided by TCI-State or DLor- Joint-TCIState, and/or (4) the number of the TCI state(s) indicated in the beam indication DCI_a' is one or two, and/or (5) the PDSCH could be UE-dedicated PDSCH and/or non-UE-dedicated (or common) PDSCH (e.g., when enableTwoDefaultBeamsMDCI is enabled/configured).

In another example, when/if the scheduling offset—e.g., the time duration/difference between the last symbol/slot of the PDCCH/PDCCH candidate received in a CORESET— configured/associated with the CORESETPoolIndex value (e.g., 1) that is associated to the second PCI—that carries the beam indication DCI_b and the first symbol/slot of the PDSCH associated to the CORESETPoolIndex value (and therefore, the second PCI), e.g., scheduled by the beam indication DCI_b—is less than or equal to t_1 associated to the beam indication DCI_b, the UE could use/apply one or more (previously) indicated TCI states for the CORESET- PoolIndex value (and therefore, the second PCI), e.g., in a beam indication DCI_b' received in a CORESET config- ured/associated with the CORESETPoolIndex value (e.g., 1) that is associated to the second PCI, to receive the PDSCH, and/or when/if the UE is configured/provided by the net- work enableTwoDefaultBeamsMDCI (and/or set to "enabled") as specified herein in the present disclosure, the UE could use/apply one or more—e.g., two—(previously) indicated TCI states for CORESETPoolIndex values 0 and 1 (and therefore, the corresponding/associated first and second PCIs), e.g., in beam indication DCI_b' received in CORESETs respectively configured/associated with CORE- SETPoolIndex values 0 and 1, to simultaneously receive the PDSCH(s) respectively associated to CORESETPoolIndex values 0 and 1—e.g., scheduled/activated by PDCCH(s)/ DCI(s) received in CORESET(s) respectively associated/ configured with CORESETPoolIndex values 0 and 1 (and therefore, the corresponding/associated first and second PCIs), wherein (1) the time offset between the beam indi- cation DCI_a' (e.g., received the earliest or latest in time among all the beam indication DCIs received in CORESETs associated/configured with CORESETPoolIndex value(s) 0 and/or 1, and therefore the corresponding first and/or second PCIs), wherein (1) the time offset between the beam indi- cation DCI_b' (e.g., received the earliest or latest in time among all the beam indication DCIs received in CORESETs associated/configured with CORESETPoolIndex value(s) 0 and/or 1, and therefore the corresponding first and/or second PCIs) and the PDSCH—e.g., the time duration/difference between the last symbol/slot of the PDCCH/PDCCH can- didate that carries the beam indication DCI_b' and the first symbol/slot of the PDSCH—is greater than or equal to t_1 associated to the beam indication DCI_b," and/or (2) the beam indication DCI_b' is received the most recent in time relative to the beam indication DCI_b, and/or (3) the TCI state(s) indicated in the beam indication DCI_b' is joint or (separate) DL TCI state(s) provided by TCI-State or DLor- Joint-TCIState, and/or (4) the number of the TCI state(s) indicated in the beam indication DCI_b' is one or two, and/or (5) the PDSCH could be at least UE-dedicated PDSCH and/or non-UE-dedicated (or common) PDSCH (e.g., when enableTwoDefaultBeamsMDCI is enabled/configured).

In yet another example, when/if the scheduling offset— e.g., the time duration/difference between the last symbol/ slot of the PDCCH/PDCCH candidate received in a CORE- SET—configured/associated with the CORESETPoolIndex value (e.g., 0) that is associated with the first PCI—that carries the beam indication DCI_a and the first symbol/slot of the PDSCH associated to the CORESETPoolIndex value (and therefore, the first PCI), e.g., scheduled by the beam indication DCI_a—is less than or equal to t_1 associated to the beam indication DCI_a, and/or when/if the UE is con- figured/provided by the network enableTwoDefaultBeam- sMDCI (and/or set to "enabled") as specified herein in the present disclosure, the UE could use/apply (1) one or more (previously) indicated TCI states for the CORESETPoolIn- dex value (e.g., 0) that is associated to the first PCI, e.g., in a beam indication DCI_a' received in a CORESET config- ured/associated with the CORESETPoolIndex value (e.g., 0) that is associated to the first PCI, and (2) one or more (previously) indicated TCI states for the CORESETPoolIn- dex value (e.g., 1) that is associated to the second PCI, e.g., in a beam indication DCI_b' received in a CORESET configured/associated with the CORESETPoolIndex value (e.g., 1) that is associated to the second PCI, to (simultane- ously) receive the PDSCH, wherein (1) the time offset between the beam indication DCI_a' and the PDSCH—e.g., the time duration/difference between the last symbol/slot of the PDCCH/PDCCH candidate that carries the beam indi- cation DCI_a' and the first symbol/slot of the PDSCH—is greater than or equal to t_1 associated to the beam indication DCI_a," and/or (2) the time offset between the beam indi- cation DCI_b' and the PDSCH—e.g., the time duration/ difference between the last symbol/slot of the PDCCH/ PDCCH candidate that carries the beam indication DCI_b' and the first symbol/slot of the PDSCH—is greater than or equal to t_1 associated to the beam indication DCI_b,"
and/or (3) the beam indication DCI_a' and/or DCI_b' are
received the most recent in time relative to the beam
indication DCI_a, and/or (4) the TCI state(s) indicated in the
beam indication DCI_a' and/or DCI_b' is joint or (separate)
DL TCI state(s) provided by TCI-State or DLorJoint-
TCIState, and/or (5) the number of the TCI state(s) indicated
in the beam indication DCI_a' and/or DCI_b' is one or two,
and/or (6) the PDSCH could be UE-dedicated PDSCH
and/or non-UE-dedicated (or common) PDSCH (e.g., when
enableTwoDefaultBeamsMDCI is enabled/configured).

In yet another example, when/if the scheduling offset—
e.g., the time duration/difference between the last symbol/
slot of the PDCCH/PDCCH candidate received in a CORE-
SET—configured/associated with the CORESETPoolIndex
value (e.g., 1) that is associated with the second PCI—that
carries the beam indication DCI_a' and the first symbol/slot
of the PDSCH associated to the CORESETPoolIndex value
(and therefore, the second PCI), e.g., scheduled by the beam
indication DCI_a'—is less than or equal to t_1 associated to
the beam indication DCI_a," and/or when/if the UE is
configured/provided by the network enableTwoDefault-
BeamsMDCI (and/or set to "enabled") as specified herein in
the present disclosure, the UE could use/apply (1) one or
more (previously) indicated TCI states for the CORESET-
PoolIndex value (e.g., 0) that is associated to the first PCI,
e.g., in a beam indication DCI_a' received in a CORESET
configured/associated with the CORESETPoolIndex value
(e.g., 0) that is associated to the first PCI, and (2) one or
more (previously) indicated TCI states for the CORESET-
PoolIndex value (e.g., 1) that is associated to the second PCI,
e.g., in a beam indication DCI_b' received in a CORESET
configured/associated with the CORESETPoolIndex value
(e.g., 1) that is associated to the second PCI, to (simultane-
ously) receive the PDSCH, wherein (1) the time offset
between the beam indication DCI_a' and the PDSCH—e.g.,
the time duration/difference between the last symbol/slot of
the PDCCH/PDCCH candidate that carries the beam indi-
cation DCI_a' and the first symbol/slot of the PDSCH—is
greater than or equal to t_1 associated to the beam indication
DCI_a," and/or (2) the time offset between the beam indi-
cation DCI_b' and the PDSCH—e.g., the time duration/
difference between the last symbol/slot of the PDCCH/
PDCCH candidate that carries the beam indication DCI_b'
and the first symbol/slot of the PDSCH—is greater than or
equal to t_1 associated to the beam indication DCI_b,"
and/or (3) the beam indication DCI_a' and/or DCI_b' are
received the most recent in time relative to the beam
indication DCI_a, and/or (4) the TCI state(s) indicated in the
beam indication DCI_a' and/or DCI_b' is joint or (separate)
DL TCI state(s) provided by TCI-State or DLorJoint-
TCIState, and/or (5) the number of the TCI state(s) indicated
in the beam indication DCI_a' and/or DCI_b' is one or two,
and/or (6) the PDSCH could be UE-dedicated PDSCH
and/or non-UE-dedicated (or common) PDSCH (e.g., when
enableTwoDefaultBeamsMDCI is configured/enabled).

In yet another example, when/if the scheduling offset—
e.g., the time duration/difference between the last symbol/
slot of the PDCCH/PDCCH candidate received in a CORE-
SET—configured/associated with the CORESETPoolIndex
value (e.g., 0) that is associated with the first PCI—that
carries the beam indication DCI_a and the first symbol/slot
of the PDSCH associated to the CORESETPoolIndex value
(and therefore, the first PCI), e.g., scheduled by the beam
indication DCI_a—is less than or equal to t_1 associated to
the beam indication DCI_a, and/or when/if the UE is con-
figured/provided by the network enableTwoDefaultBeamsMDCI (and/or set to "enabled") as specified herein in the
present disclosure, the UE could use/apply (1) one or more
(previously) indicated TCI states for the CORESETPoolIn-
dex value (e.g., 0) that is associated to the first PCI, e.g., in
a beam indication DCI_a' received in a CORESET config-
ured/associated with the CORESETPoolIndex value (e.g., 0)
that is associated to the first PCI, to receive at least UE-
dedicated PDSCH, and/or (2) one or more (previously)
indicated TCI states for the CORESETPoolIndex value
(e.g., 1) that is associated to the second PCI, e.g., in a beam
indication DCI_b' received in a CORESET configured/
associated with the CORESETPoolIndex value (e.g., 1) that
is associated to the second PCI, to receive at least UE-
dedicated PDSCH, and/or (3) one or more (previously)
indicated TCI states for the serving cell PCI, e.g., in a beam
indication DCI received in a CORESET configured/associ-
ated to the serving cell PCI, to receive at least non-UE-
dedicated (or common) PDSCH, wherein (1) the time offset
between the beam indication DCI_a' and the PDSCH—e.g.,
the time duration/difference between the last symbol/slot of
the PDCCH/PDCCH candidate that carries the beam indi-
cation DCI_a' and the first symbol/slot of the PDSCH—is
greater than or equal to t_1 associated to the beam indication
DCI_a," and/or (2) the time offset between the beam indi-
cation DCI_b' and the PDSCH—e.g., the time duration/
difference between the last symbol/slot of the PDCCH/
PDCCH candidate that carries the beam indication DCI_b'
and the first symbol/slot of the PDSCH—is greater than or
equal to t_1 associated to the beam indication DCI_b,"
and/or (3) the beam indication DCI_a' and/or DCI_b' are
received the most recent in time relative to the beam
indication DCI_a, and/or (4) the TCI state(s) indicated in the
beam indication DCI_a' and/or DCI_b' is joint or (separate)
DL TCI state(s) provided by TCI-State or DLorJoint-
TCIState, and/or (5) the number of the TCI state(s) indicated
in the beam indication DCI_a' and/or DCI_b' is one or two,
and/or (6) the PDSCH could be UE-dedicated PDSCH
and/or non-UE-dedicated (or common) PDSCH (e.g., when
enableTwoDefaultBeamsMDCI is configured/enabled).

In yet another example, when/if the scheduling offset—
e.g., the time duration/difference between the last symbol/
slot of the PDCCH/PDCCH candidate received in a CORE-
SET—configured/associated with the CORESETPoolIndex
value (e.g., 1) that is associated with the second PCI—that
carries the beam indication DCI_b and the first symbol/slot
of the PDSCH associated to the CORESETPoolIndex value
(and therefore, the second PCI), e.g., scheduled by the beam
indication DCI_b—is less than or equal to t_1 associated to
the beam indication DCI_b, and/or when/if the UE is con-
figured/provided by the network enableTwoDefaultBeam-
sMDCI (and/or set to "enabled") as specified herein in the
present disclosure, the UE could use/apply (1) one or more
(previously) indicated TCI states for the CORESETPoolIn-
dex value (e.g., 0) that is associated to the first PCI, e.g., in
a beam indication DCI_a' received in a CORESET config-
ured/associated with the CORESETPoolIndex value (e.g., 0)
that is associated to the first PCI, to receive at least UE-
dedicated PDSCH, and/or (2) one or more (previously)
indicated TCI states for the CORESETPoolIndex value
(e.g., 1) that is associated to the second PCI, e.g., in a beam
indication DCI_b' received in a CORESET configured/
associated with the CORESETPoolIndex value (e.g., 1) that
is associated to the second PCI, to receive at least UE-
dedicated PDSCH, and/or (3) one or more (previously)
indicated TCI states for the serving cell PCI, e.g., in a beam
indication DCI received in a CORESET configured/associ-
ated to the serving cell PCI, to receive at least non-UEdedicated (or common) PDSCH, wherein (1) the time offset between the beam indication DCI_a' and the PDSCH—e.g., the time duration/difference between the last symbol/slot of the PDCCH/PDCCH candidate that carries the beam indication DCI_a' and the first symbol/slot of the PDSCH—is greater than or equal to t_1 associated to the beam indication DCI_a," and/or (2) the time offset between the beam indication DCI_b' and the PDSCH—e.g., the time duration/difference between the last symbol/slot of the PDCCH/PDCCH candidate that carries the beam indication DCI_b' and the first symbol/slot of the PDSCH—is greater than or equal to t_1 associated to the beam indication DCI_b," and/or (3) the beam indication DCI_a' and/or DCI_b' are received the most recent in time relative to the beam indication DCI_a, and/or (4) the TCI state(s) indicated in the beam indication DCI_a' and/or DCI_b' is joint or (separate) DL TCI state(s) provided by TCI-State or DLorJoint-TCIState, and/or (5) the number of the TCI state(s) indicated in the beam indication DCI_a' and/or DCI_b' is one or two, and/or (6) the PDSCH could be UE-dedicated PDSCH and/or non-UE-dedicated (or common) PDSCH (e.g., when enableTwoDefaultBeamsMDCI is configured/enabled).

In yet another example, when/if the scheduling offset—e.g., the time duration/difference between the last symbol/slot of the PDCCH/PDCCH candidate received in a CORE-SET—configured/associated with the CORESETPoolIndex value (e.g., 0) that is associated with the first PCI—that carries the beam indication DCI_a and the first symbol/slot of the PDSCH associated to the CORESETPoolIndex value (and therefore, the first PCI), e.g., scheduled by the beam indication DCI_a—is less than or equal to t_1 associated to the beam indication DCI_a, and/or when/if the UE is configured/provided by the network enableTwoDefaultBeamsMDCI (and/or set to "enabled") as specified herein in the present disclosure, the UE could use/apply (1) one or more (previously) indicated TCI states for the CORESETPoolIndex value (e.g., 0) that is associated to the first PCI, e.g., in a beam indication DCI_a' received in a CORESET configured/associated with the CORESETPoolIndex value (e.g., 0) that is associated to the first PCI, to receive at least UE-dedicated PDSCH, and/or (2) one or more (previously) indicated TCI states for the CORESETPoolIndex value (e.g., 1) that is associated to the second PCI, e.g., in a beam indication DCI_b' received in a CORESET configured/associated with the CORESETPoolIndex value (e.g., 1) that is associated to the second PCI, to receive at least UE-dedicated PDSCH, and/or (3) one or more indicated TCI states for the CORESET associated with a monitored search space with the lowest CORESET ID among CORESETs, which are configured/associated with the serving cell PCI or configured with the same value of a CORESETPoolIndex associated to the first PCI (e.g., CORESETPoolIndex="0") or the second PCI (e.g., CORESETPoolIndex="1"), in the latest slot in which one or more CORESETs associated with the serving cell PCI or the same value of the CORESET-PoolIndex within the active BWP of the serving cell are monitored by the UE, to receive at least non-UE-dedicated (or common) PDSCH, wherein (1) the time offset between the beam indication DCI_a' and the PDSCH—e.g., the time duration/difference between the last symbol/slot of the PDCCH/PDCCH candidate that carries the beam indication DCI_a' and the first symbol/slot of the PDSCH—is greater than or equal to t_1 associated to the beam indication DCI_a," and/or (2) the time offset between the beam indication DCI_b' and the PDSCH—e.g., the time duration/difference between the last symbol/slot of the PDCCH/PDCCH candidate that carries the beam indication DCI_b' and the first symbol/slot of the PDSCH—is greater than or equal to t_1 associated to the beam indication DCI_b," and/or (3) the beam indication DCI_a' and/or DCI_b' are received the most recent in time relative to the beam indication DCI_a, and/or (4) the TCI state(s) indicated in the beam indication DCI_a' and/or DCI_b' is joint or (separate) DL TCI state(s) provided by TCI-State or DLorJoint-TCIState, and/or (5) the number of the TCI state(s) indicated in the beam indication DCI_a' and/or DCI_b' is one or two, and/or (6) the PDSCH could be UE-dedicated PDSCH and/or non-UE-dedicated (or common) PDSCH (e.g., when enableTwoDefaultBeamsMDCI is configured/enabled).

In yet another example, when/if the scheduling offset—e.g., the time duration/difference between the last symbol/slot of the PDCCH/PDCCH candidate received in a CORE-SET—configured/associated with the CORESETPoolIndex value (e.g., 1) that is associated with the second PCI—that carries the beam indication DCI_b and the first symbol/slot of the PDSCH associated to the CORESETPoolIndex value (and therefore, the second PCI), e.g., scheduled by the beam indication DCI_b—is less than or equal to t_1 associated to the beam indication DCI_b, and/or when/if the UE is configured/provided by the network enableTwoDefaultBeamsMDCI (and/or set to "enabled") as specified herein in the present disclosure, the UE could use/apply (1) one or more (previously) indicated TCI states for the CORESETPoolIndex value (e.g., 0) that is associated to the first PCI, e.g., in a beam indication DCI_a' received in a CORESET configured/associated with the CORESETPoolIndex value (e.g., 0) that is associated to the first PCI, to receive at least UE-dedicated PDSCH, and/or (2) one or more (previously) indicated TCI states for the CORESETPoolIndex value (e.g., 1) that is associated to the second PCI, e.g., in a beam indication DCI_b' received in a CORESET configured/associated with the CORESETPoolIndex value (e.g., 1) that is associated to the second PCI, to receive at least UE-dedicated PDSCH, and/or (3) one or more indicated TCI states for the CORESET associated with a monitored search space with the lowest CORESET ID among CORESETs, which are configured/associated with the serving cell PCI or configured with the same value of a CORESETPoolIndex associated to the first PCI (e.g., CORESETPoolIndex="0") or the second PCI (e.g., CORESETPoolIndex="1"), in the latest slot in which one or more CORESETs associated with the serving cell PCI or the same value of the CORESET-PoolIndex within the active BWP of the serving cell are monitored by the UE, to receive at least non-UE-dedicated (or common) PDSCH, wherein (1) the time offset between the beam indication DCI_a' and the PDSCH—e.g., the time duration/difference between the last symbol/slot of the PDCCH/PDCCH candidate that carries the beam indication DCI_a' and the first symbol/slot of the PDSCH—is greater than or equal to t_1 associated to the beam indication DCI_a," and/or (2) the time offset between the beam indication DCI_b' and the PDSCH—e.g., the time duration/difference between the last symbol/slot of the PDCCH/PDCCH candidate that carries the beam indication DCI_b' and the first symbol/slot of the PDSCH—is greater than or equal to t_1 associated to the beam indication DCI_b," and/or (3) the beam indication DCI_a' and/or DCI_b' are received the most recent in time relative to the beam indication DCI_a, and/or (4) the TCI state(s) indicated in the beam indication DCI_a' and/or DCI_b' is joint or (separate) DL TCI state(s) provided by TCI-State or DLorJoint-TCIState, and/or (5) the number of the TCI state(s) indicated in the beam indication DCI_a' and/or DCI_b' is one or two, and/or (6) the PDSCH could be UE-dedicated PDSCH and/or non-UE-dedicated (or common) PDSCH (e.g., when enableTwoDefaultBeamsMDCI is configured/enabled).

As specified herein in the present disclosure, the UE could be indicated/configure/provided/informed by the network, e.g., via higher layer RRC signaling/parameter (e.g., a higher layer parameter denoted by InterCellMdciMtrp) and/or MAC CE command and/or dynamic DCI based L1 signaling, that inter-cell multi-TRP operation, e.g., under the unified TCI framework, is enabled. When the UE is provided/configured by the network that, e.g., the higher layer parameter InterCellMdciMtrp is set to "enabled", and/or when the UE is provided in PDCCH-Config two values of CORESETPoolIndex (i.e., 0 and 1), and/or when the UE is provided/configured/indicated by the network, e.g., via higher layer RRC signaling/parameter and/or MAC CE command and/or dynamic DCI based L1 signaling, a list/set/pool of one or more PCIs including at least one PCI other than the serving cell PCI, value 0 (or 1) of CORESET-PoolIndex, and therefore, at least the corresponding CORE-SETs configured with the same value 0 (or 1) of CORE-SETPoolIndex, could be associated with the serving cell PCI, and value 1 (or 0) of CORESETPoolIndex, and therefore, at least the corresponding CORESETs configured with the same value 1 (or 0) of CORESETPoolIndex, could be associated with a PCI other than the serving cell PCI according to those specified herein in the present disclosure.

One or more indicated TCI states associated to a value of CORESETPoolIndex, e.g., when the one or more TCI states are indicated in DCI(s) received in CORESET(s) configured/associated with the value of CORESETPoolIndex, could also be associated to a PCI (e.g., the serving cell PCI or a PCI other than the serving cell PCI).

In one example, a PCI or a PCI index pointing to an entry/PCI in the list/set/pool of PCIs could be provided/indicated/configured in higher layer parameter TCI-State, DLorJointTCI-State or ULTCI-State that configures a TCI state; the TCI state, e.g., when activated/indicated in the corresponding beam activation/indication MAC CE or DCI, is associated to the PCI or the PCI index (pointing to an entry/PCI in the list/set/pool of PCIs) provided/configured/indicated in the corresponding higher layer parameter TCI-State, DLorJointTCI-State or ULTCI-State. Optionally, when the higher layer parameter TCI-State, DLorJointTCI-State or ULTCI-State that configures a TCI state does not contain/include/indicate/comprise a PCI or a PCI index pointing to an entry/PCI in the list/set/pool of PCIs, the TCI state, e.g., when activated/indicated in the corresponding beam activation/indication MAC CE or DCI, is associated to the serving cell PCI.

In another example, a PCI or a PCI index pointing to an entry/PCI in the list/set/pool of PCIs could be provided/indicated/configured in a higher layer parameter that configures a list/group of TCI states/TCI state IDs; for this case, a TCI state or TCI state ID configured/provided in a list/group of TCI states/TCI state IDs could be associated to the PCI or PCI index provided/indicated/configured therein. Optionally, a CORESETPoolIndex—e.g., associated to a PCI or a PCI index pointing to an entry/PCI in the list/set/pool of PCIs—could be provided/indicated/configured in a higher layer parameter that configures a list/group of TCI states/TCI state IDs; for this case, a TCI state or TCI state ID configured/provided in a list/group of TCI states/TCI state IDs could be associated to the CORESETPoolIndex value indicated therein, and therefore, the PCI or PCI index associated to the CORESETPoolIndex.

In yet another example, when a TCI state is indicated in a beam indication DCI (e.g., by one or more TCI codepoints of one or more TCI fields in DCI format 1_1/1_2 with or without DL assignment) received in a CORESET configured/associated with value 0 (or 1) of CORESETPoolIndex, the indicated TCI state could be associated to the PCI (e.g., the serving cell PCI) or PCI index (pointing to an entry/PCI in the list/set/pool of PCIs) that is associated to value 0 (or 1) of CORESETPoolIndex. When a TCI state is indicated in a beam indication DCI (e.g., by one or more TCI codepoints of one or more TCI fields in DCI format 1_1/1_2 with or without DL assignment) received in a CORESET configured/associated with value 1 (or 0) of CORESETPoolIndex, the indicated TCI state could be associated to the PCI (e.g., a PCI other than the serving cell PCI) or PCI index (pointing to an entry/PCI in the list/set/pool of PCIs) that is associated to value 1 (or 0) of CORESETPoolIndex.

In yet another example, a beam indication/activation MAC CE, e.g., (enhanced) TCI state(s) activation/deactivation MAC CE, could indicate/comprise/include/configure/contain a value of CORESETPoolIndex; for this design example, all of the TCI states activated by/in the beam indication/activation MAC CE could be associated to the CORESETPoolIndex indicated/provided therein, and therefore, the PCI or PCI index (pointing to an entry/PCI in the list/set/pool of PCIs) that is associated to the CORESET-PoolIndex. For instance, when a beam indication/activation MAC CE, e.g., (enhanced) TCI state(s) activation/deactivation MAC CE, indicates/comprises/includes/configures/contains value 0 (or 1) of CORESETPoolIndex, all of the TCI states activated by/in the beam indication MAC CE could be associated to value 0 (or 1) of CORESETPoolIndex, and therefore, the PCI (e.g., the serving cell PCI) or PCI index (pointing to an entry/PCI in the list/set/pool of PCIs) that is associated to value 0 (or 1) of CORESETPoolIndex. When a beam indication/activation MAC CE, e.g., (enhanced) TCI state(s) activation/deactivation MAC CE, indicates/comprises/includes/configures/contains value 1 (or 0) of CORESETPoolIndex, all of the TCI states activated by/in the beam indication MAC CE could be associated to value 1 (or 0) of CORESETPoolIndex, and therefore, the PCI (e.g., a PCI other than the serving cell PCI) or PCI index (pointing to an entry/PCI in the list/set/pool of PCIs) that is associated to value 1 (or 0) of CORESETPoolIndex.

In yet another example, a beam indication/activation MAC CE, e.g., (enhanced) TCI state(s) activation/deactivation MAC CE, could indicate/comprise/include/configure/contain a PCI value or a PCI index (pointing to an entry/PCI in the list/set/pool of PCIs; for this design example, all of the TCI states activated by/in the beam indication/activation MAC CE could be associated to the PCI or PCI index (pointing to an entry/PCI in the list/set/pool of PCIs).

In yet another example, a beam indication/activation MAC CE, e.g., (enhanced) TCI state(s) activation/deactivation MAC CE, could indicate/comprise/include/configure/contain one or multiple values of CORESETPoolIndex. Each of the TCI states activated/indicated in the beam indication/activation MAC CE could be associated to a value (e.g., 0 or 1) of CORESETPoolIndex indicated/provided therein, and therefore, the PCI or PCI index (pointing to an entry/PCI in the list/set/pool of PCIs) that is associated to the CORESETPoolIndex. For instance, when a TCI state activated/indicated by/in the beam indication MAC CE is associated to value 0 (or 1) of CORESETPoolIndex provided/indicated therein, the TCI state could be associated to the PCI (e.g., the serving cell PCI) or PCI index (pointing to an entry/PCI in the set/list/pool of PCIs) that is associated to value 0 (or 1) of CORESETPoolIndex. When a TCI state activated/indicated by/in the beam indication MAC CE is associated to value 1 (or 0) of CORESETPoolIndex provided/indicated therein, the TCI state could be associated to the PCI (e.g., a PCI other than the serving cell PCI) or PCI index (pointing to an entry/PCI in the set/list/pool of PCIs) that is associated to value 1 (or 0) of CORESETPoolIndex.

In yet another example, a beam indication/activation MAC CE, e.g., (enhanced) TCI state(s) activation/deactivation MAC CE, could indicate/comprise/include/configure/contain one or multiple PCI values or PCI indexes (each pointing to an entry/PCI in the list/set/pool of PC Is). Each of the TCI states activated/indicated in the beam indication/activation MAC CE could be associated to a PCI value or PCI index (pointing to an entry/PCI in the list/set/pool of PCIs).

As specified herein in the present disclosure, the UE could be indicated/configure/provided/informed by the network, e.g., via higher layer RRC signaling/parameter (e.g., a higher layer parameter denoted by InterCellMdciMtrp) and/or MAC CE command and/or dynamic DCI based L1 signaling, that inter-cell multi-TRP operation, e.g., under the unified TCI framework, is enabled. When the UE is provided/configured by the network that, e.g., the higher layer parameter InterCellMdciMtrp is set to "enabled", and/or when the UE is provided in PDCCH-Config two values of CORESETPoolIndex (i.e., 0 and 1), and/or when the UE is provided/configured/indicated by the network, e.g., via higher layer RRC signaling/parameter and/or MAC CE command and/or dynamic DCI based L1 signaling, a list/set/pool of one or more PCIs including at least one PCI other than the serving cell PCI, a TCI state could be associated to a PCI (e.g., the serving cell PCI or a PCI other than the serving cell PCI) according to those specified herein in the present disclosure.

For instance, a PCI or a PCI index pointing to an entry/PCI in the list/set/pool of PCIs could be provided/indicated/configured in higher layer parameter TCI-State, DLorJointTCI-State or ULTCI-State that configures a TCI state; the TCI state, therefore, could be associated to the PCI or the PCI index (pointing to an entry/PCI in the list/set/pool of PCIs) provided/configured/indicated in the corresponding higher layer parameter TCI-State, DLorJointTCI-State or ULTCI-State. Furthermore, when the higher layer parameter TCI-State, DLorJointTCI-State or ULTCI-State that configures a TCI state does not contain/include/indicate/comprise a PCI or a PCI index pointing to an entry/PCI in the list/set/pool of PCIs, the TCI state could be associated to the serving cell PCI. Different values of CORESETPoolIndex (e.g., 0 and 1) could be associated to different PCI values via one or more TCI states activated/indicated in beam activation/indication MAC CE or DCI.

In one example, the UE could be higher layer RRC configured by the network one or more lists/groups of TCI states, wherein a list/group of TCI states could comprise/include/contain one or more TCI states and associated to a value of CORESETPoolIndex. For instance, the CORESETPoolIndex value could be provided/indicated/configured in higher layer RRC parameter that configures a list/group of TCI states.

In another example, when one or more TCI states associated to a PCI or PCI index as specified herein in the present disclosure are indicated in beam indication DCI(s) received in CORESET(s) associated/configured with a CORESETPoolIndex value (e.g., 0 or 1), the CORESETPoolIndex value could also be associated to the PCI or PCI index. For instance, when one or more TCI states associated to a PCI (e.g., the serving cell PCI) or PCI index (pointing to an entry/PCI in the list/set/pool of PCIs) as specified herein in the present disclosure are indicated in beam indication DCI(s) received in CORESET(s) associated/configured with value 0 (or 1) of CORESETPoolIndex, value 0 (or 1) of CORESETPoolIndex could be associated with the PCI (e.g., the serving cell PCI) or PCI index (pointing to an entry/PCI in the set/list/pool of PCIs). When one or more TCI states associated to a PCI (e.g., a PCI other than the serving cell PCI) or PCI index (pointing to an entry/PCI in the list/set/pool of PCIs) as specified herein in the present disclosure are indicated in beam indication DCI(s) received in CORESET(s) associated/configured with value 1 (or 0) of CORESETPoolIndex, value 1 (or 0) of CORESETPoolIndex could be associated with the PCI (e.g., the PCI other than the serving cell PCI) or PCI index (pointing to an entry/PCI in the set/list/pool of PCIs).

In yet another example, a beam indication/activation MAC CE, e.g., (enhanced) unified TCI state(s) activation/deactivation MAC CE, could indicate/provide/contain/include/comprise a CORESETPoolIndex value. Furthermore, one or more (or all) of the TCI states activated by/in the beam indication/activation MAC CE could be associated to a PCI/PCI index according to those specified herein in the present disclosure. Hence, the CORESETPoolIndex value could be associated with the PCI/PCI index via the one or more (or all) of the activated TCI states in the MAC CE.

In yet another example, a beam indication/activation MAC CE, e.g., (enhanced) unified TCI state(s) activation/deactivation MAC CE, could indicate/provide/contain/include/comprise one or multiple CORESETPoolIndex values each associated to one or more TCI states activated/indicated therein. When the TCI state(s) activated/indicated by/in the MAC CE—associated to a value of CORESETPoolIndex—is associated to a PCI/PCI index following those specified herein in the present disclosure, the CORESETPoolIndex value is also associated to the PCI/PCI index.

The UE could use/apply one or more TCI states—activated/indicated by/in the beam indication/activation MAC CE or DCI—that are associated to a PCI or PCI index (pointing to an entry/PCI in the set/list/pool of PCIs) according to those specified herein in the present disclosure to receive one or more channels (such as PDCCH and/or PDSCH) and/or signals (such as CSI-RS) and/or to transmit one or more channels (such as PUCCH and/or PUSCH) and/or signals (such as SRS) associated/configured with a value of CORESETPoolIndex that is associated to the PCI or PCI index (pointing to an entry/PCI in the set/list/pool of PCIs) according to those specified herein in the present disclosure.

In one example, the UE could use/apply one or more TCI states—activated/indicated by/in the beam indication/activation MAC CE or DCI—that are associated to a PCI or PCI index (pointing to an entry/PCI in the set/list/pool of PCIs) according to those specified herein in the present disclosure to receive/monitor PDCCH candidate(s) received in CORESET(s) configured/associated with a value of CORESETPoolIndex that is associated to the PCI or PCI index (pointing to an entry/PCI in the set/list/pool of PCIs) according to those specified herein in the present disclosure. For instance, the UE could use/apply one or more TCI states—activated/indicated by/in the beam indication/activation MAC CE or DCI—that are associated to a PCI (e.g., the serving cell PCI) or PCI index (pointing to an entry/PCI in the set/list/pool of PCIs) according to those specified herein in the present disclosure to receive/monitor PDCCH candidate(s) received in CORESET(s) configured/associated with value 0 (or 1) of CORESETPoolIndex that is associated to the PCI or PCI index (pointing to an entry/PCI in the set/list/pool of PCIs).

Furthermore, the UE could use/apply one or more TCI states—activated/indicated by/in the beam indication/activation MAC CE or DCI—that are associated to a PCI (e.g., a PCI other than the serving cell PCI) or PCI index (pointing to an entry/PCI in the set/list/pool of PCIs) according to those specified herein in the present disclosure to receive/monitor PDCCH candidate(s) received in CORESET(s) configured/associated with value 1 (or 0) of CORESET-PoolIndex that is associated to the PCI or PCI index (pointing to an entry/PCI in the set/list/pool of PCIs).

In another example, the UE could use/apply one or more TCI states—activated/indicated by/in the beam indication/activation MAC CE or DCI—that are associated to a PCI or PCI index (pointing to an entry/PCI in the set/list/pool of PCIs) according to those specified herein in the present disclosure to receive PDSCH(s) that is activated/scheduled by DCI(s)/PDCCH(s) received in CORESET(s) configured/associated with a value of CORESETPoolIndex that is associated to the PCI or PCI index (pointing to an entry/PCI in the set/list/pool of PCIs) according to those specified herein in the present disclosure.

For instance, the UE could use/apply one or more TCI states—activated/indicated by/in the beam indication/activation MAC CE or DCI—that are associated to a PCI (e.g., the serving cell PCI) or PCI index (pointing to an entry/PCI in the set/list/pool of PCIs) according to those specified herein in the present disclosure to receive PDSCH(s) activated/scheduled by DCI(s)/PDCCH(s) received in CORE-SET(s) configured/associated with value 0 (or 1) of CORE-SETPoolIndex that is associated to the PCI or PCI index (pointing to an entry/PCI in the set/list/pool of PCIs).

Furthermore, the UE could use/apply one or more TCI states—activated/indicated by/in the beam indication/activation MAC CE or DCI—that are associated to a PCI (e.g., a PCI other than the serving cell PCI) or PCI index (pointing to an entry/PCI in the set/list/pool of PCIs) according to those specified herein in the present disclosure to receive PDSCH(s) activated/scheduled by DCI(s)/PDCCH(s) received in CORESET(s) configured/associated with value 1 (or 0) of CORESETPoolIndex that is associated to the PCI or PCI index (pointing to an entry/PCI in the set/list/pool of PCIs).

In yet another example, the UE could use/apply one or more TCI states—activated/indicated by/in the beam indication/activation MAC CE or DCI—that are associated to a PCI or PCI index (pointing to an entry/PCI in the set/list/pool of PCIs) according to those specified herein in the present disclosure to receive CSI-RS(s) configured/associated with a value of CORESETPoolIndex that is associated to the PCI or PCI index (pointing to an entry/PCI in the set/list/pool of PCIs) according to those specified herein in the present disclosure.

For instance, the UE could use/apply one or more TCI states—activated/indicated by/in the beam indication/activation MAC CE or DCI—that are associated to a PCI (e.g., the serving cell PCI) or PCI index (pointing to an entry/PCI in the set/list/pool of PCIs) according to those specified herein in the present disclosure to receive CSI-RS(s) configured/associated with value 0 (or 1) of CORESETPoolIndex that is associated to the PCI or PCI index (pointing to an entry/PCI in the set/list/pool of PCIs).

Furthermore, the UE could use/apply one or more TCI states—activated/indicated by/in the beam indication/activation MAC CE or DCI—that are associated to a PCI (e.g., a PCI other than the serving cell PCI) or PCI index (pointing to an entry/PCI in the set/list/pool of PCIs) according to those specified herein in the present disclosure to receive CSI-RS(s) configured/associated with value 1 (or 0) of CORESETPoolIndex that is associated to the PCI or PCI index (pointing to an entry/PCI in the set/list/pool of PCIs). For the association between a CSI-RS resource and a value of CORESETPoolIndex or PCI or PCI index, following examples can be provided.

In one example, the CORESETPoolIndex value or an indicator representing/indicating the CORESETPoolIndex value or an indicator representing/indicating one or more TCI states associated/specific to the CORESETPoolIndex value or a PCI value or a PCI index pointing an entry/PCI in the list/set/pool of PCIs could be provided/indicated/configured in the higher layer RRC parameter that is configured/associated with the CSI-RS resource set that comprises/includes/contains/configures/provides the CSI-RS resource. Here, the higher layer RRC parameter could be CSI-AssociatedReportConfigInfo of CSI-AperiodicTrigger-State, CSI-ResourceConfig, CSI-ReportConfig, NZP-CSI-RS-ResourceSet and/or etc.

In another example, a CSI-RS resource is associated/specific to a value of CORESETPoolIndex if the CSI-RS resource is activated/triggered by DCI(s)/PDCCH(s) received in CORESET(s) associated/configured with the value of CORESETPoolIndex.

In yet another example, when (enhanced) group based beam reporting for MTRP operation is enabled, value 0 (or 1) of CORESETPoolIndex could be associated to the first aperiodic CSI resource set (and therefore, the CSI-RS resource(s) configured/provided therein) in CSI-AssociateReportConfigInfo of CSI-AperiodicTriggerState, and value 1 (or 0) of CORESETPoolIndex could be associated to the second aperiodic CSI resource set (and therefore, the CSI-RS resource(s) configured/provided therein) in CSI-AssociateReportConfigInfo of CSI-AperiodicTriggerState. In addition to the above described/specified fixed rule, the UE could be indicated/configured/provided by the network, e.g., via higher layer RRC signaling/parameter and/or MAC CE command and/or dynamic DCI based L1 signaling, the association between the CORESETPoolIndex value(s) and the first/second aperiodic CSI resource set(s) in CSI-AssociateReportConfigInfo of CSI-AperiodicTriggerState.

In yet another example, the UE could use/apply one or more TCI states—activated/indicated by/in the beam indication/activation MAC CE or DCI—that are associated to a PCI or PCI index (pointing to an entry/PCI in the set/list/pool of PCIs) according to those specified herein in the present disclosure to transmit PUCCH(s) configured/associated with a value of CORESETPoolIndex that is associated to the PCI or PCI index (pointing to an entry/PCI in the set/list/pool of PCIs) according to those specified herein in the present disclosure.

For instance, the UE could use/apply one or more TCI states—activated/indicated by/in the beam indication/activation MAC CE or DCI—that are associated to a PCI (e.g., the serving cell PCI) or PCI index (pointing to an entry/PCI in the set/list/pool of PCIs) according to those specified herein in the present disclosure to transmit PUCCH(s) configured/associated with value 0 (or 1) of CORESET-PoolIndex that is associated to the PCI or PCI index (pointing to an entry/PCI in the set/list/pool of PCIs).

Furthermore, the UE could use/apply one or more TCI states—activated/indicated by/in the beam indication/activation MAC CE or DCI—that are associated to a PCI (e.g., a PCI other than the serving cell PCI) or PCI index (pointing to an entry/PCI in the set/list/pool of PCIs) according to those specified herein in the present disclosure to transmit PUCCH(s) configured/associated with value 1 (or 0) of CORESETPoolIndex that is associated to the PCI or PCI index (pointing to an entry/PCI in the set/list/pool of PCIs). To associate a PUCCH resource to a value of CORESET-PoolIndex, the CORESETPoolIndex value or an indicator representing/indicating the CORESETPoolIndex value or an indicator indicating one or more TCI states associated/specific to the CORESETPoolIndex value could be provided/indicated/configured in higher layer RRC signaling/parameter and/or MAC CE command and/or dynamic DCI based L1 signaling that configures the PUCCH resource or a PUCCH resource group that comprises/includes/contains the PUCCH resource.

In yet another example, the UE could use/apply one or more TCI states—activated/indicated by/in the beam indication/activation MAC CE or DCI—that are associated to a PCI or PCI index (pointing to an entry/PCI in the set/list/pool of PCIs) according to those specified herein in the present disclosure to transmit PUSCH(s)—e.g., dynamic-grant (DG) PUSCH and Type-2 configured-grant (CG) PUSCH—activated/scheduled by DCI(s)/PDCCH(s) received in CORESET(s) configured/associated with a value of CORESETPoolIndex that is associated to the PCI or PCI index (pointing to an entry/PCI in the set/list/pool of PCIs) according to those specified herein in the present disclosure.

For instance, the UE could use/apply one or more TCI states—activated/indicated by/in the beam indication/activation MAC CE or DCI—that are associated to a PCI (e.g., the serving cell PCI) or PCI index (pointing to an entry/PCI in the set/list/pool of PCIs) according to those specified herein in the present disclosure to transmit PUSCH(s)—e.g., DG PUSCH and Type-2 CG PUSCH—activated/scheduled by DCI(s)/PDCCH(s) received in CORESET(s) configured/associated with value 0 (or 1) of CORESETPoolIndex that is associated to the PCI or PCI index (pointing to an entry/PCI in the set/list/pool of PCIs).

Furthermore, the UE could use/apply one or more TCI states—activated/indicated by/in the beam indication/activation MAC CE or DCI—that are associated to a PCI (e.g., a PCI other than the serving cell PCI) or PCI index (pointing to an entry/PCI in the set/list/pool of PCIs) according to those specified herein in the present disclosure to transmit PUSCH(s)—e.g., DG PUSCH and Type-2 CG PUSCH—activated/scheduled by DCI(s)/PDCCH(s) received in CORESET(s) configured/associated with value 1 (or 0) of CORESETPoolIndex that is associated to the PCI or PCI index (pointing to an entry/PCI in the set/list/pool of PCIs).

In yet another example, the UE could use/apply one or more TCI states—activated/indicated by/in the beam indication/activation MAC CE or DCI—that are associated to a PCI or PCI index (pointing to an entry/PCI in the set/list/pool of PCIs) according to those specified herein in the present disclosure to transmit SRS(s) configured/associated with a value of CORESETPoolIndex that is associated to the PCI or PCI index (pointing to an entry/PCI in the set/list/pool of PCIs) according to those specified herein in the present disclosure.

For instance, the UE could use/apply one or more TCI states—activated/indicated by/in the beam indication/activation MAC CE or DCI—that are associated to a PCI (e.g., the serving cell PCI) or PCI index (pointing to an entry/PCI in the set/list/pool of PCIs) according to those specified herein in the present disclosure to transmit SRS(s) configured/associated with value 0 (or 1) of CORESETPoolIndex that is associated to the PCI or PCI index (pointing to an entry/PCI in the set/list/pool of PCIs).

Furthermore, the UE could use/apply one or more TCI states—activated/indicated by/in the beam indication/activation MAC CE or DCI—that are associated to a PCI (e.g., a PCI other than the serving cell PCI) or PCI index (pointing to an entry/PCI in the set/list/pool of PCIs) according to those specified herein in the present disclosure to transmit SRS(s) configured/associated with value 1 (or 0) of CORESETPoolIndex that is associated to the PCI or PCI index (pointing to an entry/PCI in the set/list/pool of PCIs).

For the association between a SRS resource and a value of CORESETPoolIndex or PCI or PCI index, following examples can be provided.

In one example, a SRS resource is associated/specific to a value of CORESETPoolIndex if the SRS resource is activated/triggered by DCI(s)/PDCCH(s) received in CORESET(s) associated/configured with the value of CORESETPoolIndex.

In another example, when two SRS resource sets—a first and a second SRS resource sets—are configured with the usage set to "codebook" or "non-codebook," value 0 (or 1) of CORESETPoolIndex or a PCI (e.g., the serving cell PCI) or a PCI index (pointing to an entry/PCI in the set/list/pool of PCIs) could be associated to the first SRS resource set (and therefore, the SRS resource(s) configured/provided therein), and value 1 (or 0) of CORESETPoolIndex or another PCI (e.g., a PCI other than the serving cell PCI) or another PCI index (pointing to another entry/PCI in the set/list/pool of PCIs) could be associated to the second SRS resource set (and therefore, the SRS resource(s) configured/provided therein). In addition to the above described/specified fixed rule, the UE could be indicated/configured/provided by the network, e.g., via higher layer RRC signaling/parameter and/or MAC CE command and/or dynamic DCI based L1 signaling, the association between the CORESET-PoolIndex value(s) and the first/second SRS resource set(s).

In yet another example, the UE could use/apply one or more TCI states—activated/indicated by/in the beam indication/activation MAC CE or DCI—that are associated to a PCI or PCI index (pointing to an entry/PCI in the set/list/pool of PCIs) according to those specified herein in the present disclosure to receive/transmit one or more RRC configured channels/signals such as Type-1 CG PUSCH configured/associated with a value of CORESETPoolIndex that is associated to the PCI or PCI index (pointing to an entry/PCI in the set/list/pool of PCIs) according to those specified herein in the present disclosure.

For instance, the UE could use/apply one or more TCI states—activated/indicated by/in the beam indication/activation MAC CE or DCI—that are associated to a PCI (e.g., the serving cell PCI) or PCI index (pointing to an entry/PCI in the set/list/pool of PCIs) according to those specified herein in the present disclosure to receive/transmit the one or more RRC configured channels/signals such as Type-1 CG PUSCH configured/associated with value 0 (or 1) of CORESETPoolIndex that is associated to the PCI or PCI index (pointing to an entry/PCI in the set/list/pool of PCIs).

Furthermore, the UE could use/apply one or more TCI states—activated/indicated by/in the beam indication/activation MAC CE or DCI—that are associated to a PCI (e.g., a PCI other than the serving cell PCI) or PCI index (pointing to an entry/PCI in the set/list/pool of PCIs) according to those specified herein in the present disclosure to receive/transmit the one or more RRC configured channels/signals such as Type-1 CG PUSCH configured/associated with value 1 (or 0) of CORESETPoolIndex that is associated to the PCI or PCI index (pointing to an entry/PCI in the set/list/pool of PCIs).

For instance, for the association between Type-1 CG PUSCH and a value of CORESETPoolIndex or PCI or PCI index, following examples can be provided.

In one example, the CORESETPoolIndex value or an indicator representing/indicating the CORESETPoolIndex value or an indicator representing/indicating one or more TCI states associated/specific to the CORESETPoolIndex value or a PCI value or a PCI index (pointing to an entry/PCI in the set/list/pool of PCIs) could be provided/indicated/configured in the higher layer RRC parameter, e.g., ConfiguredGrantConfig, that configures the Type-1 CG PUSCH.

In another example, when two SRS resource sets—a first and a second SRS resource sets—are configured with the usage set to "codebook" or "non-codebook," a SRS resource set index/ID could be provided/indicated/configured in the higher layer RRC parameter, e.g., ConfiguredGrantConfig, that configures the Type-1 CG PUSCH. The Type-1 CG PUSCH is associated to the first (or second) SRS resource set if the SRS resource set index/ID of the first (or second) SRS resource set is indicated/provided/configured in the higher layer RRC parameter, e.g., ConfiguredGrantConfig, that configures the Type-1 CG PUSCH. Hence, if a SRS resource set (the first or the second) is associated/specific to a value of CORESETPoolIndex according to those specified herein in the present disclosure, the Type-1 CG PUSCH associated to the SRS resource set could also be associated/specific to the value of CORESETPoolIndex.

As specified herein in the present disclosure, one or more TCI states configured/activated/indicated by/in a list/group of TCI states and/or a beam indication/activation MAC CE and/or a beam indication DCI could be associated to a PCI or PCI index (pointing to an entry/PCI in the list/set/pool of PCIs). The UE could use/apply the one or more configured/activated/indicated TCI states that are associated to a PCI/PCI index for one or more channels/signals associated/configured with the (same) PCI/PCI index.

The association between the one or more channels/signals and the PCI/PCI index could be according to one or more of the following examples.

In one example for PDCCH reception, the PDCCH(s)/PDCCH candidate(s) could be received in CORESET(s) associated/configured with a CORESETPoolIndex value; as the CORESETPoolIndex value could be associated to the PCI/PCI index according to those specified herein in the present disclosure, the PDCCH(s)/PDCCH candidate(s) could also be associated to the PCI/PCI index. As specified/described herein in the present disclosure, the UE could then use/apply the TCI state(s) associated to the PCI/PCI index for receiving the PDCCH(s)/PDCCH candidate(s) associated to the same PCI/PCI index.

In another example for PDSCH reception, the PDSCH(s) could be scheduled/activated by one or more PDCCHs/DCIs received in CORESET(s) associated/configured with a CORESETPoolIndex value; as the CORESETPoolIndex value could be associated to the PCI/PCI index according to those specified herein in the present disclosure, the PDSCH(s) scheduled/activated by the PDCCH(s)/DCI(s) could also be associated to the PCI/PCI index. As specified/described herein in the present disclosure, the UE could then use/apply the TCI state(s) associated to the PCI/PCI index for receiving the PDSCH(s) associated to the same PCI/PCI index.

In yet another example for PUCCH transmission, the UE could be indicated/provided/configured by the network, e.g., via higher layer RRC signaling/parameter and/or MAC CE command and/or dynamic DCI based L1 signaling, association between a CORESETPoolIndex value or a PCI or a PCI index and one or more PUCCH resources. For example, a CORESETPoolIndex value or a PCI value or a PCI index could be provided/indicated/configured in higher layer RRC signaling/parameter(s) and/or MAC CE command(s) that configures/indicates the one or more PUCCH resources. For another example, one or more indicator(s) could be provided/indicated/configured in higher layer RRC signaling/parameter(s) and/or MAC CE command(s) that configures/indicates the one or more PUCCH resources indicating association between CORESETPoolIndex value(s) or PCI value(s) or PCI index(es) and the one or more PUCCH resources. As the CORESETPoolIndex value could be associated to the PCI/PCI index according to those specified herein in the present disclosure, the corresponding PUCCH resource(s) could also be associated to the PCI/PCI index. As specified/described herein in the present disclosure, the UE could then use/apply the TCI state(s) associated to the PCI/PCI index for transmitting the PUCCH resource(s) associated to the same PCI/PCI index.

In yet another example for PUSCH transmission: the PUSCH(s) could be scheduled/activated by one or more PDCCHs/DCIs received in CORESET(s) associated/configured with a CORESETPoolIndex value; as the CORESETPoolIndex value could be associated to the PCI/PCI index according to those specified herein in the present disclosure, the PUSCH(s) scheduled/activated by the PDCCH(s)/DCI(s) could also be associated to the PCI/PCI index. As specified/described herein in the present disclosure, the UE could then use/apply the TCI state(s) associated to the PCI/PCI index for transmitting the PUSCH(s) associated to the same PCI/PCI index.

In yet another example for CSI-RS reception, the UE could be indicated/provided/configured by the network, e.g., via higher layer RRC signaling/parameter and/or MAC CE command and/or dynamic DCI based L1 signaling, association between a CORESETPoolIndex value or a PCI or a PCI index and one or more CSI-RS resources. For example, a CORESETPoolIndex value or a PCI value or a PCI index could be provided/indicated/configured in higher layer RRC signaling/parameter(s)—e.g., a CSI resource set/setting/triggering state—and/or MAC CE command(s) that configures/indicates/triggers the one or more CSI-RS resources. For another example, one or more indicator(s) could be provided/indicated/configured in higher layer RRC signaling/parameter(s)—e.g., a CSI resource set/setting/triggering state—and/or MAC CE command(s) that configures/indicates/triggers the one or more CSI-RS resources indicating association between CORESETPoolIndex value(s) or PCI value(s) or PCI index(es) and the one or more CSI-RS resources. As the CORESETPoolIndex value could be associated to the PCI/PCI index according to those specified herein in the present disclosure, the corresponding CSI-RS resource(s) could also be associated to the PCI/PCI index. As specified/described herein in the present disclosure, the UE could then use/apply the TCI state(s) associated to the PCI/PCI index for receiving the CSI-RS resource(s) associated to the same PCI/PCI index.

In yet another example for SRS transmission, the UE could be indicated/provided/configured by the network, e.g., via higher layer RRC signaling/parameter and/or MAC CE command and/or dynamic DCI based L1 signaling, association between a CORESETPoolIndex value or a PCI or a PCI index and one or more SRS resources. For example, a CORESETPoolIndex value or a PCI value or a PCI index could be provided/indicated/configured in higher layer RRC signaling/parameter(s)—e.g., a SRS resource set/setting/triggering state—and/or MAC CE command(s) that configures/indicates/triggers the one or more SRS resources. For another example, one or more indicator(s) could be provided/indicated/configured in higher layer RRC signaling/parameter(s)—e.g., a SRS resource set/setting/triggering state—and/or MAC CE command(s) that configures/indicates/triggers the one or more SRS resources indicating association between CORESETPoolIndex value(s) or PCI value(s) or PCI index(es) and the one or more SRS resources. As the CORESETPoolIndex value could be associated to the PCI/PCI index according to those specified herein in the present disclosure, the corresponding SRS resource(s) could also be associated to the PCI/PCI index. As specified/described herein in the present disclosure, the UE could then use/apply the TCI state(s) associated to the PCI/PCI index for transmitting the SRS resource(s) associated to the same PCI/PCI index.

In yet another example for configured channels/signals—including semi-persistent scheduling (SPS) PDSCH reception, periodic PUCCH transmission, configured-grant (CG) PUSCH transmission and etc.—transmission/reception, the UE could be indicated/provided/configured by the network, e.g., via higher layer RRC signaling/parameter and/or MAC CE command and/or dynamic DCI based L1 signaling, association between a CORESETPoolIndex value or a PCI or a PCI index and one or more configured channels/signals as described herein in the present disclosure. For example, a CORESETPoolIndex value or a PCI value or a PCI index could be provided/indicated/configured in higher layer RRC signaling/parameter(s)—e.g., SPS-Config, PUCCH-Config, ConfiguredGrantConfig and etc.—and/or MAC CE command(s) that configures/indicates/triggers the one or more configured channels/signals. For another example, one or more indicator(s) could be provided/indicated/configured in higher layer RRC signaling/parameter(s)—e.g., SPS-Config, PUCCH-Config, ConfiguredGrantConfig and etc.—and/or MAC CE command(s) that configures/indicates/triggers the one or more configured channels/signals indicating association between CORESETPoolIndex value(s) or PCI value(s) or PCI index(es) and the one or more configured channels/signals as described herein in the present disclosure. As the CORESETPoolIndex value could be associated to the PCI/PCI index according to those specified herein in the present disclosure, the corresponding configured channels/signals could also be associated to the PCI/PCI index. As specified/described herein in the present disclosure, the UE could then use/apply the TCI state(s) associated to the PCI/PCI index for transmitting/receiving the configured channel(s)/signal(s) as described herein in the present disclosure associated to the same PCI/PCI index.

Any of the above variation embodiments can be utilized independently or in combination with at least one other variation embodiment.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE), comprising:

a transceiver configured to:

receive, in a first control resource set (CORESET), a downlink control information (DCI) indicating a first transmission configuration indication (TCI) state; and receive, in a radio resource control (RRC) signaling, (i) a first indicator configuring a value of coresetPoolIndex associated with the first CORESET and (ii) a second indicator; and a processor operably coupled to the transceiver, the processor configured to:

identify, based on the first indicator, an association between the value of coresetPoolIndex and the first TCI state;

identify, based on the second indicator, whether a simultaneous reception before an indicated TCI state is applicable is enabled; and determine, based on the identifications, one or more spatial filters for receiving a physical downlink shared channel (PDSCH) before the indicated TCI state is applicable, wherein the PDSCH is associated with the value of coresetPoolIndex.

2. The UE of claim 1, wherein:

when the coresetPoolIndex has a value 0, the processor is further configured to identify that the first TCI state is associated with value 0 of the coresetPoolIndex; and when the coresetPoolIndex has a value 1, the processor is further configured to identify that the first TCI state is associated with value 1 of the coresetPoolIndex.

3. The UE of claim 1, wherein:

the indicated TCI state is applicable starting from:

a first slot that is at least timeDurationForQCL symbols after a last symbol of a physical downlink control channel (PDCCH) that carries a DCI indicating a TCI state;

a first slot that is at least BeamAppTime_r17 symbols after a last symbol of a physical uplink control channel (PUCCH) with hybrid automatic repeat request (HARQ)-acknowledgement (ACK) information corresponding to a PDSCH scheduled by the DCI indicating the TCI state; or a first slot that is at least BeamAppTime_r17 symbols after the last symbol of a PUCCH with HARQ-ACK information corresponding to the DCI indicating the TCI state, and the processor is further configured to determine the first slot and the BeamAppTime_r17 symbols based on a carrier with a smallest subcarrier spacing (SCS) among carriers that apply the indicated TCI state and the value of coresetPoolIndex.

4. The UE of claim 1, wherein, when the second indicator indicates that the simultaneous reception is not enabled, the processor is further configured to determine the one or more spatial filters based on at least one of:

the first TCI state;

a TCI state for receiving a physical downlink control channel (PDCCH) that carries the DCI; and a TCI state for receiving a PDCCH of a CORESET with a lowest CORESET index among CORESETs configured with the value of coresetPoolIndex in a latest slot of search space monitoring.

5. The UE of claim 1, wherein:

the transceiver is further configured to receive, in a second CORESET, a DCI indicating a second TCI state;

when a coresetPoolIndex corresponding to the second CORESET has a value of 0, the processor is further configured to identify that the second TCI state is associated with value 0 of the coresetPoolIndex; and when the coresetPoolIndex corresponding to the second CORESET has a value of 1, the processor is further configured to identify that the second TCI state is associated with value 1 of the coresetPoolIndex.

6. The UE of claim 5, wherein, when the second indicator indicates that the simultaneous reception is enabled, the processor is further configured to determine the one or more spatial filters according to the first and second TCI states.

7. The UE of claim 1, wherein:

the transceiver is further configured to receive, in a second CORESET, a DCI indicating a second TCI state;

the RRC signaling includes a third indicator configuring a first physical cell identity (PCI) for the first CORE-SET and a second PCI for the second CORESET; and the processor is further configured to identify, based on the third indicator, a first association between the first PCI and the first TCI state and a second association between the second PCI and the second TCI state.

8. The UE of claim 7, wherein, when the second PCI is a PCI corresponding to a serving cell and the first PCI is a PCI corresponding to a cell other than the serving cell, the processor is further configured to:

determine, based on the first TCI state, the one or more spatial filters for receiving at least a dedicated PDSCH before the indicated TCI state is applicable; or determine, based on the second TCI state, the one or more spatial filters for receiving at least a non-dedicated PDSCH before the indicated TCI state is applicable.

9. A base station (BS), comprising:

a transceiver configured to:

transmit, in a first control resource set (CORESET), a downlink control information (DCI) indicating a first transmission configuration indication (TCI) state; and transmit, in a radio resource control (RRC) signaling, (i) a first indicator configuring a value of coreset-PoolIndex associated with the first CORESET and (ii) a second indicator, wherein the first indicator indicates a first indication of an association between the value of coresetPoolIndex and the first TCI state, wherein the second indicator indicates a second indication of whether a simultaneous reception before an indicated TCI state is applicable is enabled, wherein one or more spatial filters associated with a physical downlink shared channel (PDSCH) before the indicated TCI state is applicable are indicated based on the first and second indications, and wherein the PDSCH is associated with the value of coresetPoolIndex.

10. The BS of claim 9, wherein:

when the coresetPoolIndex has a value 0, the first TCI state is associated with value 0 of the coresetPoolIndex; and when the coresetPoolIndex has a value 1, the first TCI state is associated with value 1 of the coresetPoolIndex.

11. The BS of claim 9, wherein:

the indicated TCI state is applicable starting from:

a first slot that is at least timeDurationForQCL symbols after a last symbol of a physical downlink control channel (PDCCH) that carries a DCI indicating a TCI state;

a first slot that is at least BeamAppTime_r17 symbols after a last symbol of a physical uplink control channel (PUCCH) with hybrid automatic repeat request (HARQ)-acknowledgement (ACK) information corresponding to a PDSCH scheduled by the DCI indicating the TCI state; or a first slot that is at least BeamAppTime_r17 symbols after the last symbol of a PUCCH with HARQ-ACK information corresponding to the DCI indicating the TCI state, and the first slot and the BeamAppTime_r17 symbols are based on a carrier with a smallest subcarrier spacing (SCS) among carriers that apply the indicated TCI state and the value of coresetPoolIndex.

12. The BS of claim 9, wherein:

the second indicator indicates that the simultaneous reception is not enabled, and the one or more spatial filters are indicated based on at least one of:

the first TCI state;

a TCI state for receiving a physical downlink control channel (PDCCH) that carries the DCI; and a TCI state for receiving a PDCCH of a CORESET with a lowest CORESET index among CORESETs configured with the value of coresetPoolIndex in a latest slot of search space monitoring.

13. The BS of claim 9, wherein:

the transceiver is further configured to transmit, in a second CORESET, a DCI indicating a second TCI state;

when a coresetPoolIndex corresponding to the second CORESET has a value of 0, the second TCI state is associated with value 0 of the coresetPoolIndex, and when the coresetPoolIndex corresponding to the second CORESET has a value of 1, the second TCI state is associated with value 1 of the coresetPoolIndex.

14. The BS of claim 13, wherein:

the second indicator indicates that the simultaneous reception is enabled, and the one or more spatial filters are indicated according to the first and second TCI states.

15. The BS of claim 9, wherein:

the transceiver is further configured to transmit, in a second CORESET, a DCI indicating a second TCI state;

the RRC signaling includes a third indicator configuring a first physical cell identity (PCI) for the first CORE-SET and a second PCI for the second CORESET; and the third indicator indicates a first association between the first PCI and the first TCI state and a second association between the second PCI and the second TCI state.

16. The BS of claim 15, wherein:

the second PCI is a PCI corresponding to a serving cell, the first PCI is a PCI corresponding to a cell other than the serving cell, and one of:

the first TCI state indicates the one or more spatial filters associated with at least a dedicated PDSCH before the indicated TCI state is applicable; or

the second TCI state indicates the one or more spatial filters associated with at least a non-dedicated PDSCH before the indicated TCI state is applicable.

17. A method for operating a user equipment (UE), the method comprising:

receiving, in a first control resource set (CORESET), a downlink control information (DCI) indicating a first transmission configuration indication (TCI) state;

receiving, in a radio resource control (RRC) signaling, (i) a first indicator configuring a value of coresetPoolIndex associated with the first CORESET and (ii) a second indicator;

identifying, based on the first indicator, an association between the value of coresetPoolIndex and the first TCI state;

identifying, based on the second indicator, whether a simultaneous reception before an indicated TCI state is applicable is enabled; and determining, based on the identifications, one or more spatial filters for receiving a physical downlink shared channel (PDSCH) before the indicated TCI state is applicable, wherein the PDSCH is associated with the value of coresetPoolIndex.

18. The method of claim 17, wherein identifying the association between the value of coresetPoolIndex and the first TCI state further comprises:

when the coresetPoolIndex has a value 0, identifying that the first TCI state is associated with value 0 of the coresetPoolIndex; and when the coresetPoolIndex has a value 1, identifying that the first TCI state is associated with value 1 of the coresetPoolIndex.

19. The method of claim 17, wherein:

the indicated TCI state is applicable starting from:

a first slot that is at least timeDurationForQCL symbols after a last symbol of a physical downlink control channel (PDCCH) that carries a DCI indicating a TCI state;

a first slot that is at least BeamAppTime_r17 symbols after a last symbol of a physical uplink control channel (PUCCH) with hybrid automatic repeat request (HARQ)-acknowledgement (ACK) information corresponding to a PDSCH scheduled by the DCI indicating the TCI state; or a first slot that is at least BeamAppTime_r17 symbols after the last symbol of a PUCCH with HARQ-ACK information corresponding to the DCI indicating the TCI state, and the method further comprises determining the first slot and the BearnAppTime_r17 symbols based on a carrier with a smallest subcarrier spacing (SCS) among carriers that apply the indicated TCI state and the value of coresetPoolIndex.

20. The method of claim 17, wherein:

the second indicator indicates that the simultaneous reception is not enabled, and determining the one or more spatial filters further comprises determining the one or more spatial filters based on at least one of:

the first TCI state;

a TCI state for receiving a physical downlink control channel (PDCCH) that carries the DCI; and a TCI state for receiving a PDCCH of a CORESET with a lowest CORESET index among CORESETs configured with the value of coresetPoolIndex in a latest slot of search space monitoring.

* * * * *